United States Patent
Sundararaman et al.

(10) Patent No.: US 10,102,144 B2
(45) Date of Patent: Oct. 16, 2018

(54) SYSTEMS, METHODS AND INTERFACES FOR DATA VIRTUALIZATION

(71) Applicant: SanDisk Technologies, Inc., Plano, TX (US)

(72) Inventors: Swaminathan Sundararaman, San Jose, CA (US); Nisha Talagala, Livermore, CA (US); Sriram Subramanian, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 266 days.

(21) Appl. No.: 14/253,645

(22) Filed: Apr. 15, 2014

(65) Prior Publication Data

US 2014/0310499 A1    Oct. 16, 2014

Related U.S. Application Data

(60) Provisional application No. 61/929,793, filed on Jan. 21, 2014, provisional application No. 61/812,695, filed on Apr. 16, 2013.

(51) Int. Cl.
*G06F 12/00* (2006.01)
*G06F 12/109* (2016.01)
(Continued)

(52) U.S. Cl.
CPC ........ *G06F 12/109* (2013.01); *G06F 12/0269* (2013.01); *G06F 17/30348* (2013.01); *G06F 2212/657* (2013.01)

(58) Field of Classification Search
CPC .............. G06F 12/109; G06F 12/0269; G06F 17/30348; G06F 2212/657
See application file for complete search history.

(56) References Cited

U.S. PATENT DOCUMENTS

| | | |
|---|---|---|
| 4,571,674 A | 2/1986 | Hartung |
| 5,193,184 A | 3/1993 | Belsan et al. |

(Continued)

FOREIGN PATENT DOCUMENTS

| | | |
|---|---|---|
| CN | 1771495 | 5/2006 |
| EP | 1418502 | 5/2004 |

(Continued)

OTHER PUBLICATIONS

State Intellectual Property Office, Office Action, CN Application No. 200780051020.X, dated Jul. 6, 2011.

(Continued)

*Primary Examiner* — Kalpit Parikh
(74) *Attorney, Agent, or Firm* — Kunzler, PC

(57) ABSTRACT

A data services module performs log storage operations in response to requests by storing data on one or more storage devices, and appending information pertaining to the requests to a separate metadata log. A log order of the metadata log may correspond to an order in which the requests were received, regardless of the order in which data of the requests are written to the storage devices. The requests may correspond to identifiers of a logical address space. The data services module implements an any-to-any translation layer configured to map identifiers of the logical address space to the stored data. The virtualization module may include a metadata management module configured to checkpoint the translation layer metadata by, inter alia, appending aggregate, checkpoint entries to the metadata log. The data services module may leverage the translation layer between the logical identifiers and underlying storage locations to efficiently implement logical manipulation operations.

18 Claims, 25 Drawing Sheets

(51) Int. Cl.
   *G06F 17/30*    (2006.01)
   *G06F 12/02*    (2006.01)

(56) References Cited

U.S. PATENT DOCUMENTS

| | | |
|---|---|---|
| 5,261,068 A | 11/1993 | Gaskins et al. |
| 5,307,497 A | 4/1994 | Feigenbaum et al. |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,553,261 A | 9/1996 | Hasbun et al. |
| 5,586,291 A | 12/1996 | Lasker |
| 5,594,883 A | 1/1997 | Pricer |
| 5,596,736 A | 1/1997 | Kerns |
| 5,598,370 A | 1/1997 | Nijima et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,794,253 A | 8/1998 | Norin et al. |
| 5,802,602 A | 9/1998 | Rahman et al. |
| 5,809,527 A | 9/1998 | Cooper et al. |
| 5,809,543 A | 9/1998 | Byers |
| 5,845,329 A | 12/1998 | Onishi et al. |
| 5,930,815 A | 7/1999 | Estakhri et al. |
| 5,957,158 A | 9/1999 | Volz et al. |
| 5,960,462 A | 9/1999 | Solomon et al. |
| 6,000,019 A | 12/1999 | Dykstal et al. |
| 6,014,724 A | 1/2000 | Jennett |
| 6,073,232 A | 6/2000 | Kroeker et al. |
| 6,101,601 A | 8/2000 | Matthews |
| 6,170,039 B1 | 1/2001 | Kishida |
| 6,170,047 B1 | 1/2001 | Dye |
| 6,173,381 B1 | 2/2001 | Dye |
| 6,185,654 B1 | 2/2001 | Van Doren |
| 6,209,088 B1 | 3/2001 | Reneris |
| 6,236,593 B1 | 5/2001 | Hong et al. |
| 6,256,642 B1 | 7/2001 | Krueger et al. |
| 6,279,069 B1 | 8/2001 | Robinson |
| 6,289,413 B1 | 9/2001 | Rogers et al. |
| 6,330,642 B1 | 12/2001 | Brown |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,523,102 B1 | 2/2003 | Dye et al. |
| 6,564,285 B1 | 5/2003 | Mills et al. |
| 6,587,915 B1 | 7/2003 | Kim |
| 6,601,211 B1 | 7/2003 | Norman |
| 6,625,684 B1 | 9/2003 | Cho et al. |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,776 B2 | 8/2004 | Arimilli et al. |
| 6,785,785 B2 | 8/2004 | Piccirillo et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,093,101 B2 | 3/2006 | Aasheim et al. |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,076,599 B2 | 7/2006 | Aasheim |
| 7,082,495 B2 | 7/2006 | DeWhitt et al. |
| 7,085,512 B2 | 7/2006 | Aasheim et al. |
| 7,085,879 B2 | 8/2006 | Aasheim et al. |
| 7,089,391 B2 | 8/2006 | Geiger et al. |
| 7,096,321 B2 | 8/2006 | Modha |
| 7,130,956 B2 | 10/2006 | Rao |
| 7,130,957 B2 | 10/2006 | Rao |
| 7,167,953 B2 | 1/2007 | Megiddo et al. |
| 7,171,536 B2 | 1/2007 | Chang et al. |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,254,686 B2 | 8/2007 | Islam et al. |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,328,307 B2 | 2/2008 | Hoogterp |
| 7,340,558 B2 | 3/2008 | Lee et al. |
| 7,340,566 B2 | 3/2008 | Voth et al. |
| 7,356,651 B2 | 4/2008 | Liu |
| 7,360,015 B2 | 4/2008 | Matthews et al. |
| 7,366,808 B2 | 4/2008 | Kano et al. |
| 7,395,384 B2 | 7/2008 | Sinclair |
| 7,398,348 B2 | 7/2008 | Moore et al. |
| 7,418,465 B1 | 8/2008 | Lewis et al. |
| 7,437,510 B2 | 10/2008 | Rosenbluth et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansal et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,620,773 B2 | 11/2009 | Nicholson et al. |
| 7,640,390 B2 | 12/2009 | Iwamura |
| 7,644,239 B2 | 1/2010 | Ergan et al. |
| 7,664,239 B2 | 1/2010 | Groff et al. |
| 7,657,717 B1 | 2/2010 | Karr et al. |
| 7,660,911 B2 | 2/2010 | McDaniel |
| 7,660,941 B2 | 2/2010 | Lee et al. |
| 7,669,019 B2 | 2/2010 | Fujibayashi et al. |
| 7,676,628 B1 | 3/2010 | Compton et al. |
| 7,702,873 B2 | 4/2010 | Griess et al. |

(56) References Cited

U.S. PATENT DOCUMENTS

| | | |
|---|---|---|
| 7,721,059 B2 | 5/2010 | Mylly et al. |
| 7,725,628 B1 | 5/2010 | Phan et al. |
| 7,831,783 B2 | 11/2010 | Pandit et al. |
| 7,853,772 B2 | 12/2010 | Chang et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,127,103 B2 | 2/2012 | Kano et al. |
| 8,135,900 B2 | 3/2012 | Kunimatsu et al. |
| 8,135,907 B2 | 3/2012 | Moore |
| 8,151,082 B2 | 4/2012 | Flynn et al. |
| 8,171,204 B2 | 5/2012 | Chow et al. |
| 8,214,583 B2 | 7/2012 | Sinclair |
| 8,392,428 B1 | 3/2013 | Bonwick et al. |
| 8,539,362 B2 | 11/2013 | Braam et al. |
| 8,627,005 B1 | 1/2014 | Bradford et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2003/0061296 A1 | 3/2003 | Craddock et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0003002 A1 | 1/2004 | Adelmann |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0120177 A1 | 6/2005 | Black |
| 2005/0141313 A1 | 6/2005 | Gorobets |
| 2005/0144360 A1* | 6/2005 | Bennett .............. G06F 11/1072 711/103 |
| 2005/0177687 A1 | 8/2005 | Rao |
| 2005/0193166 A1 | 9/2005 | Johnson et al. |
| 2005/0216653 A1* | 9/2005 | Aasheim .............. G06F 3/0619 711/103 |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0268359 A1 | 12/2005 | Mach et al. |
| 2005/0273476 A1 | 12/2005 | Wertheimer et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0129778 A1 | 6/2006 | Clark et al. |
| 2006/0136657 A1 | 6/2006 | Rudelic et al. |
| 2006/0143396 A1 | 6/2006 | Cabot |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2007/0008852 A1 | 1/2007 | Kobayashi |
| 2007/0016699 A1 | 1/2007 | Minamii |
| 2007/0022148 A1 | 1/2007 | Akers et al. |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0069318 A1 | 3/2007 | Chow et al. |
| 2007/0088666 A1 | 4/2007 | Saito |
| 2007/0118676 A1 | 5/2007 | Kano et al. |
| 2007/0118713 A1 | 5/2007 | Guterman |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets et al. |
| 2007/0147356 A1 | 6/2007 | Gorobets |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0233937 A1 | 10/2007 | Coulson et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0274150 A1 | 11/2007 | Gorobets |
| 2007/0300008 A1 | 12/2007 | Rogers et al. |
| 2008/0010395 A1 | 1/2008 | Mylly et al. |
| 2008/0052377 A1 | 2/2008 | Light |
| 2008/0052477 A1 | 2/2008 | Lee |
| 2008/0091876 A1 | 4/2008 | Fujibayashi et al. |
| 2008/0109543 A1 | 5/2008 | Abanami et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0209090 A1 | 5/2008 | Esmaili et al. |
| 2008/0140737 A1 | 6/2008 | Garst et al. |
| 2008/0155169 A1 | 6/2008 | Hiltgen et al. |
| 2008/0109090 A1 | 8/2008 | Kano et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0294847 A1 | 11/2008 | Maruyama |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089483 A1* | 4/2009 | Tanaka .................. G06F 3/0608 711/103 |
| 2009/0089485 A1 | 4/2009 | Yeh |
| 2009/0125650 A1 | 5/2009 | Sebire |
| 2009/0125700 A1 | 5/2009 | Kisel |
| 2009/0150599 A1* | 6/2009 | Bennett .............. G06F 11/1441 711/103 |
| 2009/0150605 A1* | 6/2009 | Flynn .................... G06F 3/0613 711/112 |
| 2009/0150641 A1 | 6/2009 | Flynn et al. |
| 2009/0172257 A1* | 7/2009 | Prins .................... G06F 13/1657 711/103 |
| 2009/0228637 A1 | 9/2009 | Moon |
| 2009/0248763 A1 | 10/2009 | Rajan |
| 2009/0249001 A1 | 10/2009 | Narayanan et al. |
| 2009/0276588 A1 | 11/2009 | Murase |
| 2009/0276654 A1 | 11/2009 | Butterworth |
| 2009/0287887 A1 | 11/2009 | Matsuki |
| 2009/0292861 A1 | 11/2009 | Kanevsky et al. |
| 2009/0294847 A1 | 11/2009 | Maruyama et al. |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0313503 A1* | 12/2009 | Atluri .................. G06F 11/1453 714/19 |
| 2009/0327602 A1 | 12/2009 | Moore et al. |

(56) References Cited

U.S. PATENT DOCUMENTS

| | | |
|---|---|---|
| 2009/0327804 A1 | 12/2009 | Moshayedi |
| 2010/0005228 A1 | 1/2010 | Fukutomi |
| 2010/0017556 A1 | 1/2010 | Chin |
| 2010/0023674 A1 | 1/2010 | Aviles |
| 2010/0023676 A1 | 1/2010 | Moon |
| 2010/0023682 A1 | 1/2010 | Lee |
| 2010/0030946 A1 | 2/2010 | Kano et al. |
| 2010/0076936 A1 | 3/2010 | Rajan |
| 2010/0095059 A1 | 4/2010 | Kisley et al. |
| 2010/0153617 A1 | 6/2010 | Miroshnichenko et al. |
| 2010/0169542 A1 | 7/2010 | Sinclair |
| 2010/0191713 A1* | 7/2010 | Lomet .............. G06F 17/30362 707/704 |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0263894 A1 | 10/2010 | Swing et al. |
| 2011/0022819 A1 | 1/2011 | Post et al. |
| 2011/0119455 A1 | 5/2011 | Tsai et al. |
| 2011/0153977 A1 | 6/2011 | Root et al. |
| 2012/0011340 A1* | 1/2012 | Flynn .................. G06F 12/0246 711/171 |
| 2012/0030408 A1 | 2/2012 | Flynn et al. |
| 2012/0137303 A1* | 5/2012 | Okada .................. G06F 3/0608 718/104 |
| 2013/0144844 A1 | 6/2013 | Ito et al. |
| 2013/0227236 A1 | 8/2013 | Flynn et al. |
| 2013/0311990 A1 | 11/2013 | Chuanbin et al. |
| 2013/0332660 A1* | 12/2013 | Talagala .............. G06F 12/0246 711/103 |
| 2014/0089264 A1 | 3/2014 | Talagala et al. |
| 2014/0089265 A1 | 3/2014 | Talagala et al. |
| 2014/0215127 A1* | 7/2014 | Perrin .............. G06F 17/30368 711/103 |
| 2014/0344507 A1 | 11/2014 | Piggin et al. |

FOREIGN PATENT DOCUMENTS

| | | |
|---|---|---|
| EP | 1814039 | 3/2009 |
| GB | 0123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO1994019746 | 9/1994 |
| WO | WO1995018407 | 7/1995 |
| WO | WO199612225 | 4/1996 |
| WO | 0201365 A2 | 1/2002 |
| WO | WO200201365 | 1/2002 |
| WO | WO2004099989 | 11/2004 |
| WO | WO2005103878 | 11/2005 |
| WO | 2006062511 A1 | 6/2006 |
| WO | WO2006062511 | 6/2006 |
| WO | WO2006065626 | 6/2006 |
| WO | WO2008130799 | 3/2008 |
| WO | WO2008070173 | 6/2008 |
| WO | WO2008073421 | 6/2008 |
| WO | 2008130799 A1 | 10/2008 |
| WO | WO2011106394 | 9/2011 |

OTHER PUBLICATIONS

State Intellectual Property Office, Office Action, CN Application No. 200780051020.X, dated Nov. 7, 2011.
State Intellectual Property Office, Office Action, CN Application No. 200780050970.0, dated Oct. 28, 2010.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
United States Patent Office, Final Office Action, U.S. Appl. No. 11/952,109, dated Nov. 29, 2011.
United States Patent Office, Office Action, U.S. Appl. No. 11/952,113, dated Mar. 6, 2012.
United States Patent Office, Office Action, U.S. Appl. No. 11/952,113, dated Dec. 15, 2010.
United States Patent Office, Office Action, U.S. Appl. No. 11/952,109, dated May 1, 2012.
U.S. Appl. No. 60/912,728, published as U.S. Application Publication No. 20080263305 on Oct. 23, 2008.
USPTO, Notice of Allowance for U.S. Appl. No. 12/986,117, dated Apr. 4, 2013.
USPTO, Notice of Allowance for U.S. Appl. No. 12/986,117 dated Jun. 5, 2013.
USPTO, Office Action for U.S. Appl. No. 12/879,004 dated Feb. 25, 2013.
USPTO, Office Action for U.S. Appl. No. 13/607,486 dated Jan. 10, 2013.
USPTO, Office Action for U.S. Appl. No. 12/711,113, dated Jun. 6, 2012.
USPTO, Office Action for U.S. Appl. No. 12/711,113, dated Nov. 23, 2012.
USPTO, Office Action for U.S. Appl. No. 13,607,486 dated May 2, 2013.
USPTO, Office Action for U.S. Appl. No. 13/118,237 dated Apr. 22, 2013.
USPTO, Office Action for U.S. Appl. No. 13/424,333 dated Mar. 17, 2014.
USPTO, Office Action for U.S. Appl. No. 14/030,717 dated Apr. 11, 2014.
USPTO, Office Action, U.S. Appl. No. 11/952,109, dated Nov. 29, 2011.
Van Hensbergen, "Dynamic Policy Disk Caching for Storage Networking," IBM Research Division, RC24123, Nov. 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wikipedia, "Object Storage Device," http://en.wikipedia.org/wiki/Object-storage-device, last visited Apr. 29, 2010.
WIPO, International Preliminary Report of Patentability for PCT/US2007/086691, dated Feb. 16, 2009.
WIPO, International Preliminary Report on Patentability for PCT/US2007/025048, dated Jun. 10, 2009.
WIPO, International Preliminary Report on Patentability for PCT/US2007/059048, dated Oct. 20, 2009.
WIPO, International Preliminary Report on Patentability for PCT/US2007/086687, dated Mar. 18, 2009.
WIPO, International Preliminary Report on Patentability for PCT/US2007/086688, dated Mar. 16, 2009.
WIPO, International Preliminary Report on Patentability for PCT/US2007/086701, dated Mar. 16, 2009.
WIPO, International Preliminary Report on Patentability for PCT/US2010/048325, dated Mar. 13, 2012.
WIPO, International Search Report and Written Opinion for PCT/US11/65927, dated Aug. 28, 2012.
WIPO, International Search Report and Written Opinion for PCT/US2010/048325, dated Jun. 1, 2011.

(56) References Cited

OTHER PUBLICATIONS

WIPO, International Search Report and Written Opinion for PCT/US2011/025885, dated Sep. 28, 2011.
WIPO, International Search Report and Written Opinion for PCT/US2007/025048, dated May 27, 2008.
WIPO, International Search Report and Written Opinion for PCT/US2007/086687, dated Sep. 5, 2008.
WIPO, International Search Report and Written Opinion for PCT/US2007/086691, dated May 8, 2008.
WIPO, International Search Report and Written Opinion for PCT/US2007/086701, dated Jun. 5, 2008.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yerrick, "Block Device," http://www.pineight.com/ds/block, last visited Mar. 1, 2010.
Zhang et al., "De-indirection for Flash-based SSDs with Nameless Writes," Usenix InFast 2012 (Feb. 14, 2012).
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
AGIGATECH, "Bulletproof Memory for RAID Servers, Part 1," http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Arpaci-Dusseau, "Nameless Writes," HotStorage '10, Boston, MA, Jun. 2010.
Asine, "ASPMC-660 Rugged IDE Flash Drive PMC Module", http://www.asinegroup.com/products/aspmc660.html, copyright 2002, visited Nov. 8, 2009.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Bonnet et al., "Flash Device Support for Database Management," published at the 5th Biennial Conference on Innovative Data Systems Research (CIDR '11), held in Asilomar, California, on Jan. 9-12, 2011.
Brandon, Jr., "Sparse Matrices in CS Education," Journal of Computing Sciences in Colleges, vol. 24 Issue 5, May 2009, pp. 93-98.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Dan, "Implementing MLC NAND Flash for Cost-Effective, High-Capacity Memory," M-Systems, White Paper, 91-SR-014-02-8L, Rev 1.1, Sep. 2003.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
European Patent Office, Office Action, EP Application No. 07865345.8, dated Nov. 17, 2010.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gutmann, "Secure Deletion of Data from Magnetic and Solid-State Memory", Usenix, 14 pages, San Jose, CA, published Jul. 1, 1996.
Hensbergen, IBM Research Report, "Dynamic Policy Disk Caching for Storage Networking," IBM Research Division, Computer Science, RC24123, Nov. 28, 2006.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, STMicroelectronics, "Open NAND Flash Interface Specification," Revision 2.0, Feb. 27, 2008.
Hystor: "Making SSDs the Survival of the Fittest in High-Performance Storage Systems," ics10-Paper 102, Feb. 2010.
IBM, "Method to Improve Reliability of SSD Arrays," Nov. 2009.
Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Mesnier, "Object-Based Storage," IEEE Communications Magazine, Aug. 2003, pp. 84-90.
Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand_101.pdf, 2006, visited May 10, 2010.
Micron, "TN-29-08: Technical Note, Hamming Codes for NAND Flash Memory Devices," Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Novell, "File System Primer", http://wiki.novell.com/index.php/File_System_Primer, 2006, visited Oct. 18, 2006.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/training/ss/lecture/new-documents/Lectures/15-CacheManager/CacheManager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.

(56) References Cited

OTHER PUBLICATIONS

Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/UploadedDocuments/docs2008/e07154r6-Data_Set_Management_Proposal_for_ATA-ACS2.pdf, printed Apr. 5, 2010.
Singer, "Implementing MLC NAND Flash for Cost-Effective, High Capacity Memory," M-Systems, White Paper, 91-SR014-02-8L, Rev. 1.1, Sep. 2003.
Spansion, "Data Management Software (DMS) for AMD Simultaneous Read/Write Flash Memory Devices", published Jul. 7, 2003.
Spillane "Enabling Transactional File Access via Lightweight Kernel EXtensions", Stony Brook University, IBM T. J. Watson Research Center, published Feb. 25, 2009.
State Intellectual Property Office, Office Action, CN Application No. 200780050983.8, dated May 18, 2011.
State Intellectual Property Office, Office Action, CN Application No. 200780050970.0, dated Jan. 5, 2012.
State Intellectual Property Office, Office Action, CN Application No. 200780051020.X, dated Nov. 11, 2010.
Application No. PCT/US2015/012301, International Search Report and Written Opinion, dated Apr. 29, 2015.
Application No. PCT/US2012/024930, International Preliminary Report on Patentability, dated Aug. 13, 2013.
Application No. 200780050970.0, Office Action, dated Jun. 29, 2011.
U.S. Appl. No. 14/030,717, Office Action, dated Apr. 11, 2014.
"Couchbase Server Manual 1.8", Couchbase, pp. 157, Feb. 13, 2012.
"Object Storage Device", Wikipedia, pp. 42, downloaded Apr. 29, 2010.
U.S. Appl. No. 13/830,809, Office Action, dated Aug. 24, 2015.
Final Office Action, U.S. Appl. No. 13/830,809 dated Apr. 21, 2016.
U.S. Appl. No. 14/253,721 Non-Final Office Action dated Sep. 22, 2016.
PCT/US2015/012301 International Preliminary Report on Patentability dated Aug. 4, 2016.
PCT/US2011/065927 International Preliminary Report on Patentability dated Aug. 28, 2012.
U.S. Appl. No. 14/253,721 Final Office Action dated Apr. 20, 2017.
U.S. Appl. No. 13/830,809 Office Action dated Apr. 21, 2017.
U.S. Appl. No. 13/939,992 Non-Final Office Action dated Apr. 5, 2016.
U.S. Appl. No. 14/253,721 Non-Final Office Action dated Aug. 10, 2017.

* cited by examiner

SYSTEMS, METHODS AND INTERFACES FOR DATA VIRTUALIZATION

TECHNICAL FIELD

This disclosure relates to storage systems and, in particular, to systems, methods and apparatus for data virtualization.

BRIEF DESCRIPTION OF THE DRAWINGS

FIG. 6F depicts further embodiments of snapshot management operations;

DETAILED DESCRIPTION

Figure 1A:
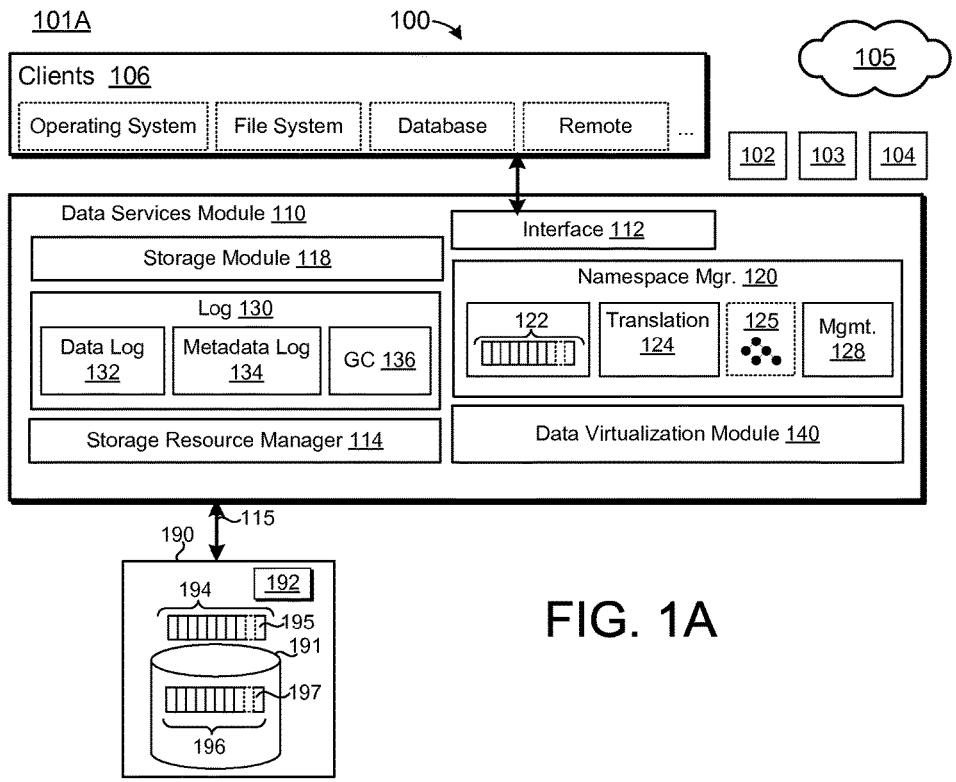
FIG. 1A is a block diagram of one embodiment of a computing system comprising a data services module.

An I/O data services module may be configured to provide I/O services to one or more clients by use of one or more lower-level I/O resources. As used herein, a lower-level I/O resource refers to any device, service, module, and/or layer capable of servicing an I/O request. Accordingly, a storage resource may include, but is not limited to: a hard drive (e.g., magnetic storage medium), battery-backed Random Access Memory (RAM), solid-state storage medium, disk array (e.g., a redundant array of inexpensive disks (RAID)), Storage Area Network (SAN), logical unit (e.g., a Small Computer System Interface (SCSI) compliant storage resource), virtual logical unit, and/or the like.

The I/O data services module may maintain one or more upper-level I/O namespace(s), which may include, but are not limited to: a set, collection, range, and/or extent of data references and/or identifiers; a set, collection, range, and/or extent of addresses (e.g., sector addresses, block addresses, logical block addresses, and/or the like); a storage namespace; a file system namespace; and/or the like. The I/O data services module may comprise a namespace manager configured to link identifiers of the upper-level I/O namespace(s) to lower-level I/O resources by use of, inter alia, virtualization metadata, including any-to-any mappings between identifiers of upper-level I/O namespaces and identifiers of the lower-level I/O resource(s). In some embodiments, an upper-level I/O namespace may correspond to two or more different storage resources. Accordingly, the I/O data services module may be configured to combine multiple lower-level I/O namespaces into an aggregate upper-level I/O namespace. Alternatively, or in addition, two or more upper-level I/O namespaces may map to the same storage resource.

In some embodiments, the I/O data services module includes a storage module configured to log I/O operations. The storage module may be configured to log I/O operations in a virtualized data log. As used herein, a virtual data log (VDL) refers to a log corresponding to a front-end, upper-level I/O namespace, such that the VDL comprises segments defined within front-end interfaces of one or more storage resources. The VDL may correspond to a data stream comprising data of I/O requests serviced by the data services module. The VDL may comprise upper-level log segments corresponding to respective sets, collections, ranges, and/or extents within one or more lower-level namespaces. Appending data to the VDL may, therefore, comprise appending data sequentially within the I/O namespace of an I/O resource. In some embodiments, the data services module may comprise a plurality of VDLs, each having a different respective append point. Although specific embodiments of a VDL for storage of data of I/O requests is described herein, the disclosure is not limited in this regard and could be adapted to use any suitable structure to store that data. Exemplary data storage structures include, but are not limited to, logging and/or journaling mechanisms, including, but not limited to: key-value storage systems, write out-of-place storage systems, write-anywhere data layouts, journaling storage systems, object-based storage systems, and/or the like.

The log module may further comprise a garbage collector configured to reclaim segments of the VDL (and/or other logs, such as the metadata log, disclosed in further detail herein). The garbage collector may comprise: a garbage collector (GC) scanner configured to distinguish valid data from data that does not need to be retained within the log(e.g., invalid data), a GC relocation strategy module configured to determine a plan for relocating valid data within one or more log segments being reclaimed to other segments of the log, and a GC implementation module configured to execute the determined relocation plan. The GC implementation module may be configured to implement the relocation plan in accordance with properties and/or characteristics of the underlying storage resources. A storage resource may, for example, support logical move operations (disclosed in further detail herein), and the GC implementation module may relocate data using a supported logical move operation rather than re-writing the data on the storage resource.

The I/O data services module may further comprise a metadata log, which may be maintained separately from the VDL. The metadata log may maintain a persistent, ordered record of mappings between identifiers in upper-level I/O namespace(s) of the I/O data services module and identifiers of corresponding storage resources. The metadata log preserves and maintains a temporal ordering of I/O operations performed by the I/O data services module (e.g., a "log order" of the metadata log). As used herein, "log order" refers to an ordered sequence of information in a log data structure (e.g., the order of data within the log). The log order of the metadata log may correspond to an order in which I/O operations were received at the data services module 110. Since the metadata log maintains temporal ordering of the I/O operations, the corresponding data storage operations performed in the VDL may be free from time ordering constraints (e.g., may be performed out-of-order). In some embodiments, the metadata log is maintained separately from the VDL (e.g., in a separate I/O namespace, on a separate storage resource, and/or the like). Although specific embodiments of a metadata log are described herein, the disclosure is not limited in this regard and could be adapted to maintain mapping metadata using any suitable metadata storage technique including, but not limited to: key-value storage mechanisms, journaling storage mechanisms, and/or the like.

The log(s) maintained by the I/O data services module may comprise segments corresponding to respective sets, collections, ranges, and/or extents of identifiers within respective namespace(s) of one or more storage resources. A translation module may be configured to bind (e.g., associate, map, tie, connect, relate, etc.) identifiers of I/O namespace(s) to respective storage resources by use of, inter alia, virtualization metadata. In some embodiments, the virtualization metadata comprises a forward map comprising any-to-any mappings between upper-level identifiers of the virtualization layer, and identifiers of respective storage resources. The virtualization index may comprise any suitable data structure including, but not limited to: a map, a hash map, a tree data structure, a binary tree (B-Tree), an n-ary tree data structure (B+ Tree), a range encoded tree, a radix tree, and/or the like. The virtualization index may be maintained in volatile memory. In some embodiments, the translation module is configured to map LIDs to virtual blocks that correspond to groups of one or more virtual addresses. The virtual blocks may be adapted to provide a desired storage granularity (e.g., block size). The data services module may be configured to persist portions of the virtualization index to ensure that the mappings of the virtualization index are persistent and/or crash safe. The data services module may comprise a reconstruction module configured to rebuild the virtualization index using the contents of one or more VDLs and/or metadata log. As above, although particular embodiments of a VDL (and metadata log) are described herein, the disclosure is not limited in this regard and could be adapted to use any suitable storage, logging, and/or journaling mechanisms.

The data services module may be configured to maintain mapping metadata in an ordered metadata log. The metadata log may include mapping entries configured to associate LIDs with respective virtual addresses (and/or virtual blocks). The data services module may be further configured to implement efficient logical manipulation operations on data stored within the VDL. The logical manipulation operations may include, but are not limited to: logical move operations, logical copy operations, merge operations, and the like. Implementing the logical manipulation operations may comprise recording logical manipulation entries to the metadata log 160. Accordingly, logical manipulation operations may be implemented without modifying data in the VDL and/or without appending data to the VDL.

Disclosed herein are embodiments of an apparatus, comprising an interface module configured to receive input/output (I/O) requests pertaining to logical identifiers of a logical address space, a storage module configured to store data corresponding to one or more of the I/O requests by way of a storage resource, and/or a data services module configured to record logical manipulation entries corresponding to modifications to associations between logical identifiers and data stored on the storage resource. The logical manipulation entries may be recorded in a metadata log. The metadata log may further comprise mapping entries corresponding to associations between logical identifiers and data stored on the storage resource.

The disclosed apparatus may further include a translation module configured to manage a logical interface to data stored on the storage resource by mapping logical identifiers to virtual identifiers of the storage resource. As used herein, a "logical interface" to data stored on a storage resource refers to a handle, an identifier, a path, a process, or other mechanism(s) for referencing and/or interfacing with the data. A logical interface may include, but is not limited to: an address, an identifier, a logical identifier, a logical block address (LBA), a virtual storage unit address, a range or extent of identifiers, a reference (e.g., a link between logical identifiers, a pointer, etc.), and/or the like. The virtual identifiers may correspond to respective physical storage units comprising the data stored on the storage resource. The data services module may be configured to modify the logical interface of the data stored on the storage resource in response to one or more I/O requests. The data services module may be configured to modify the logical interface by changing a mapping between logical identifiers and respective virtual identifiers and appending a logical manipulation entry that records the changed mapping to the metadata log. In some embodiments, mappings between logical identifiers and respective virtual identifiers are independent of relationships between the virtual identifiers and respective physical storage units comprising the data stored on the storage resource. The mapping entries may comprise associations between logical identifiers and virtual blocks, wherein the virtual blocks correspond to respective groups of two or more virtual addresses of a front-end namespace of the storage resource, and wherein the virtual addresses correspond to physical storage units of the storage resource.

The translation module may be configured to maintain a forward map configured to associate logical identifiers of the logical address space with respective virtual identifiers of the storage resource. The apparatus may further include a logical move module configured to implement a logical move operation of data stored on the storage resource, wherein the data is stored at a physical storage address of the storage resource that corresponds to a first virtual identifier, and wherein the logical move operation includes a) updating the forward map to associate the first virtual identifier with a second, different logical identifier, and/or b) appending a logical manipulation entry to the metadata log corresponding to the logical move operation. The appended logical manipulation entry may be configured to indicate that the first virtual identifier is bound to the second, different logical identifier, and to indicate that the first logical identifier is unbound.

In some embodiments, the apparatus includes a logical replication module configured to implement a logical replication operation of data stored on the storage resource and mapped to a first logical identifier through a first virtual address, wherein the logical replication operation comprises a) updating the forward map to associate the first virtual identifier with a second, different logical identifier, and/or b) appending a logical manipulation entry to the metadata log, such that the metadata log indicates that the first virtual address is associated with both the first logical identifier and the second, different logical identifier. The disclosed apparatus may comprise a snapshot module configured to create a snapshot of a first set of identifiers within the logical address space by writing a logical manipulation entry to the metadata log. The appended logical manipulation entry may be configured to tie a second set of identifiers to data tied to the first set of identifiers.

Embodiments of the disclosed apparatus may comprise a metadata log module configured to order entries appended to the metadata log, such that the order of the entries within the metadata log corresponds to an order in which I/O requests pertaining to the entries are received. The data services module may be configured to acknowledge completion of an I/O request in response to appending an entry corresponding to the I/O request to the metadata log.

The disclosed apparatus may further include a data log module configured to append data of the one or more I/O requests to a data log comprising a plurality of storage resources. The metadata log may be maintained on a storage resource that is separate from the storage resources comprising the data log. The data log module may be configured to append data to the data log in an order that differs from an order in which I/O requests corresponding to the data are received.

Disclosed herein are embodiments of a method for data virtualization, comprising writing data to a storage device in response to requests pertaining to a logical address space, maintaining logical interface metadata pertaining to data stored on the storage device, the logical interface metadata comprising mappings between identifiers of the logical address space and data stored on the storage device, and/or modifying a logical interface for a data segment stored on the storage device. Modifying the logical interface may comprise modifying a mapping pertaining to the data segment in the logical interface metadata, and appending a record to a persistent metadata log corresponding to the modified logical interface. The logical interface metadata may be configured to bind identifiers of the logical address space to respective intermediate identifiers, wherein the intermediate identifiers correspond to respective physical storage units of the storage device, and wherein writing the data comprises appending the data to segments of a virtual data log, wherein the segments comprise respective sets of intermediate identifiers.

The disclosed method may further include translating identifiers of the logical address space to identifiers of a virtual address space by use of the logical interface metadata, wherein virtual addresses of the virtual address space correspond to respective physical storage units of one of a plurality of storage devices. Modifying the logical interface of the data segment may comprise modifying a mapping of the logical interface metadata that is configured to bind a first logical identifier to the data segment through a particular virtual address, to bind the particular virtual address to a second, different logical identifier, and/or appending a record to the persistent metadata log that corresponds to the binding between the second, different logical identifier and the particular virtual address. In some embodiments, modifying the logical interface of the data segment further includes removing a mapping between the first identifier and the particular virtual address from the logical interface metadata. The persistent metadata log may indicate that the particular virtual address is bound to both the first logical identifier and the second, different logical identifier.

Disclosed herein are further embodiments of a method for data virtualization, which may include the operations of servicing requests pertaining to logical identifiers of a logical address space by appending data of the requests to a data log maintained on a storage device, translating logical identifiers of the logical address space to addresses of an intermediate translation layer, wherein the addresses of the intermediate translation layer correspond to respective storage units of the storage device, and/or altering a mapping between a logical identifier and an address of the intermediate translation layer in response to a request, wherein altering the mapping comprises appending a persistent note to a metadata log corresponding to the altered mapping. The operations may further comprise altering the mapping in response to a virtual copy operation, wherein the persistent note appended to the metadata log is configured to associate two or more identifiers of the logical address space to a single address of the intermediate translation layer. Alternatively, or in addition, the operations may include altering the mapping in response to a virtual move operation, wherein the persistent note is configured to replace an association between a first identifier of the logical address space and a particular address of the intermediate translation layer with an association between a second, different identifier of the logical address space and the particular address.

The disclosed method may comprise servicing an atomic storage request pertaining to a first, target set of logical identifiers by implementing storage operations corresponding to the atomic storage request in a second set of logical identifiers, wherein implementing the storage operations comprises binding logical identifiers of the second set to particular addresses within the intermediate translation layer, and altering mappings between logical identifiers and addresses of the intermediate translation layer to bind the first, target set of logical identifiers to the particular addresses. The persistent note may correspond to the bindings between the first, target set of identifiers and the particular set of addresses. The operations may further include performing a logical clone operation to associate the second set of logical identifiers with data associated with the first, target set of logical identifiers.

FIG. 1A is a block diagram of one embodiment 101A of a computing system 100 comprising data services module 110. The computing system 100 may comprise one or more computing devices, including, but not limited to, a server, a desktop, a laptop, an embedded system, a mobile device, and/or the like. In some embodiments, the computing system 100 may include multiple computing devices, such as a cluster of server computing devices. The computing system 100 may comprise processing resources 102, volatile memory resources 103 (e.g., RAM), and communication interface 104. The processing resources 102 may include, but are not limited to, general purpose central processing units (CPUs), application-specific integrated circuits (ASICs), and programmable logic elements, such as field programmable gate arrays (FPGAs), programmable logic arrays (PLGs), and the like. The communication interface 104 may be configured to communicatively couple the computing system 100 to a network 105. The network 105 may comprise any suitable communication network, including, but not limited to, a Transmission Control Protocol/Internet Protocol (TCP/IP) network, a Local Area Network (LAN), a Wide Area Network (WAN), a Virtual Private Network (VPN), or a Storage Area Network (SAN).

The data services module 110 (and/or modules, components, and/or features thereof) may be implemented in software, hardware, and/or a combination of software and hardware components. In some embodiments, portions of the data services module 110 are embodied as executable instructions stored on a non-transitory storage medium. The instructions may comprise computer program code configured for execution by the processing resources 102 of the computing system 100 and/or processing resources of other components and/or modules. The data services module 110, and/or portions thereof, may be implemented as a driver, a library, an interface, an application programming interface (API), and/or the like. Accordingly, portions of the data services module 110 may be accessed by and/or included within other modules, processes, and/or services (e.g., incorporated within a kernel layer of an operating system of the computing system 100). In some embodiments, portions of the data services module 110 are embodied as machine components, such as general and/or application-specific devices, including, but not limited to: processing components, interface components, hardware controller(s), storage controller(s), programmable hardware, FPGAs, ASICs, and/or the like.

The data services module 110 may be configured to provide I/O and/or storage services to clients 106. The clients 106 may include, but are not limited to, operating systems, file systems, journaling systems, key-value storage systems, database systems, applications, users, remote storage clients, and so on. The clients 106 may further include, but are not limited to: components of a virtualized computing environment, such as hypervisors, virtualization kernels, guest operating systems, virtual machines, and/or the like.

The services provided by the data services module 110 refer to storage and/or I/O services, which are not specific to virtualized computing environments, nor limited to virtualized computing platforms. As disclosed in further detail herein, the data services module 110 may be configured to service storage requests to write, read, and/or modify data stored on the storage resources 190A-N. The data services module 110 may be further configured to provide higher-level functionality to, inter alia, manipulate the logical interface to data stored on the storage resources 190A-N without requiring the stored data to be re-written and/or otherwise modified. As above, the "logical interface" to data refers to a handle, an identifier, a path, a process, or other mechanism(s) for referencing and/or interfacing with the data. A logical interface to data may, therefore, include bindings, associations, and/or ties between logical identifiers and data stored on one or more of the storage resources 190A-N. A logical interface may be used to reference data through a storage interface and/or application programming interface (API), such as the interface 112 of the data services module 110.

Manipulating the logical interface to data may include, but is not limited to: move operations configured to associate data with different set(s) of LIDs in the logical address space 122 (and/or in other address space(s)), replication operations configured to provide for referencing persistent data through two or more different sets of LIDs in the logical address space 122 (and/or in other address space(s)), merge operations configured to merge two or more sets of LIDs, and so on. Accordingly, manipulating the logical interface to data may comprise modifying existing bindings, ties, mappings and/or associations between the logical address space 122 and data stored on a storage resource 190A-N. The logical manipulation operations implemented by the data services module 110, in certain embodiments, are persistent and crash safe, such that the effect of the operations are preserved despite loss and/or corruption of volatile metadata (e.g., virtualization metadata, such as the forward map 125). Moreover, the logical manipulation operations may be implemented without modifying the persistent data in the VDL 150 and/or without appending data to the VDL 150. The data services module 110 may be further configured to leverage the logical manipulation operations disclosed herein to implement higher-level features, including, but not limited to: I/O transactions, atomic storage operations, vectored atomic storage operations, snapshots, data consistency (e.g., close-to-open file consistency), data collision management (e.g., key collision in key-value storage systems), de-duplication, data version management, and/or the like.

The data services module 110 may service I/O requests by use of one or more storage resources 190. As used herein, a "storage resource" refers to a storage device, layer, module, service, and/or the like that is capable of servicing I/O and/or storage requests. The storage resource 190 may be capable of storing data persistently on a storage medium 191. The storage resource 190 may comprise one or more storage devices or drives including, but not limited to: solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writeable optical drives (e.g., CD drives, DVD drives, Blu-ray drives, etc.), and/or the like. The storage medium 191 may include, but is not limited to: a magnetic storage medium, an optical storage medium, a solid-state storage medium, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide-based sub-10 nanometer process memory, graphene memory, Silicon-Oxide-Nitride-Oxide-Silicon (SONOS) memory, resistive RAM (RRAM), programmable metallization cell (PMC) memory, conductive-bridging RAM (CBRAM), and/or the like. Although particular embodiments of storage media are disclosed herein, the teachings of this disclosure could be applied to any suitable storage medium, including both non-volatile and volatile forms.

The storage resource 190 may comprise an interface configured to receive storage and/or I/O requests. The interface may comprise and/or correspond to a storage resource address space 194, which may include, but is not limited to: a namespace, a front-end interface, a virtual address space, a block address space, a logical address space, a LUN, a vLUN, and/or the like. The front-end interface of the storage resource (storage resource address space 194) may comprise a set, range, and/or extent of identifiers, which may include, but are not limited to: front-end identifiers, front-end addresses, virtual addresses, block addresses, logical block addresses, and/or the like. As used herein, the identifiers of the front-end storage resource address space 194 are referred to as virtual addresses 195. The storage resource address space 194 may be managed by, inter alia, a storage resource controller 192. The storage resource controller 192 may include, but is not limited to: a driver, an I/O interface, a storage interface (e.g., block device driver, interface, and/or API), a hardware controller, and/or the like.

The storage resource controller 192 may be configured to perform storage operations on respective storage units 197 of the storage medium 191. As used herein, a "storage unit" refers to a storage location capable of persistently storing data. The storage units 197 of the storage resource 190 may correspond to: blocks, sectors, pages, storage divisions (e.g., erase blocks), groups of storage locations (e.g., logical pages and/or offsets within a logical page), storage divisions (e.g., physical erase blocks, logical erase blocks, etc.), physical die, physical die plane(s), locations on a magnetic disk, battery-backed memory locations, and/or the like. The storage units 197 may be addressable within a storage media address space 196 (e.g., physical address space). The storage media address space 196 may include, but is not limited to: a set, range, and/or collection of storage unit addresses, a namespace, a back-end interface, a physical address space, a block address space, address offsets, and/or the like. The storage resource controller 192 may be configured to correlate virtual addresses 195 of the storage resource address space 194 with storage units 197 using, for example, deterministic one-to-one mappings (e.g., cylinder sector head (CHS) addressing), any-to-any mappings, an address translation layer, an index, a flash translation layer, and/or the like.

The data services module 110 may comprise a storage resource manager 114 configured to, inter alia, perform storage on the storage resource 190. The storage resource manager 114 may interface with the storage resource 190 by use of an interconnect 115, which may include, but is not limited to: a peripheral component interconnect (PCI), PCI express (PCI-e), Serial ATAttachment (serial ATA or SATA), parallel ATA (PATA), Small Computer System Interface (SCSI), IEEE 1394 (FireWire), Fiber Channel, universal serial bus (USB), and/or the like. In some embodiments, the storage resource 190 may comprise one or more remote storage devices that are communicatively coupled to the computing system 100 through the network 105 (and/or other communication interface, such as a Storage Area Network (SAN), a Virtual Storage Area Network (VSAN), and/or the like). The interconnect 115 may, therefore, comprise a remote bus, such as a PCI-e bus, a network connection (e.g., Infiniband), a storage network, a Fibre Channel Protocol (FCP) network, a HyperSCSI, and/or the like.

The data services module 110 may comprise an interface 112 through which clients 106 may access the I/O services and/or functionality. The interface 112 may include one or more block device interfaces, object storage interfaces, file storage interfaces, key-value storage interfaces, virtualized storage interfaces, VSUs, LUNs, vLUNs, storage namespaces, logical address spaces, virtual address spaces, database storage interfaces, and/or the like.

The data services module 110 may provide access to I/O and/or storage resources through an upper-level I/O namespace. As used herein, an "upper-level I/O interface" refers to an interface through which clients 106 may refer to I/O and/or storage services provided by the data services module 110. The data services module 110 comprises a namespace manager 120 configured to maintain the upper-level I/O namespace. In the FIG. 1A embodiment, the upper-level I/O namespace comprises a logical address space 122 comprising a group, set, collection, range, and/or extent of identifiers. As used herein, an "identifier" or a "logical identifier" (LID) refers to any identifier configured to reference an I/O resource. LIDs may include, but are not limited to, identifiers, names (e.g., file names, distinguished names, and/or the like), data identifiers, references, links, front-end identifiers, front-end addresses, logical addresses, LBA, storage unit addresses, VSU addresses, LUN addresses, vLUN addresses, unique identifiers, globally unique identifiers (GUIDs), and/or the like.

The logical capacity of the logical address space 122 may correspond to the number of LIDs in the logical address space 122 and/or the size and/or granularity of the storage resources referenced by the LIDs. The logical address space 122 managed by the data services module 110 may be independent of the underlying storage resources 190. Accordingly, in some embodiments, the logical address space 122 may be sparse and/or "thinly provisioned." As used herein, a thinly provisioned logical address space 122 refers to a logical address space 122 having a logical capacity that is independent of the physical storage capacity and/or granularity of corresponding storage resources 190 (e.g., exceeds the storage capacity of the storage resource 190). In one embodiment, the logical address space 122 comprises 64-bit LIDs (e.g., $2^{26}$ unique LIDs). As disclosed in further detail herein, the data services module 110 may leverage the large, thinly provisioned logical address space 122 to efficiently allocate and/or reference contiguous ranges of LIDs.

The namespace manager 120 may further include a translation module 124 configured to bind LIDs of the upper-level I/O namespace (logical address space 122) to front-end identifiers of a storage resource 190 by use of virtualization metadata. As used herein, virtualization metadata refers to metadata configured to, inter alia, manage mappings between identifiers of the logical address space 122 and virtual addresses of the storage resource(s) 190. In the FIG. 1A embodiment, the translation module 124 ties LIDs of the logical address space 122 to virtual addresses 195 of the storage resource 190 by use of a forward map 125. The forward map 125 may be configured to map any logical identifier to any virtual address 195. The translation module 124 may, therefore, correspond to an intermediate translation layer 121 between LIDs of the logical address space 122 and storage units 197 of the storage resource 190. A LID may map to one or more virtual addresses 195, which may be mapped to respective storage units 197.

In some embodiments, the forward map 125 is configured to map LIDs of the logical address space 122 to respective virtual addresses (e.g., one-to-one mappings). In such embodiments, LIDs of the logical address space 122 may correspond to respective storage units 197 of the storage resource 190. The LIDs may, therefore, correspond to and/or represent the same physical storage capacity as the underlying storage units 197. The storage resource 190 may, for example, have a block size of 1 kilobyte (kb), such that each storage unit 197 is capable of storing 1 kb of data. The LIDs of the logical address space 122 may, therefore, map to 1 kb blocks (e.g., each LID may correspond to 1 kb of storage capacity).

Figure 1B:
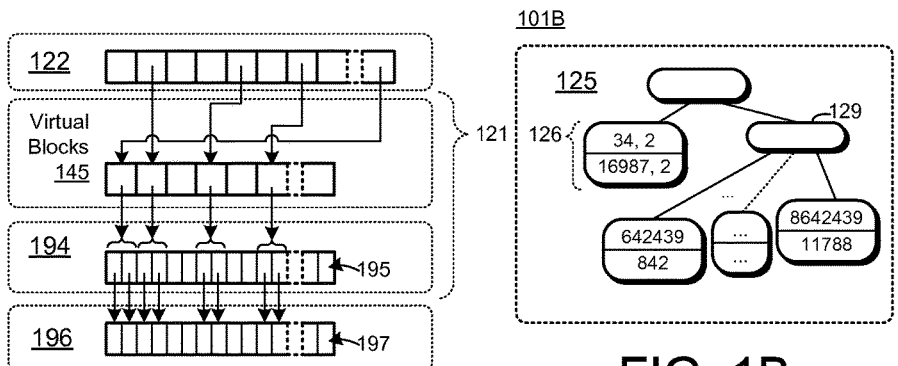
FIG. 1B depicts embodiments of virtualization metadata of a data services module.

In some embodiments, the translation module 124 is configured to manage LID-to-mappings in order to, inter alia, manage the physical storage capacity represented by the LIDs. As illustrated in FIG. 1B, the translation module 124 may be configured to map LIDs to respective virtual blocks 145, each of which may correspond to one or more virtual addresses 195. Accordingly, as used herein, a virtual block 145 refers to one or more virtual addresses 195. In the FIG. 1B embodiment, the virtual blocks 145 may correspond to two virtual addresses 195, such that the physical storage capacity represented by each virtual block 145 (and corresponding LID) is twice that of the underlying virtual addresses 195 and/or storage units 197. In the FIG. 1B embodiment, each LID may, therefore, correspond to and/or represent 2 kb of physical storage capacity. The translation module 124 may configure the virtual blocks 145 in accordance with a desired block size of the data services module 110. A larger effective block size may, for example, allow the data services module 110 to batch I/O requests, match a block size of one or more clients 106, and/or the like. Alternatively, or in addition, the data services module 110 may configure the virtual blocks 145 to utilize different storage resources 190 having different, respective block sizes, as disclosed in further detail herein. The translation module 124 may be further configured to translate between virtual blocks 145 and virtual addresses 195. In the two-to-one configuration of FIG. 1B, the translation module 124 may translate virtual addresses 195 to virtual blocks 145 by bitwise shifting the virtual address(es) 195 (e.g., removing the least significant address bit). Accordingly, each two virtual addresses 195 map to a respective virtual block 145. The corresponding virtual addresses 195 may be derived from virtual blocks 145 using a similar technique (e.g., appending a 0 and/or 1 to the virtual block address, respectively). The translation module 124 may be configured to perform similar address translations with different virtual block 145 ratios. For example, in a four-to-one mapping between virtual addressees 195 and virtual blocks 145, the translation module 124 may be configured to bitwise shift the virtual addresses 195 to remove the two least significant bits, and so on. Although particular embodiments of mechanisms for translating between virtual blocks 145 and virtual addresses 195 are described herein, the disclosure is not limited in this regard, and could be adapted to implement translations using any suitable mechanism including, but not limited to: an index, a map, a tree, a hashing algorithm, and/or the like. Accordingly, the virtual blocks 145 and/or virtual addresses 195 may comprise intermediate identifiers between the LIDs of the logical address space 122 and storage units 197 of the storage resource(s) 190. The data services module 110 may be configured to select a block size (e.g., configuration for the virtual blocks 145) based on any number of factors including, but not limited to: memory overhead (e.g., larger virtual blocks 145 may result in a fewer number of entries in the forward map 125), garbage collection complexity, sequential storage performance of the storage resource(s) 190, I/O properties of the clients 106 (e.g., preferred client block size), and/or the like.

As illustrated in embodiment 101B of FIG. 1B, the forward map 125 may comprise a tree data structure comprising entries 126 configured to associate LIDs and/or LID ranges with respective virtual blocks 145 and/or corresponding virtual addresses 195. In the FIG. 1B embodiment, the storage resource 190 may implement predetermined one-to-one mappings between virtual addresses 195 and storage units 197.

The forward map 125 may include an entry 126 configured to bind LID range 34, 2 to virtual blocks 16987, 2, an entry 126 configured to tie LID 642439 to virtual block 842, and an entry 126 that associates LID 8642439 with virtual block 11788. The translation module 124 may be configured to map virtual blocks 145 to virtual addresses 195 using a pre-determined algorithm based on, inter alia, the ratio between virtual addresses 195 and virtual blocks 145, as disclosed above. In some embodiments, the forward map 125 may be configured to index the entries 126 by LID and may be structured such that the entries 126 are leaf nodes within the B+ Tree data structure. The B+ Tree data structure may comprise intermediate reference nodes 129 to facilitate efficient lookup of the entries 126. The forward map 125 may be maintained in volatile memory resources 103 of the computing system. The data services module 110 may be configured to checkpoint the forward map 125 (e.g., store portions of the forward map 125 on non-volatile storage) in order to, inter alia, ensure that the forward map 125 is persistent and crash safe.

Figure 1C:
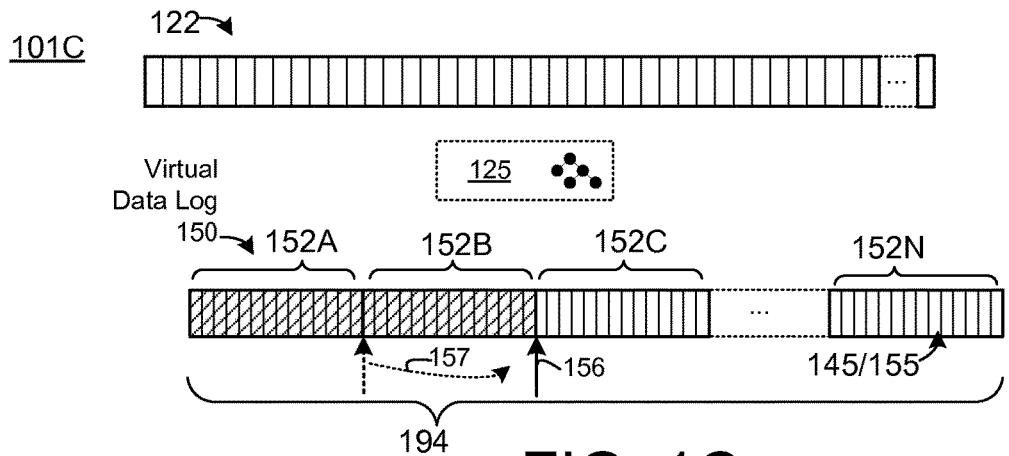
FIG. 1C depicts embodiments of log operations of a data services module.

The data services module 110 may be configured to service I/O requests by use of, inter alia, a storage module 118. The storage module 118 may be configured to store data pertaining to I/O requests received through the interface 112 on one or more storage resources 190. In some embodiments, the storage module 118 is configured to store data within a log on the storage resource 190 by use of a log module 130. The log module 130 may comprise a data log module 132 configured to manage a VDL 150, as illustrated in FIG. 1C. In the embodiment 101C of FIG. 1C, the VDL 150 may comprise a plurality of VDL segments 152A-N, which may comprise sets, ranges, and/or extents of log storage units 155. The log storage units 155 may correspond to respective virtual blocks 145, which, as disclosed above, may correspond to respective virtual addresses 195 of the storage resource address space 194. The translation module 124 may be configured to associate LIDs of the logical address space 122 with respective log storage units 155 (e.g., virtual blocks 145) by use of, inter alia, the forward map 125. The log storage units 155 may correspond to storage units 197 of the storage resource, as disclosed above.

The data log module 132 may be configured to append data within the log segments 152A-N according to a particular fill pattern and/or sequence. In some embodiments, the data log module 132 is configured to append data sequentially within the segments 152. The data log module 132 may be configured to maintain an append point 156 for the VDL 150. The append point 156 may correspond to the head of the VDL 150. The data log module 132 may be configured to append data at the log storage unit 155 corresponding to the append point 156, and then advance the append point 156 sequentially within the storage resource address space 194 (e.g., append data to log storage units 155 of a log segment 152 according to a particular order and/or sequence). Upon filling a log segment 152, the data log module 132 may advance the append point 156 to a next available VDL segment 152A-N. As used herein, an "available" VDL segment 152A-N refers to a VDL segment 152A-N that has been initialized and/or is capable of storing log data (e.g., is not currently in use to reference valid data that needs to be retained within the VDL 150). In the FIG. 1C embodiment, the data log module 132 has filled the VDL segment 152A (e.g., has written data to all of the log storage locations 155 in segment 152A). The data log module 132 may, therefore, advance 157 the append point 156 to a next available VDL segment 152B-N. The log segment 152B may be currently in use (is not initialized), and, as such, the data log module 132 may advance 157 the append point 156 to VDL segment 152C, which has been initialized and is ready for new append operations. After filling a last VDL segment 152N, the data log module 132 may wrap around the storage resource address space 194. Accordingly, the data log module 132 may treat the storage resource address space 194 as a circuit and/or cycle.

Figure 1D:
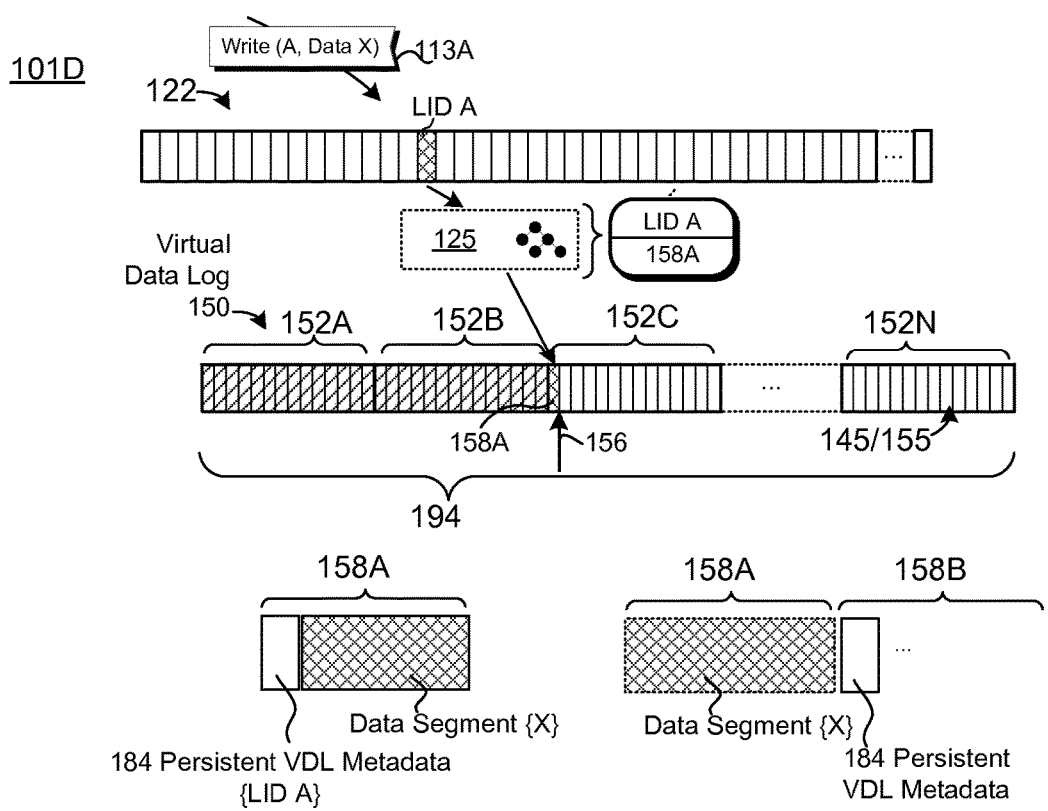
FIG. 1D depicts further embodiments of log operations.

The data log module 132 may be configured to service I/O requests by, inter alia, appending data to the VDL 150. FIG. 1D depicts one embodiment 101D of an operation to append data to the VDL 150. The append operation of FIG. 1D may be performed in response to an I/O request 113A. The I/O request 113A may comprise a request to write data to a LID within the logical address space 122 (e.g., write data X to LID A). The I/O request 113A may be received through the interface 112 of the data services module 110.

Servicing the I/O request 113A may comprise appending data to the VDL 150, which may comprise writing data X at the append point 156 within the VDL 150 (at log storage unit 158A). Servicing the I/O request 113A may further comprise creating an entry in the forward map 125 to bind LID A to the log storage unit 158A comprising the data X. In some embodiments, the data log module 132 may be further configured to store persistent metadata in the VDL 150 to persist the binding between LID A and storage location 158A. The data log module 132 may be configured to process data segments for storage within the VDL 150, which may comprise encapsulating data segments (data X) into containers, such as packets, that are configured to associate the data segments with persistent VDL metadata 184. As depicted in FIG. 1D, data stored in log storage location 158A may comprise a data segment (data X) with persistent metadata 184 configured to associate the data segment X with LID A. Alternatively, the data log module 132 may be configured to store a mapping note (e.g., persistent metadata 184) separately from data segment(s) and/or in separate data structures within the VDL 150. FIG. 1D depicts another embodiment of persistent metadata 184 stored within a different log storage location 158B than the log storage location 158A comprising the data X. The persistent metadata 184 may be configured to associate the data stored in log storage location 158A with the LID A, as disclosed above. Although particular embodiments of persistent VDL metadata 184 are taught herein, the disclosure is not limited in this regard and could be adapted to maintain persistent VDL metadata 184 and/or associations between persistent VDL metadata 184 and data segments within the VDL 150 using any suitable data structure and/or technique. Alternatively, or in addition, the data services module 110 may be configured to maintain metadata pertaining to the VDL 150 in a separate metadata log managed by the metadata log module 134. In such embodiments, data may be appended to the VDL 150 without persistent metadata 184 and/or without encapsulating the data in a container.

Figure 1E:
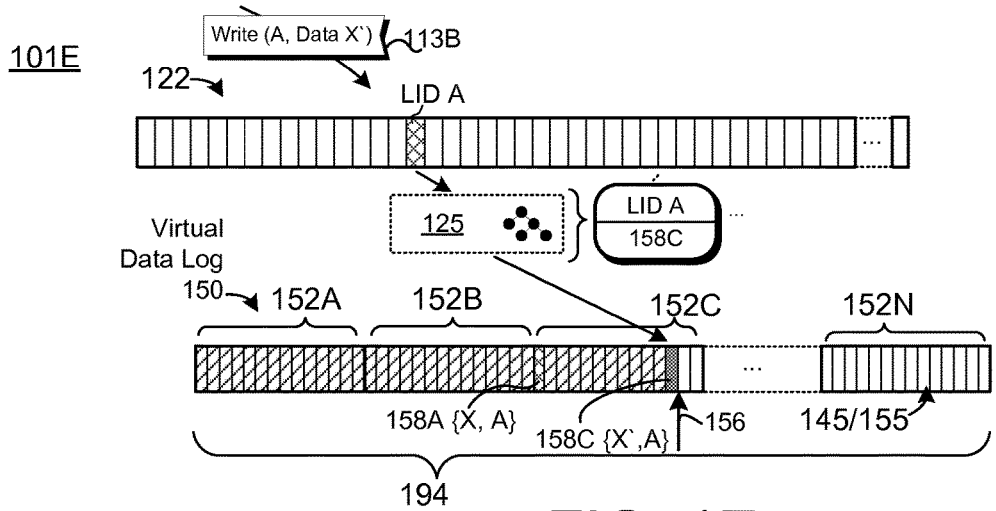
FIG. 1E depicts further embodiments of log operations.

The data services module 110 may be configured to perform storage operations out-of-place within the VDL 150. As used herein, performing storage operations "out-of-place" refers to performing storage operations that pertain to the same front-end identifiers (the same LIDs) at different log storage locations 155 within the VDL 150. Performing storage operations out-of-place may enable the data log module 132 to manage the VDL 150 as an append-only log structure. FIG. 1E depicts one embodiment 101E of an out-of-place storage operation pertaining to LID A. After servicing the I/O request 113A, the data log module 132 may continue servicing other I/O requests, which may comprise appending data to the VDL 150. The data services module 110 may receive a subsequent I/O request 113B pertaining to LID A. The I/O request 113B may correspond to modifying and/or overwriting the data associated with LID A (e.g., overwriting data X with data X'). In response, the data log module 132 may append data X' to the VDL 150 at a new log storage location 158C (at the current append point 156) rather than modifying the data "in-place" (e.g., instead of overwriting data X in storage location 158A). Servicing the I/O request 113B may further comprise binding LID A to the log storage location 158D comprising data X' using, inter alia, an entry in the forward map 125. The data X' may be stored with persistent metadata 184 configured to bind the data at log storage location 158D to LID A, as disclosed above.

The data log module 132 may be configured to maintain an order of data within the VDL 150. The data services module 110 may be configured to rebuild portions of the forward map 125 based on the data stored in the VDL 150. In some embodiments, the VDL segments 152A-N comprise respective VDL sequence metadata configured to define a relative order of the segments 152A-N in the VDL 150. The VDL sequence metadata may be assigned to VDL segments 152A-N when the segments 152A-N are initialized (by the garbage collector 136, as disclosed below), when the segments 152A-N are first used by the data log module 132, when the segments 152A-N are filled, and/or the like. Accordingly, the order of the VDL segments 152A-N may be independent of the underlying virtual blocks 145 (and/or corresponding virtual addresses 195) of the segments 152A-N. In some embodiments, the VDL sequence metadata is stored within the segments 152A-N themselves (e.g., in a header, footer, and/or the like). Alternatively, or in addition, the VDL sequence metadata may be stored in separate storage location(s), such as the metadata log, disclosed below.

The data log module 132 may be further configured to append data within the VDL segments 152A-N according to a predetermined order and/or pattern. The data log module 132 may, for example, be configured to increment the append point 156 sequentially within a range and/or extent of virtual blocks 145 (e.g., virtual addresses 195) corresponding to a particular VDL segment 152A-N. Accordingly, the relative order of data stored within log storage units 155 of the VDL 150 may be determined by use of: a) VDL sequence metadata of the corresponding VDL segment 152A-N and b) the relative order of the log storage unit 155 within the VDL segment 152A-N. In the FIG. 1E embodiment, the log storage unit 158D comprising data X' is later in the VDL log sequence than the log storage unit 158A comprising data X (based on the relative order of the log storage units 158A and 158C within the segment 152C). The data X' at log storage unit 158D may be distinguished from the invalid data of log storage unit 158A based on, inter alia, the relative order of the log storage units 158D and 158A in the VDL 150.

In some embodiments, the data log module 132 is configured to append data to the VDL 150 according to the order in which the corresponding I/O requests were received. The order of the VDL 150 may, therefore, correspond to a temporal and/or operational order of I/O requests. In other embodiments, the data log module 132 may not enforce strict temporal ordering in the VDL 150. The data log module 132 may be configured to service I/O requests out-of-order within the VDL 150 by, inter alia, queuing, buffering, and/or scheduling the I/O requests. I/O requests may be serviced out-of-order due to differences in storage resource performance and/or availability, quality of service (QoS) policies, and/or the like. The temporal order of I/O requests and/or operations may be maintained in a separate data structure, such as the metadata log, disclosed below.

Referring to FIG. 1E, appending data X' at log storage unit 158C may render the data in log storage unit 158A invalid. As used herein, "invalid data" refers to data that does not need to be retained by the data services module 110 (e.g., data that does not need to be persisted within the VDL 150 and/or on a storage resource 190). In some embodiments, the data log module 132 may be configured to maintain validity metadata, such as a bitmap and/or other data structure(s), configured to indicate the validity of log storage units 155 within respective segments 152A-N of the VDL 150. The data log module 132 may be configured to mark log storage units 155 invalid in response to I/O request(s), such as requests to modify and/or overwrite data out-of-place in the VDL 150, requests to deallocate, erase, delete, and/or TRIM data from the VDL 150, and/or the like. Servicing the I/O request 113B to write data X' to LID A may, therefore, comprise marking the log storage unit 158A invalid. Alternatively, or in addition, log segments 152 comprising invalid data may be identified by use of the forward map 125 (and/or other metadata). The data services module 110 may determine that log storage units 155, which are mapped to one or more LIDs in the forward map 125, correspond to valid data, and that log storage units 155 that do not exist in the forward map 125 are invalid. In the FIG. 1E embodiment, the forward map 125 binds LID A to log storage unit 158C; the log storage unit 158A is not referenced in the forward map 125 and, as such, may be identified as invalid.

Referring back to FIG. 1A, the log module 130 may comprise a garbage collector 136 configured to reclaim storage resources by, inter alia, removing invalid data from the VDL 150. The garbage collector 136 may be configured to reclaim VDL segments 152 by a) scanning the VDL 150 to identify VDL segments 152 to reclaim; and b) relocating valid data within the identified VDL segments 152 (if any). The garbage collector 136 may be further configured to re-initialize reclaimed VDL segments 152, which may comprise preparing the log segments 152 for use by the data log module 132.

The garbage collector 136 may be configured to distinguish valid data from invalid data by use of dedicated validity metadata pertaining to the VDL 150. Alternatively, or in addition, the garbage collector 136 may be configured to identify invalid data by use of the forward map 125 (and/or other mapping data structure(s)). As disclosed above, log storage units 155 that are bound to LIDs in the forward map correspond to valid data, and log storage units 155 that are unbound (do not correspond to a valid entry 126 in the forward map 125) correspond to invalid data. As disclosed in further detail herein, the garbage collector 136 may identify invalid data using a mark-and-sweep approach and/or other suitable technique (e.g., reference count).

The garbage collector 136 may be configured to relocate data from a VDL segment 152 that is being reclaimed by a) determining a relocation plan, and b) implementing the determined relocation plan. Determining a relocation plan may comprise identifying other log storage unit(s) 155 available to store the valid data. The identified storage unit(s) 155 may correspond to the current VDL append point 156. Alternatively, and as disclosed in further detail herein, data may be relocated to a different log, different storage resource 190, and/or the like. Implementing the determined relocation plan may comprise copying the data to the identified log storage units 155 (e.g., appending the valid data to the head of the VDL 150), moving the data to the identified log storage units 155, and/or the like.

Figure 1F:
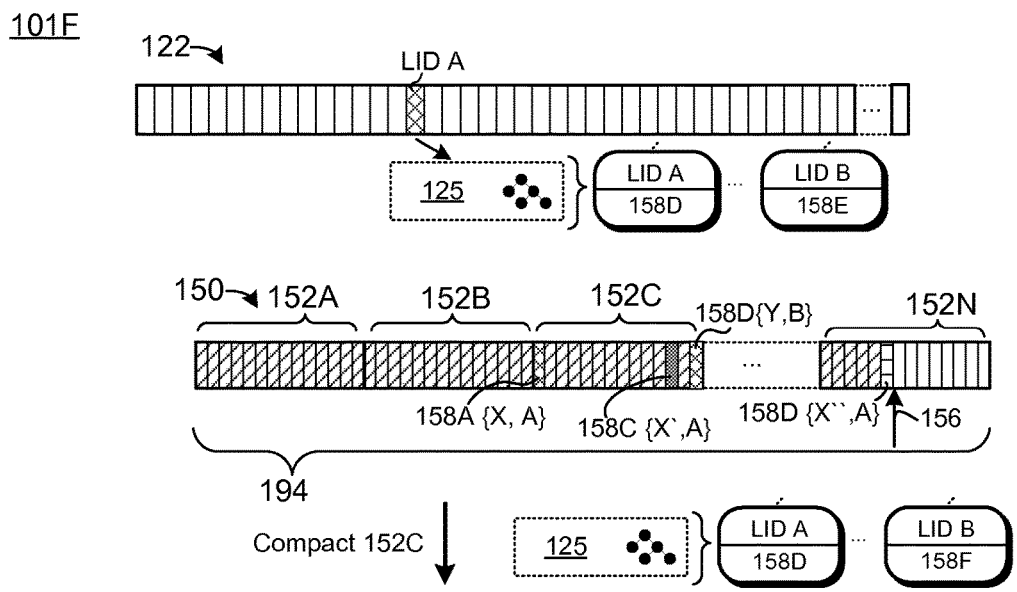
FIG. 1F depicts further embodiments of log operations.

FIG. 1F depicts one embodiment 101F of an operation to recover a segment 152 of the VDL 150. As illustrated in FIG. 1F, the data log module 132 may have written data X" to LID A at log storage unit 158D, rendering the data at log storage units 158A and 158C invalid. In addition, data of LID B was written to log storage location 158F of segment 152C. As used herein, compaction, garbage collection, recovery, and/or reclamation refers to an operation to prepare a segment 152 of the VDL 150 for reuse. As disclosed above, the garbage collector 136 may be configured to perform compaction operations by a) scanning the VDL 150 to identify segments 152 suitable for recovery, b) relocating valid data in the identified segments 152, and c) preparing the segments 152 for reuse.

The compaction operation of FIG. 1F may be configured to reclaim segment 152C. The segment 152C may comprise invalid data (e.g., data in log storage locations 158A and 158C) as well as valid data, including data of LID B stored in log storage unit 158D. Valid data may be identified by use of the mapping entries in the forward map 125, as disclosed herein. The compaction operation may comprise relocating valid data in the segment 152C. Relocating the valid data may comprise appending the valid data to the VDL 150 at the current append point 156. As illustrated in FIG. 1F, the data of LID B may be relocated to log storage unit 158F in segment 152N. Relocating the valid data may further comprise updating the forward map 125 to bind the relocated data to new log storage location(s) 155 (e.g., bind LID B to log storage location 158F).

The compaction operation may further comprise preparing the segment 152C for reuse (re-initializing the segment 152). Preparing the segment 152C may comprise marking the segment 152C as available to store new data, placing the segment 152C into a write queue, and/or the like. Preparing the segment 152C may further comprise erasing and/or deallocating storage resources associated with the segment 152C by, inter alia, informing the underlying storage resource 190 that data corresponding to segment 152C does not need to be retained. The segment 152C may be deallocated by use of coordination information communicated between the data services module 110 and the storage resource 190. The coordination information may comprise deallocation messages configured to identify the virtual blocks 145 (and/or corresponding virtual addresses 195) comprising the reclaimed segment 152C (e.g., TRIM messages, erase messages, erase commands, and/or the like).

Further embodiments of systems and methods for coordinating deallocation are disclosed in U.S. Pat. No. 8,261,005, entitled "Apparatus, System, and Method for Managing Data in a Storage Device with an Empty Data Token Directive," issued Sep. 4, 2012 to David Flynn et al., U.S. patent application Ser. No. 14/045,605, entitled "Systems and Methods for Persistent Address Space Management," filed Oct. 4, 2013 for David Atkisson et al., and U.S. patent application Ser. No. 14/075,951, entitled "Systems and Methods for Log Coordination," filed Nov. 8, 2013 for Nisha Talagala et al., each of which is hereby incorporated by reference in its entirety.

As disclosed herein, the data log module 132 may be configured to append data sequentially within respective segments 152 of the VDL 150. Accordingly, the relative order of data within a segment 152 may correspond to the relative address and/or offset of the data within the segment 152 (e.g., the relative address of the storage unit 155 comprising the data within the segment 152). Segments 152 of the VDL 150 may, for example, comprise M log storage units 155, and the data log module 132 may be configured to append data to the segments 152 sequentially from 1 to M. The relative order of data stored within a segment 152 may, therefore, be determined by the relative offset and/or address of data within the segment 152. Specifically, the relative order of data in a segment 152 ranges from the oldest data (earliest in time or earliest received) at log storage unit 1, to the most recent data in the segment in log storage unit M.

The data log module 132 may be further configured to maintain an ordered sequence of segments 152. As disclosed above, after filling the log storage units 155 of a segment 152, the data log module 132 may be configured to advance the append point 156 to a next available segment 152. The next available segment 152 may not correspond to the next sequential address in the storage resource address space 194. The next available segment 152 may be determined according to the availability of erased and/or initialized segments 152, as disclosed in further detail herein (e.g., segments 152 in a write queue). Accordingly, the next available segment 152 may be at a non-sequential storage address and/or on another storage resource 190 (as disclosed in further detail herein).

Figure 1G:
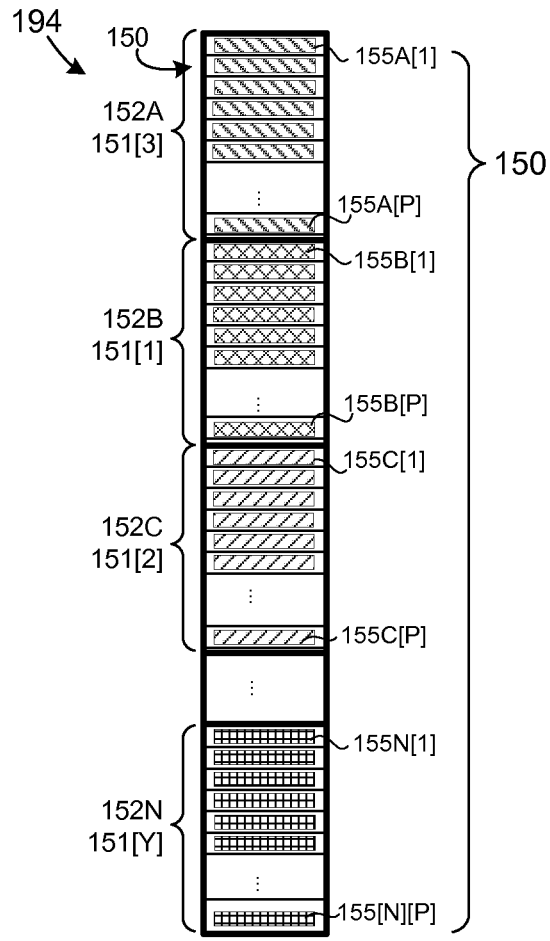
FIG. 1G depicts further embodiments of log operations.
Figure 1G:
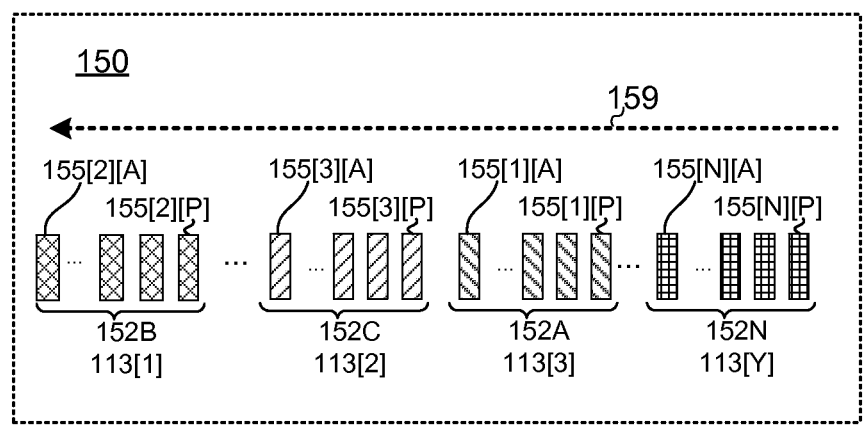

In the FIG. 1G embodiment 101G, the VDL 150 comprises segments 152A-N, each of which comprise P log storage units 155. As depicted in FIG. 1G, the data log module 132 may be configured to associate segments 152A-N of the VDL 150 with respective sequence metadata 151 (sequence metadata 151[1]-151[Y]). The sequence metadata 151 may be configured to define a log order of the segments 152A-N, which, in part, may be used to determine log order 159 of the VDL 150. As disclosed above, a "log order" of a log, such as the VDL 150, refers to an order of data stored within the log. The log order of the VDL 150 may, therefore, correspond to an order in which data is appended to the VDL 150.

In the FIG. 1G embodiment, the data log module 132 has appended data to log storage units 155A[1]-155A[P] sequentially in the storage address space of segment 152A (e.g., within the log storage units 152A[1]-152A[P]), such that the data stored in log storage unit 155A[P] is later in the log order 159 (more recent) relative to the data stored in log storage unit 155A[1]. FIG. 1G further illustrates data stored sequentially within log storage units 155 of other segments 152: segment 152B comprises data stored sequentially within log storage units 155B[1]-155B[P], segment 152C comprises data stored sequentially within log storage units 155C[1]-155C[P], segment 152N comprises data stored sequentially within log storage units 155N[1]-155N[P], and so on.

The data log module 132 may be configured to assign respective sequence information 151[1]-151[Y] to the segments 152A-N. The sequence information 151[1]-151[Y] may be configured to define the order in which the segments 152A-N were filled. Accordingly, the order in which the data was appended to the VDL 150 may be defined by, inter alia, sequence information 151[1]-151[Y] of the segments 152A-N and/or the relative addresses of the log storage locations 155 within the respective segments 152A-N. In some embodiments, the sequence information 151[1]-151[Y] may be stored on the storage resource 190 and/or in the VDL 150. In some embodiments, the sequence information 151[1]-151[Y] is stored at predetermined locations within the segments 152A-N (e.g., in a header, at a predetermined offset, and/or the like). The sequence information 151[1]-151[Y] may be stored when the segments 152A-N are prepared for use by the data log module 132 (e.g., re-initialized), when the segments 152[1]-152[N] are placed in a write queue, when the data log module 132 fills the respective segments 152A-N, and/or the like.

In the FIG. 1G embodiment, the sequence metadata 151[Y] may correspond to the most recently written (youngest) segment 152 in the VDL 150, and the sequence metadata 151[1] may correspond to the earliest (oldest) segment 152. Therefore, the log order 159 of the VDL 150 may be 152N (head of the log), 152A, 152C, to 152B (tail of the log). The order of the individual log storage locations 155 may be determined based on the sequence information 151[1]-151[Y] assigned to the segments 152 and the relative order of the log storage unit(s) 155 within the segments 152.

As disclosed above, the log storage operations performed by the data log module 132 may not be strictly ordered time. Accordingly, in some instances, data segments may be appended to the VDL 150 in a different order from the order in which the corresponding I/O requests were received by the data services module 110. The data log module 132 may append data out-of-order within the VDL 150 due to any number of conditions including, but not limited to: performance considerations, a QoS policy, availability of the data to be written to the VDL 150 (e.g., data source bandwidth, direct memory access (DMA) latency, and/or the like), back-end storage resource availability (e.g., bandwidth to/from storage resources 190), and/or the like. Moreover, and as disclosed in further detail herein, the VDL 150 may correspond to a plurality of different storage resources 190, which may have different performance characteristics, resulting in different latencies for I/O operations performed thereon.

Figure 1H:
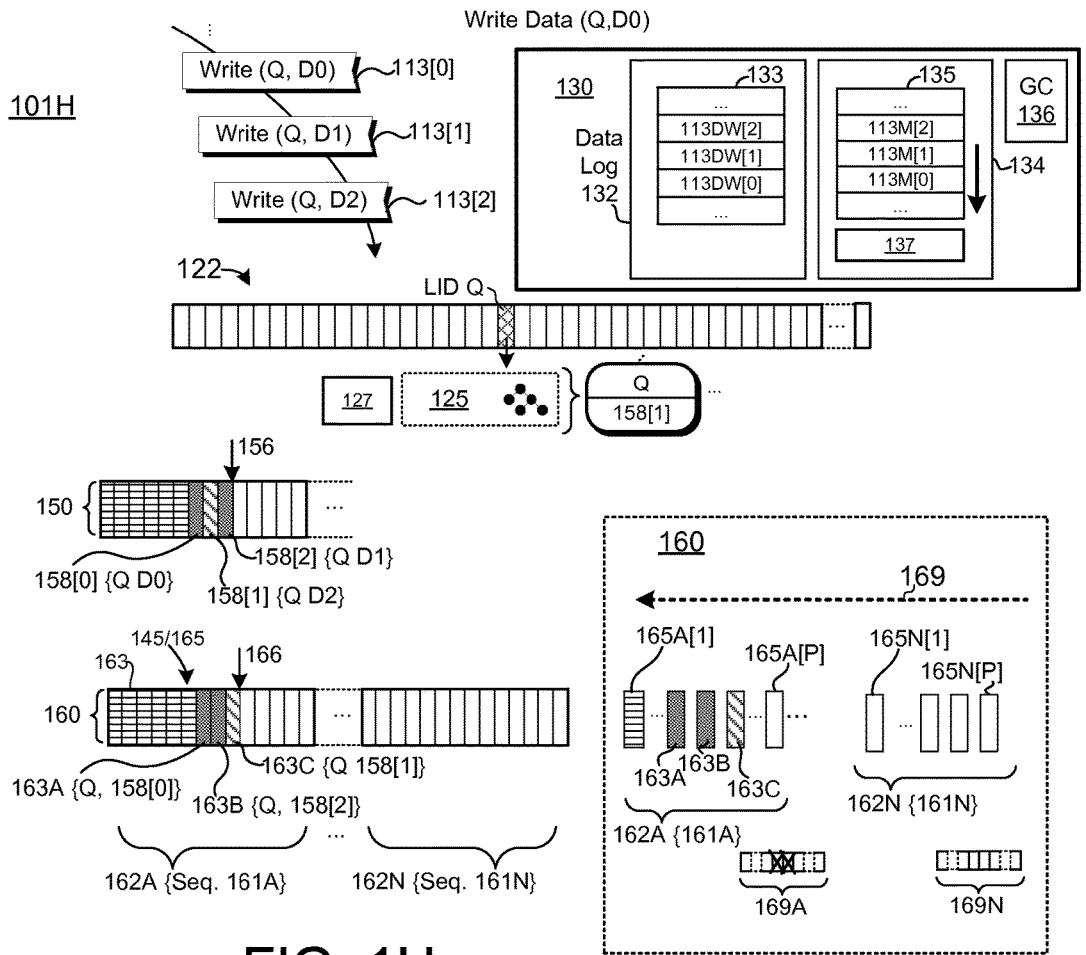
FIG. 1H depicts embodiments of metadata log operations.

Referring to embodiment 101H depicted in FIG. 1H, the data services module 110 may comprise a metadata log module 134 configured to maintain an ordered metadata log 160 on a storage resource. The metadata log 160 may define an ordered sequence of storage operations performed by use of the data services module 110, regardless of the log order 159 of the VDL 150.

The metadata log 160 may comprise an ordered sequence of metadata pertaining to the I/O operations serviced by the data services module 110. As used herein, an "ordered sequence of metadata" refers to data stored in a manner that defines an order of the metadata (e.g., defines a relative order of segments 152 of the VDL 150 and/or log storage units 155 within the segments 152, as disclosed above). The metadata log 160 may include, inter alia, mapping metadata, such as mapping entries 163, which may comprise persistent metadata configured to bind a LID of the logical address space 122 to one or more log storage units 155 (e.g., virtual blocks 145 and/or virtual addresses 195). As disclosed in further detail herein, the metadata log 160 may further comprise logical manipulation entries configured to modify associations between LIDs and data stored in the VDL 150. The mapping entries 163 of the metadata log 160 may correspond to entries 126 of the forward map 125. The metadata log 160 may comprise a plurality of segments 162A-N. The segments 162A-N may comprise respective metadata log storage units 165, which may correspond to virtual blocks 145 and/or virtual addresses 195 of one or more storage resources 190. As illustrated in FIG. 1H, the segments 162A-N may be assigned respective sequence metadata 161A-N, which may correspond to the order in which the segments 162A-N were programmed by the metadata log module 134. Accordingly, the sequence metadata 161A-N may define a temporal order of the segments 162A-N within the metadata log 160. As disclosed above, the metadata log module 134 may be configured to append mapping metadata sequentially to metadata log storage units 165 within respective segments 162A-N. Therefore, the temporal order of mapping metadata stored in a particular metadata log storage unit 165 of the metadata log 160 may be determined based on: a) the sequence metadata 161A-N of the segment 162A-N comprising the particular metadata log storage unit 165; and b) the address and/or offset of the particular metadata log storage unit 165 within the segment 162A-N. Although particular mechanisms for ordering the metadata log 160 as described herein, the disclosure is not limited in this regard and could be adapted to order the metadata log 160 (and/or other logs disclosed herein) using any suitable technique including, but not limited to: applying sequence information to each log entry, time stamping each log entry, and/or the like.

The metadata log 160 may be configured to manage the logical interface to data stored in the VDL 150. As disclosed above, the "logical interface" to data stored in the VDL 150 may correspond to the LIDs bound to the data by use of, inter alia, the forward map 125 and/or other metadata. The metadata log 160 may comprise an ordered, persistent, and crash-safe log of mapping metadata configured to manage the logical interface to data stored in the VDL 150 which may include, but is not limited to: allocating LIDs, binding LIDs to data stored in the VDL 150, deallocating LIDs (e.g., invalidating LID bindings), moving LID ranges (e.g., binding data in the VDL 150 to different sets of LIDs), replicating LID ranges (e.g., cloning and/or snapshotting particular sets of LIDs, providing for referencing the same data in the VDL 150 through two or more different sets of LIDs), merging LID ranges, and/or the like. Accordingly, as used herein, the metadata log 160 refers to a persistent, ordered log comprising mapping metadata configured to manage the logical interface to data in the VDL 150 by: a) binding LIDs of the logical address space 122 to data storage locations in the VDL 150 and/or b) implementing logical manipulation operations pertaining to said bindings.

The metadata log module 134 may be configured to append mapping entries 163 to the ordered metadata log 160 in accordance with the order in which the corresponding I/O requests 113 were received. As disclosed above, the data log module 132 may not enforce strict temporal ordering in the VDL 150 and, as such, the order of I/O operations reflected in the metadata log 160 may differ from the log order 159 of the VDL 150.

In some embodiments, the metadata log module 134 comprises an ordered metadata log queue 135. The metadata log queue 135 may comprise mapping metadata corresponding to I/O requests 113 received at the data services module 110. The metadata log queue 135 may be ordered, such that the metadata log module 134 appends mapping metadata to the metadata log 160 in accordance with the order in which the corresponding I/O requests 113 were received. In some embodiments, the metadata log queue 135 comprises a first-in-first-out (FIFO) buffer and/or other ordered buffer. The metadata log module 134 may be configured to append mapping entries 163 to the metadata log 160 in accordance with the order of the corresponding mapping metadata in the ordered metadata log queue 135. In some embodiments, the metadata log module 134 comprises a queue management module 137 configured to ensure that mapping metadata is appended to the metadata log 160 in accordance with the order of the mapping metadata in the ordered metadata log queue 135. The data log module 132 may comprise a data log queue 133 configured to queue I/O operations corresponding to I/O requests 113 received at the data services module 110. In some embodiments, the data log queue 133 is ordered, such that data operations are issued to the storage resource 190 in accordance with the order in which the I/O requests 113 were received. The data log module 132 may be configured to process entries of the data log queue 133 in order, as disclosed above. Alternatively, the data log module 132 may be configured to implement data storage operations out-of-order in accordance with the availability of storage resources 190, I/O bandwidth, data transfer bandwidth (e.g., DMA bandwidth), and/or the like.

In the FIG. 1H embodiment, the data services module 110 may receive a plurality of I/O requests 113, including I/O requests 113[0]-113[2]. The I/O requests 113[0]-113[2] may comprise requests to write data to LID Q. The I/O requests 113[0]-113[2] may be received in a particular order: 113[0] may be received first, followed by 113[1], then followed by 113[2]. The data log module 132 may queue corresponding data write operations in the data log queue 133 (e.g., data write operations 113DW[2], 113DW[1], and 113DW[0]). The data log module 132 may implement the data write operations 113DW[0]-113DW[2] by appending data to the VDL 150 at respective log storage units 158[0], 158[1], and 158[2]. In the FIG. 1H embodiment, the data may be appended to the VDL 150 out-of-order, such that data D1 of I/O request 113[1] is appended after data D2 of I/O request 113[2].

The translation module 124 may be configured to update the forward map 125 in accordance with the order in which the I/O requests 113[0]-113[2] were received at the data services module 110 (e.g., by use of an ordered queue, by implementing updates in serial, thread-safe operations, and/or the like). Accordingly, the forward map 125 may reflect the order of the I/O requests 113[0]-113[2], and, as such, the forward map 125 comprises an entry 126 to bind LID Q to data D2 at log storage location 158[2] regardless of the order of the corresponding data within the VDL 150. In some embodiments, the translation module 124 is configured to update the forward map 125 in a serial, thread-safe operation, which may include a) obtaining a lock on the forward map 125, b) modifying the forward map 125 (e.g., adding, removing, and/or modifying one or more entries 126 of the forward map 125), and c) unlocking the forward map 125. The translation module 124 may perform a serial, thread-safe operation for each I/O request 113 received at the data services module 110.

The forward map 125 may, however, be maintained in volatile memory resources 103 of the computing system 100 and, as such, may be subject to loss and/or corruption. The data services module 110 may comprise a metadata management module 128 configured to, inter alia, reconstruct the forward map 125 and/or other metadata by use of a metadata log 160. Reconstructing the forward map 125 from the contents of the VDL 150 alone, however, may result in errors due, inter alia, to the lack of strict ordering in the VDL 150. In the FIG. 1H embodiment, for example, the metadata management module 128 may incorrectly associate LID Q with data D1 at storage location 158[2] due to the log order 159 of the data D0-D2 within the VDL 150 (e.g., order of storage locations 158[0]-158[2]). The data services module 110 may, therefore, be configured to maintain a separate metadata log 160, configured to maintain the relative order of I/O operations performed in the VDL 150. As disclosed above, the metadata log 160 may comprise ordered mapping metadata configured to a) bind to data to LIDs and/or b) manipulate said bindings (e.g., move data, replicate sets of LIDs, clone sets of LIDs, merge sets of LIDs, move data, and/or the like). Moreover, the metadata log 160 may be ordered, such that the logical interface metadata stored therein corresponds to the order in which the associated I/O requests 113 were received at the data services module 110. The metadata log 160 may comprise a plurality of metadata log storage locations 165, which may correspond to virtual blocks 145 (and/or corresponding virtual addresses 195) associated with one or more storage resources 190. In some embodiments, the metadata log 160 is stored on the same storage resource(s) 190 as the VDL 150. Alternatively, the metadata log 160 may be stored on one or more storage resource(s) that are separate from and/or independent of the storage resource 190 used by the data log module 132. The metadata log storage locations 165 may be partitioned into respective segments 162A-N, as disclosed herein.

As illustrated in FIG. 1H, the metadata log module 134 may be configured to assign respective sequence metadata 161A-N to the segments 162A-N of the metadata log 160. The sequence metadata 161A-N may define an ordered sequence of segments 162A-N within the metadata log 160. The metadata log module 134 may be further configured to append data within metadata log storage units 165 within respective segments 162A-N in accordance with a predetermined pattern, such as a sequential storage pattern as disclosed herein. The segments 162A-N may, for example, each comprise P metadata log storage units 165, such that segment 162A comprises metadata log storage units 165A[1]-165A[P], segment 162N comprises metadata log storage units 165N[1]-165N[P], and so on. The metadata log module 134 may be configured to append data sequentially within a segment 162 (at a metadata log append point 166) until the segment is filled, and then advance the metadata log append point 166 to a next available segment 162A-N as disclosed herein. The metadata log module 134 may be configured to append data sequentially within the segments (from metadata log storage unit 1 through P). Accordingly, the log order 159 of data within the metadata log 160 may be determined by: a) the sequence metadata 161A-N associated with the log segments 162A-N and b) the relative location of the metadata log storage units 165 within the respective log segments 162A-N.

In the FIG. 1H embodiment, the metadata log module 134 is configured to append mapping metadata (mapping entries 163A-C) to the metadata log 160. The mapping entries 163A-C may correspond to the I/O operations performed in response to the I/O requests 113[0]-113[2]. The mapping entries 163A-C may be appended to the metadata log 160 in the order in which the I/O requests 113[0]-113[2] were received. As illustrated in FIG. 1H, the mapping entries 163A-C may associate the LID Q to respective log storage locations 165 within the VDL 150. As illustrated in FIG. 1H, the mapping metadata of the mapping entries 163A-C may comprise tuples (and/or other data structures) configured to associate a particular LID with a particular VDL storage unit 155. The mapping entry 163A corresponds to the I/O request 113[0] and binds LID Q to data D0 stored at log storage unit 158[0], mapping entry 163B corresponds to the I/O request 113[1] and binds LID Q to data D1 stored at log storage unit 158[2], and mapping entry 163C corresponds to the I/O request 113[2] and binds LID Q to data D2 stored at log storage unit 158[1]. Accordingly, the mapping entries 163A-C in the metadata log 160 reflect the order of the I/O requests 113[0]-113[2], regardless of the ordering of the corresponding data in the VDL 150. As disclosed above, in some embodiments, the metadata log module 134 comprises an ordered metadata log queue 135, which may comprise metadata operations 113M[0]-113M[2] corresponding to the I/O requests 113[0]-113[2]. The metadata log module 134 may be configured to append mapping metadata (mapping entries 163A-C) to the metadata log 160 in accordance with the order of the metadata operations 113M[0]-113M[2] in the queue 135. In some embodiments, the metadata log module 134 comprises a queue management module 137 configured to ensure that metadata pertaining to the operations 113M[0]-113M[2] are appended in order. The queue management module 137 may lock the queue 135 (prevent operations from being taken from the queue 135 for processing) while a metadata operation is being written to the metadata log 160, and may unlock the queue 135 to allow a next metadata operation to be processed, in response to an acknowledgement that the write operation has completed.

In response to loss and/or corruption of the volatile memory resources 103, the metadata management module 128 may reconstruct the forward map 125 (and/or other metadata) by use of the metadata log 160. The metadata management module 128 may be configured to access the metadata log 160 in log order 159 to ensure that the entries 126 are accurately reconstructed. In the FIG. 1H embodiment, the metadata management module 128 may be configured to determine that the mapping entry 163A that associates LID Q with log storage unit 158[1] in the VDL 150 corresponds to the most up-to-date version of LID Q based, inter alia, on the order of the mapping entries 163A-C within the metadata log 160.

The metadata log module 134 may be further configured to append mapping entries 163 to the metadata log 160 in response to log management operations in the VDL 150. As disclosed above, the garbage collector 136 may be configured to relocate valid data during compaction operations. Relocating valid data may comprise updating one or more entries 126 in the forward map 125 to bind LIDs to new storage units 158 in the VDL 150. Relocating valid data may further comprise appending a mapping entry 163 to the metadata log 160 to identify the new storage location of the LID within the VDL 150. Referring back to FIG. 1F, the garbage collection operation to reclaim segment 152C may comprise writing a mapping entry 163 to the metadata log to tie LID B to the log storage unit 158F.

The data services module 110 may be configured to implement deallocation operations by use of, inter alia, the metadata log module 134. As used herein, a deallocation operation refers to an operation configured to deallocate a LID (e.g., remove an association, binding, tie, and/or mapping between a LID and one or more virtual addresses). A deallocation operation may comprise a hint, message, and/or command configured to indicate that a particular LID (or set of LIDs) is no longer in use and/or that the data bound to the LIDs does not need to be retained in the VDL 150. Deallocation operations implemented by the data services module 110 may be configured to ensure that operations to erase, delete, and/or otherwise deallocate LIDs are persistent and crash safe by, inter alia, appending mapping metadata to the metadata log 160 configured to identify deallocated LIDs. The deallocation operations may be persistent and/or crash safe regardless of whether the corresponding data is removed from the underlying storage resources and/or regardless of whether the underlying storage resource(s) 190 support deallocation hints, messages, and/or commands.

A client 106 may deallocate a LID by use of a deallocation message, an erase message, an erase command, and/or the like. The deallocation message may be issued as an I/O request 113 through the interface 112 of the data services module 110 (and/or another I/O interface). The deallocation message may identify one or more LIDs that are no longer in use to reference data. In response, the translation module 124 may be configured to write one or more mapping entries 163 to the metadata log 160 to indicate that the one or more LIDs have been deallocated.

Referring to FIG. 1A, the VDL 150 may comprise segments 152 that correspond to sets, ranges, and/or extents of virtual blocks 145 (virtual addresses 195) of a storage resource 190, which may not support deallocation operations. Accordingly, data corresponding to a deallocated LID may remain on the storage resource 190. Moreover, after loss and/or corruption of the virtualization metadata, the metadata management module 128 may reconstruct an entry 126 corresponding to the deallocated data absent a persistent indication of the deallocation operation. A deallocation operation may, therefore, comprise appending a deallocation mapping entry 163 to the metadata log 160 to ensure that deallocation requests of the clients 106 are consistent and persist regardless of failure conditions. Deallocated data may be identified as invalid in a mark-and-sweep operation of the garbage collector 136 and, as such, may be removed from the VDL 150 in a storage recovery operation. Accordingly, a deallocation operation may be implemented exclusively within the metadata log 160 and without requiring storage operations in the VDL 150. A deallocation operation may further comprise issuing corresponding deallocation hints, messages, and/or commands (e.g., TRIM hints) to the corresponding storage resources 190 as disclosed above in conjunction with FIG. 1F. The data services module 110 may be configured to return "undefined," "null," "not allocated," and/or "does not exist" in response to requests pertaining to deallocated LIDs.

Figure 1I:
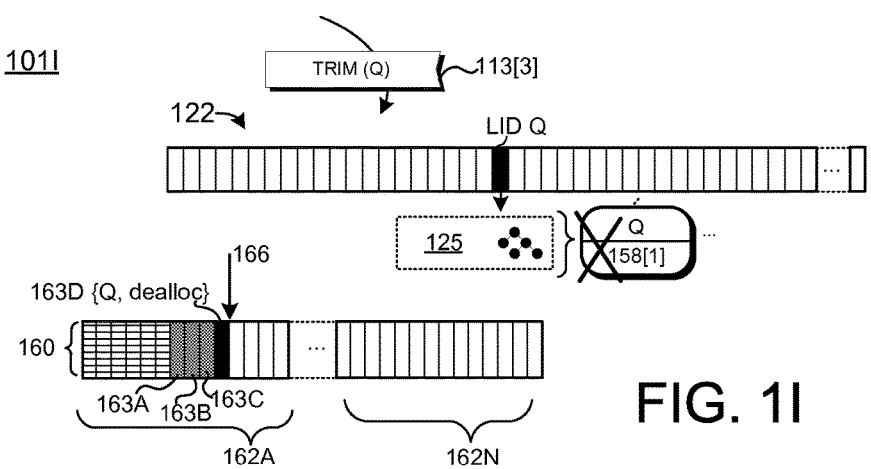
FIG. 1I depicts further embodiments of metadata log operations.

Referring to embodiment 101I of FIG. 1I, the data services module 110 may receive an I/O request 113[3] configured to deallocate LID Q (e.g., erase LID Q). In response, the translation module 124 may be configured to remove the entries 126 corresponding to LID Q from the forward map 125. In addition, the metadata log module 134 may be configured to append a mapping entry 163D to the metadata log 160 configured to deallocate LID Q (e.g., indicate that LID Q is not bound to data in the VDL 150). As illustrated in FIG. 1I, the mapping metadata of entry 163D may identify the LID Q and may indicate that the LID Q is no longer in use to reference data in the VDL 150 (e.g., indicate that Q has been deallocated). Absent the deallocation mapping entry 163D, the metadata management module 128 may reconstruct a mapping between LID Q and log storage unit 158[1] based on the mapping entry 163C (as disclosed above), obviating the effect of the I/O request 113[3].

The garbage collector 136 may be configured to reclaim segments 162 of the metadata log 160. As disclosed herein, reclaiming a segment 162 of the metadata log 160 may comprise a) identifying valid mapping metadata in the segment 162 (e.g., identifying valid mapping entries 163 in the segment), and b) relocating the valid metadata within the metadata log 160. Identifying valid mapping metadata in the segment 162 may comprise identifying valid mapping entries 163 in the segment 162. As used herein, "valid mapping metadata" and/or a "valid mapping entry" refers to mapping metadata that correlates to the forward map 125 (e.g., a mapping entry 163 that reflects an entry 126 in the forward map 125). In the FIG. 1H embodiment, the garbage collector 136 may determine that mapping entry 163C is valid since the mapping entry 163C matches the binding between LID Q and log storage unit 158[1] in the forward map 125. Invalid mapping metadata refers to mapping metadata that does not correspond to the forward map 125 (e.g., a mapping entry 163 that does not have a matching entry 126 in the forward map 125). In the FIG. 1H embodiment, the garbage collector 136 may determine that the mapping entries 163A and 163B are invalid, since neither mapping entry 163A nor 163B binds LID Q to log storage unit 158[1]; rather, mapping entry 163A binds LID Q to log storage unit 158[0], which was rendered invalid (obsolete) by I/O request 113[1], and mapping entry 163A binds LID Q to log storage unit 158[2], which was rendered invalid (obsolete) by I/O request 113[2]. An operation to compact the segment 162A may, therefore, comprise relocating the mapping entry 163C within the metadata log 160 and removing the mapping entries 163A-B. In some embodiments, valid mapping entries 163 may be distinguished from invalid entries 163 by use of the forward map 125. Alternatively, or in addition, the metadata log module 134 may be configured to maintain validity metadata, such as validity bitmaps 169A-N pertaining to the segments 162A-N of the metadata log 160. The validity bitmaps 169A-N may identify invalid entries within the segments 162A-N. In the FIG. 1H embodiment, the validity bitmap 169A corresponding to segment 162A may indicate that the entries 163A and 163B are made invalid by, inter alia, entries in respective location(s) within the validity bitmap 169A. The disclosure is not limited in this regard, however, and could be adapted to use any mechanism for indicating data validity.

Figure 1J:
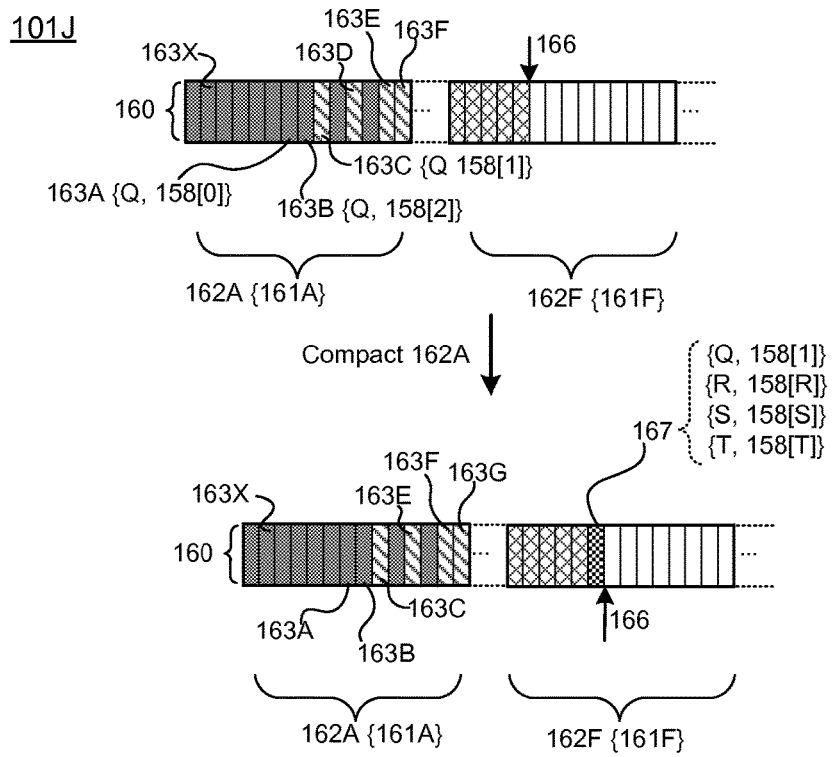
FIG. 1J depicts embodiments of garbage collection operations in a metadata log.

The metadata management module 128 may be further configured to aggregate mapping entries 163. As used herein, an "aggregate" mapping entry 167 refers to persistent metadata configured to bind two or more LIDs to respective storage location(s) within the VDL 150. The metadata management module 128 may be configured to generate aggregate mapping entries 167 in response to reclaiming a segment 162 of the metadata log 160. In the FIG. 1J embodiment 101J, the garbage collector 136 may be configured to reclaim segment 162A of the metadata log 160. The segment 162A may comprise valid mapping entries 163C and 163E-G. The segment 162 may further comprise invalid mapping entries 163X, including the invalid mapping entries 163A-B, disclosed above. Compacting the segment 162A of the metadata log 160 may comprise identifying the valid data within the segment, including mapping entries 163C and 163E-G. As disclosed above, the valid mapping entries 163C and 163E-G may be identified by use of the forward map 125 and/or validity bitmap 169A pertaining to the segment 162A, as disclosed herein. Compacting the segment 162A may further comprise relocating the valid data within the metadata log 160. The data may be relocated by, inter alia, appending the valid data at the append point 166 in the metadata log 160. In the FIG. 1J embodiment, the append point 166 is currently in segment 162F. In some embodiments, the valid data is relocated by copying and/or moving the data to the new append point 166 (e.g., re-appending the mapping entries 163C and 163E-G). Alternatively, the metadata management module 128 may be configured to combine the valid entries 163C and 163E-G into a single aggregate mapping entry 167. The aggregate mapping entry 167 may comprise the mapping information of the entries 163C and 163E-G, including the association between LID Q and 158[1] corresponding to mapping entry 163C, an association between LID R and VDL storage unit 158[R] of mapping entry 163E, an association between LID S and VDL storage unit 158[S] of mapping entry 163F, and an association between LID T and VDL storage unit 158[T] of mapping entry 163G.

In some embodiments, the metadata management module 128 is configured to checkpoint the forward map 125 (and/or other metadata pertaining to the data services module 110). As used herein, "checkpointing" or "destaging" refers to storing metadata of the data services module 110 in the metadata log 160 (and/or another persistent storage resource). Destaging the forward map 125 may refer to storing mapping entries 126 of the forward map 125 in the metadata log 160. The metadata management module 128 may be configured to checkpoint the forward map 125 in order to, inter alia, compact the mapping entries 163 of the forward map 125 in the metadata log 160. As disclosed herein, the metadata log module 134 may be configured to append mapping entries 163 to the metadata log 160 in response to I/O requests 113 received at the data services module 110. The mapping entries 163 may be appended to the metadata log 160 in accordance with the order in which the I/O requests 113 were received (may be temporally ordered). The metadata log module 134 may be configured to append a mapping entry 163 in a respective metadata log segment 162 in response to each I/O request 113. The data services module 110 may be configured to acknowledge completion of an I/O request 113 in response to a) writing data of the I/O request 113 to the VDL 150 and b) writing a corresponding mapping entry to the metadata log 160. As such, appending mapping entries 163 to the metadata log 160 may be in the critical timing path of I/O operations (e.g., the data services module 110 may guarantee that a metadata log entry is recorded for each completed I/O request 113). The metadata log segments 162, however, may be large as compared to the size of the mapping entries 163. For example, the metadata log segments 162 may correspond to 4 k disk blocks or pages, whereas the mapping entries 163 consume minimal storage space. Accordingly, the individual mapping entries 163 may not be space efficient. The metadata management module 128 may be configured to compact segments 162 of the metadata log 160, which may comprise combining multiple entries 163 into aggregate mapping entries 167, as disclosed herein. The aggregate mapping entries 167 may combine multiple mapping entries 163 into a single metadata log storage unit 165, which may improve space efficiency. The aggregate mapping entries 167, however, may be formed from limited amounts of valid data within segments 162 that are being recovered and, as such, may not fully exploit the storage capacity of the metadata log storage units 165. In addition, the aggregate mapping entries 167 may correspond to unstructured groups of LIDs (e.g., LIDs of different, disjoint, and/or non-contiguous regions of the logical address space 122). Accordingly, processing the aggregate mapping entries 167 to identify entries corresponding to particular LIDs and/or reconstruct the storage metadata (e.g., forward map 125) may not be computationally efficient.

The metadata management module 128 may be configured to checkpoint portions of the forward map 125, such that the checkpointed portions correspond to structured groups of LIDs that are computationally efficient to search and/or process. In some embodiments, the metadata management module 128 is configured to checkpoint LID regions, ranges, and/or extents within the logical address space 122.

In some embodiments, the data services module 110 configures the storage metadata for efficient access and/or copy operations (e.g., checkpoint operations as disclosed herein). Referring to embodiment 101K illustrated in FIG. 1K, the data services module 110 may represent entries 126 of the forward map 125 as fixed-size data structures, which may be arranged contiguously in the memory address space of the computing device 100 (e.g., within the volatile memory resources 103 of the computing system 100). The forward map 125 of the FIG. 1K embodiment comprises entries 126A, 126C, 126N, and so on. The entries 126A, 126C, and 126N may be embodied as fixed and/or deterministically sized mapping data structures 123 on the volatile memory resources 103, as disclosed herein. The data structures 123 may include a LID field 127A configured to represent one or more LIDs of the entry 126 and a VDL address field 127B configured to represent one or more data log storage unit address(es) and/or links to data in the VDL 150. As disclosed above, the forward map 125 may be configured to represent LID bindings using leaf nodes and, as such, the mapping data structures 123 may not include references to child nodes. Alternatively, or in addition, the data structures 123 may include a fixed-size (and/or deterministically sized) field 127C comprising links and/or references to other entries 126 in the forward map 125 and/or a parent intermediate reference node 129 of the entry 126).

Figure 1K:
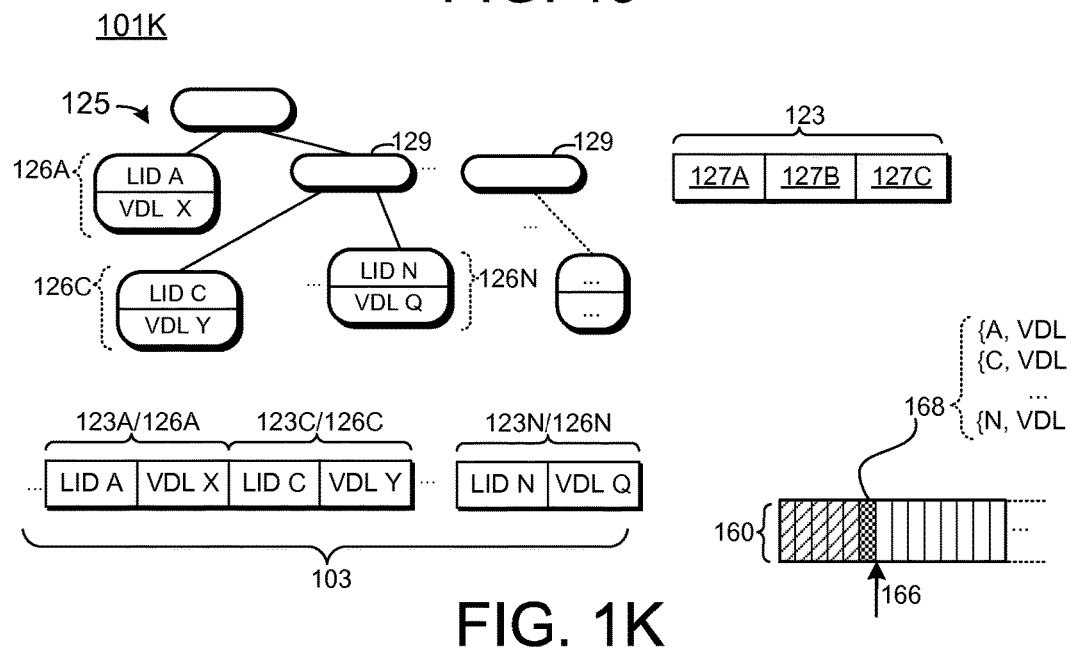
FIG. 1K depicts embodiments of checkpoint operations.

The data services module 110 may be configured to arrange the data structures 123 in the memory address space of the computing system 100 to facilitate DMAs to ranges and/or extents of entries 126. As illustrated in FIG. 1K, the data structures 123A, 123C, and 123N may be arranged contiguously in the volatile memory resources 103 of the computing system 100, the entry 126A may comprise a binding between LID A and VDL storage unit X (in fixed-size fields 127A and 127B), the data structure 123C of entry 126C may tie LID C to VDL storage unit Y, and the data structure 123N of entry 126N may associate LID F with VDL storage unit Q. As shown in FIG. 1K, the data structures 123A, 123C, and 123N may be maintained within contiguous storage locations in the volatile memory resources 103. Alternatively, the data structures 123A, 123C, and/or 123N may be stored at predetermined offsets and/or locations within the volatile memory resources 103. Although not depicted in FIG. 1K, the memory resources 103 may include data structures 123 that represent other entries 126 of the forward map 125.

Checkpointing the forward map region comprising entries 126A, 126C, and 126N may comprise transferring the contiguous memory region comprising the data structures 123A, 123C, and 123N from the volatile memory resources 103 to the metadata log 160. The metadata management module 128 may be configured to checkpoint regions of the forward map 125 that correspond to storage boundaries of the metadata log 160 (e.g., size of the storage units 165). In one embodiment, the metadata log storage units 165 comprise 4 k of storage capacity and the data structures 123 comprise 128 bytes of data. Accordingly, the metadata management module 128 may be configured to checkpoint groups of 32 entries 126 from the forward map 125. Alternatively, or in addition, the metadata management module 128 may be configured to checkpoint larger regions of the forward map 125 (and/or the entire forward map 125) by, inter alia, streaming the memory region(s) comprising the data structures 123 representing the entries 126 into the metadata log 160, as disclosed herein.

Checkpointing regions of the forward map 125 may comprise storing one or more checkpoint entries 168 in the metadata log 160. As used herein, a checkpoint entry 168 refers to an entry configured to bind a set, group, range, and/or extent of LIDs to respective VDL storage units 155. A checkpoint entry 168 may correspond to a particular region, range, and/or extent of the forward map 125. Accordingly, in contrast to aggregate mapping entries 167, checkpoint entries 168 may correspond to a structure and/or arrangement of entries 126 in the forward map 125. By contrast, mapping information of an aggregate mapping entry 167 may correspond to unstructured groups of LIDs taken from, inter alia, one or more metadata log segments 162 being reclaimed. The LIDs of checkpoint entry 168 may, or may not, be contiguous with respect to the logical address space 122. In the FIG. 1K embodiment, a checkpoint entry 168 corresponding to entries 126A, 126C, and 126N may include discontiguous LIDs A, C, and N. The LIDs of the checkpoint entry 168 correspond to the arrangement of the entries 126 in the forward map 125 and, as such, may facilitate efficient reconstruction of the forward map 125 and/or facilitate LID-based index lookups.

In some embodiments, the metadata management module 128 is configured to identify portions of the forward map 125 that have been checkpointed. The metadata management module 128 may be configured to iteratively checkpoint portions and/or regions of the forward map 125 in background metadata compaction operations. Checkpointing the forward map 125 may simply be garbage collection operations in the metadata log 160. Referring back to FIG. 1J, in response to selecting the segment 162A for recovery, the garbage collector 136 may determine that one or more (or all) of the valid entries 163C, 163E, 163F, and/or 163G in the segment 162A have been checkpointed. In response, the garbage collector 136 may reclaim the segment 162A without relocating (re-writing) the checkpointed entries to the metadata log 160.

In some embodiments, the metadata management module 128 is configured to identify entries that have been checkpointed by use of a "checkpoint" indicator. The checkpoint indicator may indicate whether an entry 126 has been "checkpointed" (destaged) to the metadata log 160 (e.g., has been destaged and/or checkpointed, as disclosed herein). The checkpoint indicator of an entry 126 may be set to "false" in response to writing a "sparse" mapping entry 163 to the metadata log 160 corresponding to the entry 126. As used herein, a "sparse entry" refers to a mapping entry 163 in the metadata log 160 that corresponds to a single LID and/or LID range. A sparse entry may also refer to an aggregate entry corresponding to an unstructured set of LIDs. As disclosed above, sparse entries 163 may be written to the metadata log 160 in response to servicing I/O requests 113, relocating data in VDL garbage collection operations, and/or the like. Entries 126 that are "checkpointed" refer to entries 126 that have been written to the metadata log 160 in a checkpoint entry 168 that comprises a group of LIDs that correspond to a structure of the forward map 125, as disclosed herein.

In some embodiments, the metadata management module 128 may be configured to determine whether a mapping entry 163 and/or aggregate mapping 167 in the metadata log 160 has been checkpointed based on a log time associated with the entries. As disclosed above, the log order (or log time) of data appended to the metadata log 160 may be based on a) sequence metadata associated with the segment 162 comprising the data, and b) the storage address of the data within the segment 162. The metadata management module 128 may compare a log time of an entry 163 and/or 167 to a log time corresponding to a checkpoint operation in the metadata log 160 pertaining to the entries 163 and/or 167 to determine whether the entries 163 and/or 167 were included in the checkpoint. The determination may, therefore, comprise a) identifying a checkpoint operation pertaining to particular entries 163 and/or 167 in the metadata log(e.g., identifying a checkpoint operation corresponding to the entire forward map 125 and/or a section of the forward map 125 that includes the LIDs of the entries 163 and/or 167), and b) comparing a log time of the identified checkpoint operation to the log time of the entries 163 and/or 167. If the log time of the identified checkpoint operation is later than the entries 163 and/or 167, the metadata management module 128 may determine that mapping information in the entries 163 and/or 167 was included in the identified checkpoint operation (and that the entries 163 and/or 167 do not need to be checkpointed and/or copied forward in a garbage collection operation).

As disclosed above, checkpointing a LID region within the forward map 125 may comprise appending a checkpoint entry 168 to the metadata log 160 that corresponds to a particular set, range, and/or extent of LIDs within the logical address space 122 (e.g., checkpoint LIDs 0 through 32786). In some embodiments, checkpoint operations may be performed in the background with respect to other operations of the data services module (e.g., operations to service I/O requests 113). Checkpointing a LID region may comprise a) locking the region within the forward map 125, b) writing a checkpoint entry 168 to the metadata log 160 corresponding to the LID region, and c) unlocking the region. As used herein, locking a region of the forward map 125 refers to preventing I/O operations from modifying LIDs within the region that is being checkpointed. Accordingly, locking a region of the forward map 125 may comprise stalling I/O requests 113 pertaining to the locked region until the checkpoint operation is complete.

Figure 2A:
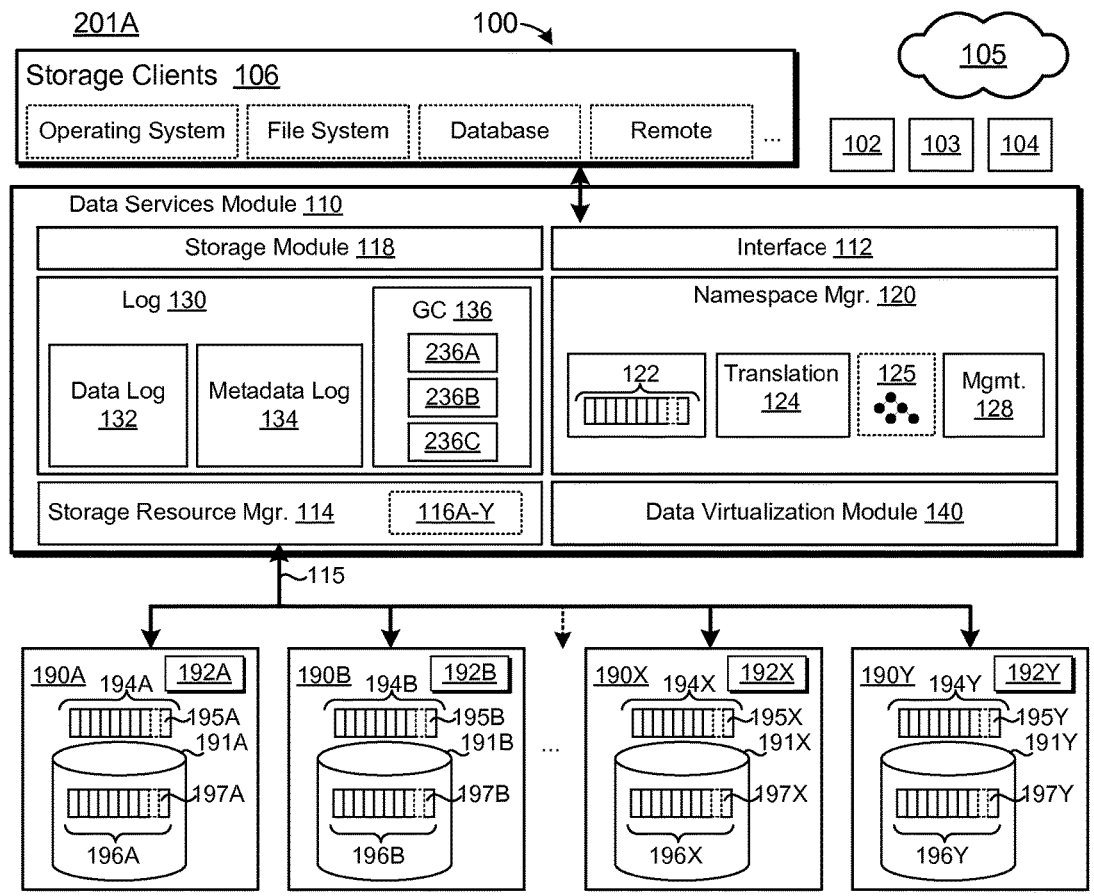
FIG. 2A depicts further embodiments of a data services module configured to manage a data log that spans a plurality of storage resources.
Figure 2B:
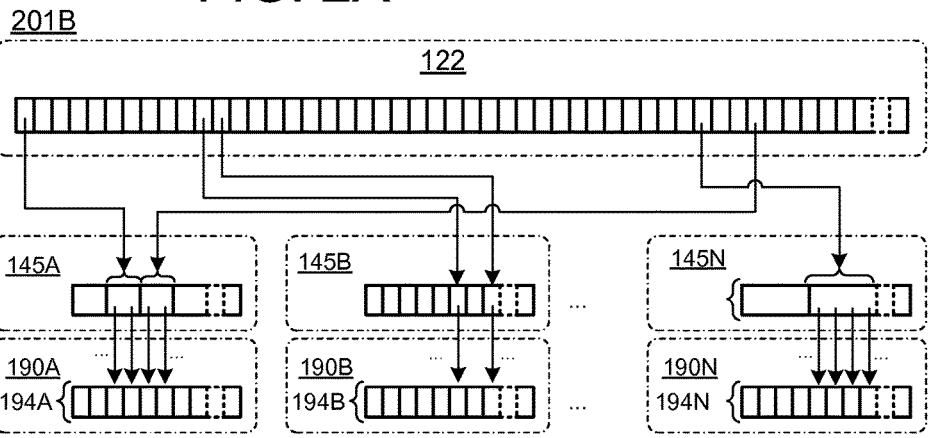
FIG. 2B depicts embodiments of mappings between a logical address space and storage resources.

FIG. 2A is a block diagram of another embodiment 201A of a computing system 100 comprising a data services module 110. In the FIG. 2A embodiment, the data services module 110 is communicatively coupled to a plurality of storage resources 190A-Y through, inter alia, the interconnect 115 and/or network 105, as disclosed herein. The storage resources 190A-Y may be configured to provide storage services through respective interfaces (e.g., storage resource address spaces 194A-Y comprising virtual addresses 195A-Y). The storage resources 190A-Y may further include storage media address spaces 196A-Y having respective storage resource address spaces 194A-Y managed by respective controllers 192A-Y. The translation module 124 may be configured to implement any-to-any mappings between the logical address space 122 and storage resource address space(s) 194A-Y of the respective storage resources 190A-Y. As depicted in embodiment 201B illustrated in FIG. 2B, the forward map 125 may be configured to bind LIDs to arbitrary addresses within the storage resource address spaces 194A-Y of the storage resources 190A-Y.

The translation module 124 may be further configured to manage translations between virtual addresses 195 and virtual blocks 145A-N. As disclosed above, the virtual blocks 145A-N may be configured to determine a storage granularity of the LIDs and/or manage differences between block sizes of the storage resources 190A-N. In the FIG. 2B embodiment, the storage resource 190A may be configured with a block size of 1 kb, the storage resource 190B may have a block size of 2 kb, and the storage resource 190N may have a block size of 512 bytes. The translation module 124 may configure the LIDs to reference 2 kb blocks, which may comprise mapping two virtual addresses 195A to each virtual block 145A, mapping one virtual address 195B to each virtual block 145B, mapping four virtual addresses 195N to each virtual block 145N, and so on.

Figure 2C:
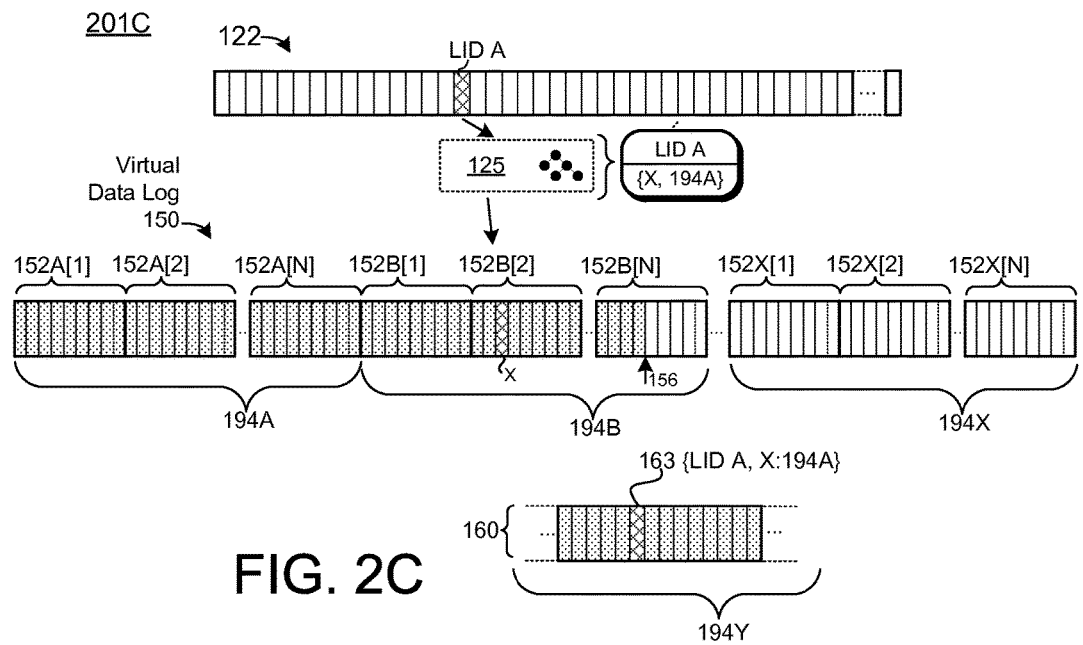
FIG. 2C depicts embodiments of log operations.

The VDL 150 managed by the data log module 132 may comprise segments 152 on the storage resources 190A-Y. As illustrated in embodiment 201C of FIG. 2C, the VDL 150 may comprise segments 152A[1]-152A[N] corresponding to storage resource 190A (e.g., the segments 152A[1]-152A[N] may comprise identifier ranges in the storage resource address space 194A of the storage resource 190A). The VDL 150 may further comprise segments 152B[1]-152B[N] corresponding to storage resource 190B, segments 152N[1]-152N[N] corresponding to storage resource 190N, and so on. Accordingly, data of the VDL 150 may be stored within a plurality of different storage resources 190A-Y. The forward map 125 may be configured to bind LIDs of the logical address space 122 (e.g., LID A) to log storage units 155 in the VDL 150, which may correspond to virtual blocks 145A-N (e.g., virtual addresses 195A-N of the underlying storage resources 190A-Y). In FIG. 2C, data of LID A is stored in log storage unit X on storage resource 190B. An entry 126 in the forward map 125 binds LID A to the virtual block(s) 145A-N corresponding to log storage unit X, the forward map 125 may further include an identifier of the storage resource 190A, and/or an identifier of the storage resource address space 194A comprising the data of LID A. The data log module 132 may be configured to append data sequentially within the VDL 150, and the garbage collector 136 may be configured to recover segments 152. The garbage collector 136 may be configured to select segments 152 for recovery and to prepare the selected segments for reuse by the data log module 132. The garbage collector 136 may include a) a scan module 236A configured to scan the VDL 150 to identify segments 152 to recover by, inter alia, identifying invalid data in the VDL 150, b) a relocation plan module 236B configured to determine a relocation plan for valid data in segments selected for recovery, and c) a relocation implementation module 236C configured to relocate the valid data. The scan module 236A may be configured to identify invalid data in the VDL 150 by use of the forward map 125. In some embodiments, the scan module 236A identifies invalid data using a mark-and-sweep approach. The scan module 236A may clear validity indicators for the log storage units 155 in the VDL 150 (e.g., set validity indicators to false) and traverse the entries of the forward map 125. The scan module 236A may set log storage unit validity indicators to "true" (valid) in response to identifying an entry 126 that maps a LID to the log storage unit 155. Log storage units 155 that are bound to LIDs of the logical address space 122 in the forward map 125 are identified as valid, and other log storage units 155 are considered to comprise invalid data.

Relocating valid data in a segment 152 selected for recovery may comprise a) determining a relocation plan for the valid data by use of the relocation plan module 236B, and b) implementing the relocation plan by use of the relocation implementation module 236C. As used herein, a "relocation plan" refers to a plan for relocating valid data from a segment 152 to other log storage unit(s) 155 within the VDL 150. Data may be relocated by, inter alia, copying the valid data within the VDL 150, re-appending the valid data to the VDL 150, moving the valid data, and/or the like.

The relocation plan module 236B may be configured to determine a relocation plan by use of the storage resource manager 114. As disclosed above, the storage resource manager 114 may be configured to interface with the storage resources 190A-Y, which may comprise issuing I/O requests to the storage resources 190A-Y, writing data to the storage resources 190A-Y, reading data from the storage resources 190A-Y, allocating virtual blocks 145A-N (e.g., virtual addresses 195A-Y within respective storage resource address spaces 194A-Y), communicating coordination information with the storage resources 190A-Y (e.g., deallocation information), and/or the like. In some embodiments, the storage resource manager 114 comprises storage resource profiles 116A-Y, which may comprise information pertaining to the respective storage resources 190A-Y. The storage resource profiles 116A-Y may include, but are not limited to: performance characteristics of the respective storage resources 190A-Y, capabilities of the respective storage resources 190A-Y, configuration options pertaining to the respective storage resources 190A-Y, coordination capabilities of the storage resources 190A-Y, storage format used by the storage resources 190A-Y (e.g., whether a storage resource 190A-Y is log-based or the like), and so on. The storage resource profiles 116A-Y may indicate whether a particular storage resource 190A-Y is capable of high-performance, sequential data transfers; comprises DMA functionality; is capable of performing logical address manipulations (e.g., virtual copy operations, disclosed below); and/or the like.

The relocation plan module 236B of the garbage collector 136 may determine a relocation plan based on a) profile information 116A-Y pertaining to the source of the data (e.g., the storage resource 190A-Y comprising the valid data), and b) profile information 116A-Y pertaining to the destination of the data (e.g., the storage resource 190A-Y corresponding to the current append point 156). In the FIG. 2C embodiment, the scan module 236A may select the segment 152B[2] comprising data of LID A for recovery. The scan module 236A may be further configured to determine that the segment 152B[2] comprises valid data, including the data stored in log storage unit X. In response, the relocation plan module 236B may determine a relocation plan for the valid data based on a) profile information 116B pertaining to the source of the valid data (storage resource 190B) and b) profile information 116B pertaining to the destination of the valid data (also storage resource 190B, based on the position of the append point 156 in the VDL 150). The profile information 116B may indicate that the storage resource 190B is capable of performing virtual copy and/or logical move operations. In response, the relocation plan module 236B may be configured to develop a relocation plan in which the valid data is relocated to the segment 152B[N] in a logical move operation without copying the data on the storage resource 190B. The relocation implementation module 236C may be configured to implement the relocation plan, which may comprise issuing commands to configure the storage resource 190B to perform the storage operations comprising the relocation plan. Further embodiments of systems and methods for logical copy (clone) and/or logical move operations are disclosed in U.S. Provisional Patent Application No. 61/892,962, entitled "Systems and Methods for Distributed Atomic Storage Operations," filed Oct. 18, 2013 for Nisha Talagala et al., and which is hereby incorporated by reference in its entirety.

Figure 2D:
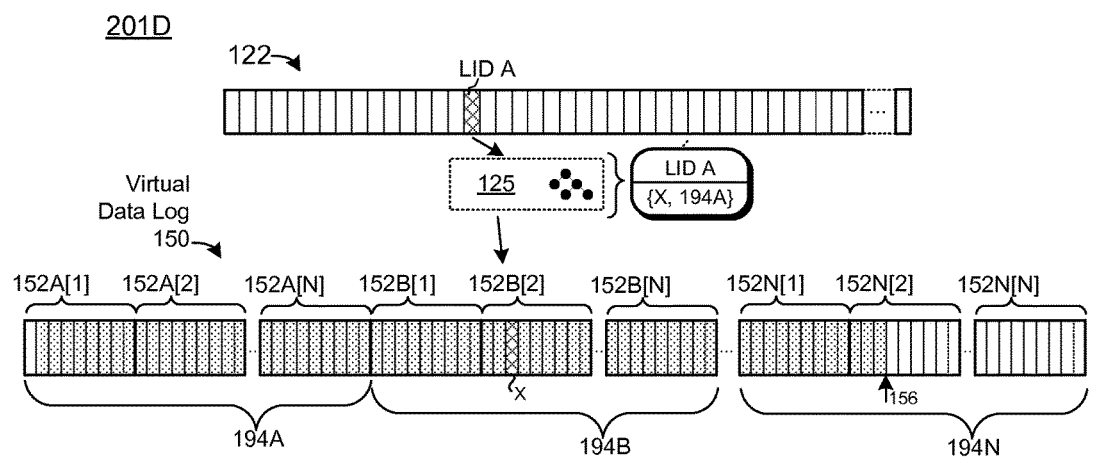
FIG. 2D depicts further embodiments of log operations.

In another embodiment 201D, and as illustrated in FIG. 2D, the append point 156 may correspond to a different storage resource 190N. The relocation plan module 236B may be configured to determine a relocation plan for valid data in the segment 152B[2] based on a) profile information 116B pertaining to the storage resource 190B and b) profile information 116N pertaining to the storage resource 190N. Since the append point is on a different storage resource 190N (e.g., in a different storage resource address space 194N from the segment 152B[2]), it may not be possible to perform a logical move and/or copy operation to relocate the data (regardless of whether the storage resources 190B and/or 190N support such operations). The relocation plan module 236B may, therefore, determine an efficient copy operation to transfer valid data from segment storage resource 190B to storage resource 190N. Transferring the valid data may comprise one or more of a DMA operation, a high-performance sequential write, and/or the like. The transfer mechanism(s) may be selected in accordance with the capabilities and/or performance characteristics of the storage resources 190B and/or 190N as indicated by the respective profile information 116B and 116N. The relocation implementation module 236C may be configured to implement the determined relocation plan, as disclosed herein.

The data services module 110 may be further configured to maintain a metadata log 160, as disclosed herein. In the FIG. 2A embodiment, the metadata log 160 may be maintained on a separate storage resource 190N (a storage resource 190Y that is separate from and/or independent of the storage resources 190A-Y comprising the VDL 150). The disclosure is not limited in this regard, and in some embodiments the metadata log 160 may be maintained on the same storage resource(s) 190A-Y as the VDL 150. The metadata log module 134 may be configured to maintain a temporal order of storage operations performed through the data services module 110 as disclosed herein. The data services module 110 may be configured to service I/O requests 113 by a) appending data corresponding to the I/O request 113 to the VDL 150, and b) recording an entry 163 pertaining to the I/O request 113 in the metadata log 160. The data services module 110 may be configured to acknowledge completion of the I/O request 113 in response to recording the entry 163 in the metadata log 160. The entries 163 of the metadata log(as well as the aggregate mapping entries 167 and/or checkpoint entries 168) may be configured to bind LIDs of the logical address space to data stored within the VDL 150, through, inter alia, one or more translation layers, such as a translation layer between LIDs and virtual blocks 145A-N, a translation layer between virtual blocks 145A-N and virtual addresses 195A-N, and so on. Accordingly, and as depicted in FIG. 2C, metadata log 160 may be configured to include addressing information to identify the log storage unit X comprising the data bound to LID A, including an identifier of the namespace (storage resource address space 194B) and/or storage resource 190B comprising the data.

As disclosed above, the metadata log module 134 may be configured to append entries 163 to the metadata log 160 in response to I/O requests 113 serviced by the data services module 110. The entries 163 may be written to log storage units 165, which may comprise significantly more storage capacity than required by the entry 163, resulting in wasted space on the underlying storage resource (e.g., storage resource 190Y). In some embodiments, the metadata log 160 may be implemented using a storage resource 190Y configured to implement persistent, byte-addressable storage operations, such as battery-backed RAM, n-Channel DRAM, auto-commit memory, and/or the like. Further embodiments of auto-commit memory are disclosed in U.S. patent application Ser. No. 13/324,942, entitled "Apparatus, System and Method for Auto-Commit Memory," filed Dec. 13, 2011 for David Flynn et al., and which is hereby incorporated by reference in its entirety.

In some embodiments, the metadata log module 134 may be configured to cache and/or buffer entries 163, and then write groups of entries 163 (and/or aggregate entries 163) to the metadata log 160. The metadata log module 134 may, for example, be configured to buffer a sufficient amount of mapping entry data to fill (or substantially fill) a log storage unit 165. In such embodiments, the data log module 132 may be configured to append data mapping information to the VDL 150 (as disclosed above in conjunction with FIG. 1D). The data log module 132 may be further configured to order the VDL 150 to prevent write hazards as illustrated in FIG. 1H. Accordingly, the data write module 132 may be configured to maintain a temporal order in the VDL 150, such that data (and corresponding mapping information, such as the persistent VDL metadata 184) is appended to the VDL 150 according to the order in which the corresponding I/O requests 113 were received. The mapping information stored in the VDL 150 may be marked for removal in response to the metadata log 160 storing the buffered mapping entries to the metadata log 160. The persistent VDL metadata 184 may, for example, be removed in storage recovery operations performed within the VDL 150 by the garbage collector 136, as disclosed herein.

Figure 3A:
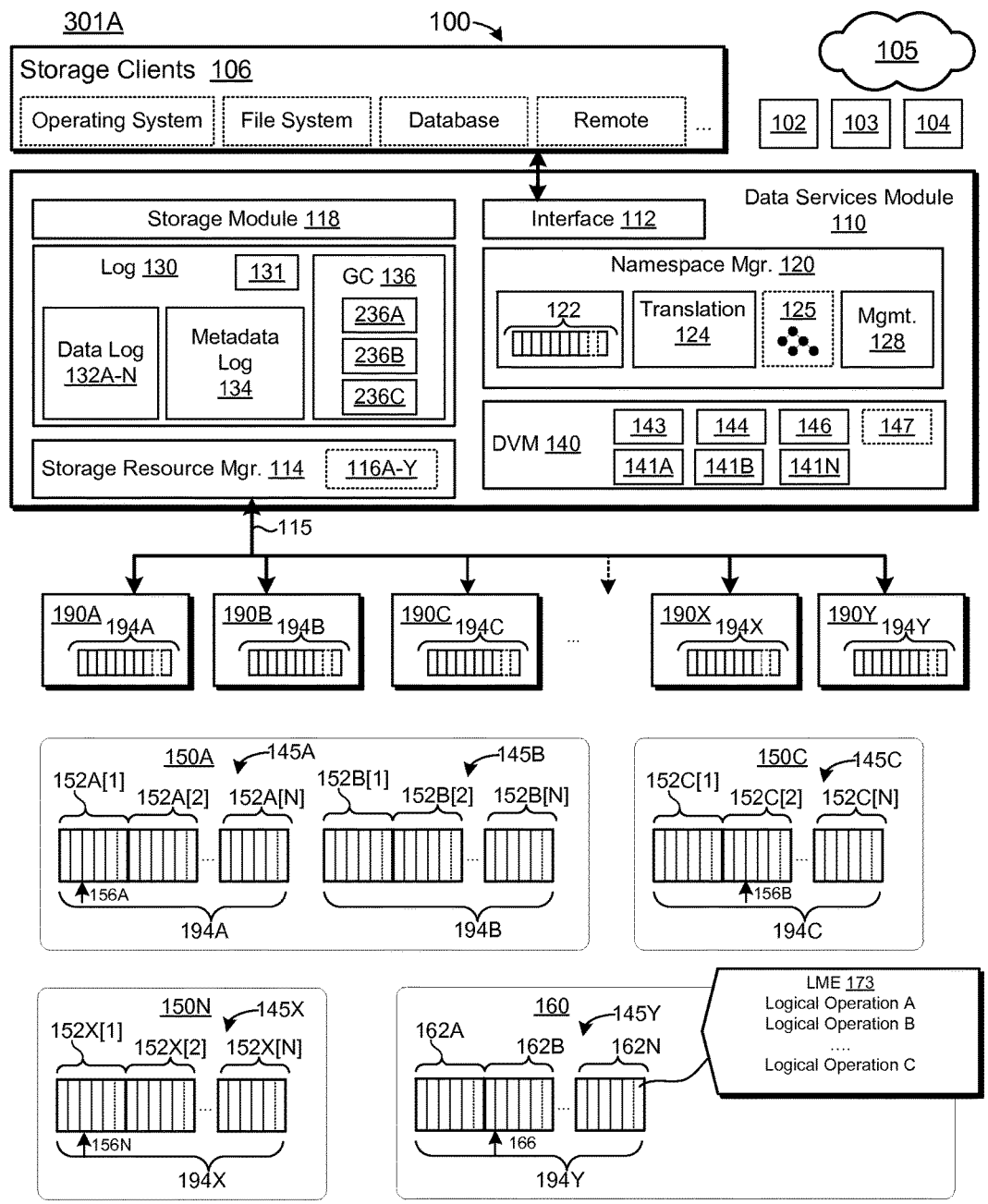
FIG. 3A depicts further embodiments of a data services module configured to manage a plurality of data logs which may span a plurality of storage resources.

FIG. 3A depicts another embodiment 301A of a computing system 100 comprising a data services module 110. The data services module 110 of FIG. 3A is communicatively coupled to storage resources 190A-Y by use of, inter alia, the interconnect 115 and/or network 105, as disclosed herein. In the FIG. 3A embodiment, the log module 130 is configured to maintain a plurality of different VDLs 150A-X. The VDLs 150A-X may be managed by respective data log modules 132A-X (and/or by a single data log module 132 configured to manage a plurality of append points 156A-X). The VDLs 150A-X may correspond to respective storage resources 190A-Y. In FIG. 3A, VDL 150A spans storage resources 190A and 190B and, as such, may include segments 152A[1]-152A[N] that correspond to virtual blocks 145A mapped to the storage resource address space 194A of storage resource 190A, as well as segments 152B[1]-152B[N] that correspond to virtual blocks 145B mapped to the storage resource address space 194B of storage resource 190B. The VDL 150C may correspond to storage resource 190C (e.g., may include segments 152C[1]-152C[N] that correspond to virtual blocks 145C mapped to the storage resource address space 194C), and the VDL 150N may correspond to storage resource 190X (e.g., may include virtual blocks 145X mapped to segments 152X[1]-152X[N] that correspond to the storage resource address space 194X). The translation module 124 may be configured to map virtual blocks 145A-X to respective virtual addresses 195A-X of the storage resources 190A-X, as disclosed herein (e.g., using one-to-one mappings, one-to-N mappings, and/or the like).

The metadata log module 134 may be configured to maintain a metadata log 160 on a separate storage resource 190Y. As disclosed in further detail herein, the metadata log module 134 may be configured to maintain ordered metadata pertaining to multiple VDL 150A-N. For clarity of illustration, the metadata log 160 of FIG. 3A maintains metadata pertaining to multiple VDL 150A-N and corresponds to a separate storage resource 190Y that is not being used by a VDL 150A-N. The disclosure is not limited in this regard, however, and could be adapted to implement separate metadata logs 160 to maintain metadata for respective VDL 150A-N and/or could implement the metadata log 160 on a storage resource 190A-X being used for one or more VDLs 150A-N.

In the FIG. 3A embodiment, the log module 130 comprises respective data log modules 132A-N, which may be configured to manage log storage operations within a respective VDL 150A-N. A data log module 132A may be configured to manage log operations of VDL 150A, a data log module 132B may be configured to manage log operations of VDL 150B, and a data log module 132N may be configured to manage log operations of VDL 150N. Alternatively, a single data log module 132 may be configured to manage a plurality of VDL 150A-N.

The data services module 110 may be configured to service I/O requests 113 by use of one or more VDLs 150A-N. As disclosed above, the data services module 110 may comprise a data virtualization module (DVM) 140, which may include an allocation module 143 configured to allocate resources of the data services module 110 to clients 106. The allocation module 143 may be configured to allocate sets, groups, ranges, and/or extents of LIDs to clients 106 in response to, inter alia, allocation requests. As disclosed herein, LIDs of the logical address space 122 may be mapped to any log storage unit 155 and/or virtual block 145A-N (virtual addresses 195A-N) of any of the storage resources 190A-Y (by use of, inter alia, the forward map 125 and/or metadata log 160). Accordingly, an I/O request 113 pertaining to a particular LID may be serviced by any of the data log modules 132A-N and/or within any of the VDLs 150A-N.

In some embodiments, the data services module 110 includes a log provisioner 131. The log provisioner 131 may be adapted to assign storage resources 190A-Y to one or more VDLs 150A-N. As disclosed in further detail herein, the log provisioner 131 may be configured to configure the VDLs 150A-N to provide a particular level of performance and/or reliability. Accordingly, the log provisioner 131 may be configured to combine (and/or separate) storage resources 190A-Y used in a particular VDL 150A-N based, inter alia, on performance and/or reliability characteristics of the storage resources 190A-Y (as indicated in the profile information 116A-Y, as disclosed herein). The data services module 110 may further include an allocation module 143 configured to allocate resources to clients 106. The allocation module 143 may be configured to allocate LIDs to clients 106. Further embodiments of systems and methods for managing logical and/or physical resource allocations are disclosed in U.S. Pat. No. 8,578,127 issued on Nov. 5, 2013 to David Flynn et al., which is hereby incorporated by reference in its entirety.

The log provisioner 131 may be configured to configure VDLs 150A-N of the data services module 110 based, inter alia, on characteristics of the storage resources 190A-Y. As disclosed above, the storage resource manager 114 may comprise profile information 116A-Y configured to indicate the capabilities and/or configuration of the storage resource 190A-Y. The profile information 116A-Y may be further configured to indicate current and/or observed performance and/or reliability characteristics of the storage resources 190A-Y. Accordingly, profile information 116A-Y pertaining to a storage resource 190A-Y may include, but is not limited to: the latency of storage operations performed on the storage resource 190A-Y, a workload the storage resource 190A-Y is capable of sustaining, current workload on the storage resource 190A-Y, available storage capacity, a QoS guaranteed by the storage resource 190A-Y, reliability characteristics pertaining to the storage resource 190A-Y (e.g., persistence level, whether the storage resource is configured to store data redundantly, such as a RAID configuration, observed error rate, and/or the like), capabilities of the storage resource 190A-Y (e.g., whether the storage resource 190A-Y supports particular storage operations and/or interfaces), storage format of the storage resource 190A-Y (e.g., log-based storage, modify-in-place, and/or the like), availability and/or cache mode of the storage resource 190A-Y, and/or the like.

The log provisioner 131 may be configured to assign storage resources 190A-Y to VDLs 150A-N in accordance with the characteristics of the storage resources 190A-Y. The log provisioner 131 may, for example, be configured to combine storage resources 190A-Y having similar performance characteristics in the same VDL 150A-N and/or avoid combining storage resources 190A-Y with different performance attributes (e.g., avoid pairing high-performance storage resources 190A-Y with lower-performance storage resources 190A-Y in the same VDL 150A-N). The log provisioner 131 may, in one embodiment, configure a VDL 150A-N to separate a combination of a high-performance storage resource 190C with one or more lower-performance storage resources 190A-B. In another embodiment, the assignment module is configured to group a plurality of high-performance storage resources 190A-Y into a single, higher-capacity VDL 150A-N. The log provisioner 131 may be further configured to combine storage resources 190A-Y configured to provide similar levels of persistence. The log provisioner 131 may, in one embodiment, combine storage resources 190A-Y configured to store data redundantly into a particular VDL 150A-N, and to exclude storage resources 190A-Y from the particular VDL 150A-N that are not capable of providing and/or configured to provide a similar level of persistence. In the FIG. 3A embodiment, the log provisioner 131 may configure the VDL 150A to include lower-performance storage resources 190A-B, and may configure the VDL 150C to include a high-performance storage resource 190C.

The log provisioner 131 may be configured to combine storage resources 190A-Y into VDL 150A-N having particular performance and/or reliability characteristics. As disclosed in further detail herein, the data services module 110 may include an allocation policy 147, comprising I/O requirements and/or preferences of the clients 106. The log provisioner 131 may be configured to create VDL 150A-N capable of satisfying the I/O requirements of the clients 106 per the allocation policy 147. The log provisioner may, for example, assign a single high-performance storage resource to VDL 150B in response to QoS requirements of a particular client 106. In another embodiment, the log provisioner 131 may be configured to combine redundant, low-performance storage resources 190A-B into a VDL 150A in response to I/O requirements of a different client 106 (e.g., requirements for reliable, high-capacity storage services).

The data services module 110 may further include a log assignment module 144 configured to assign clients 106 (and/or LIDs allocated thereto) to respective VDL 150A-N. The assignments may be based on, inter alia, profile information of the storage resources 190A-Y comprising the VDL 150A-N and/or requirements of the clients 106. The assignments may be configured to provide clients 106 with a particular QoS, storage-tiering level, persistent level, and/or the like. The I/O requirements and/or preferences of the clients 106 may be embodied in an allocation policy 147. The log assignment module 144 may, therefore, be configured to assign VDLs 150A-N to clients 106 based on a) profile information 116A-Y pertaining to the storage resources 190A-Y comprising the VDLs 150A-N and/or b) the allocation policy 147.

As disclosed above, the allocation policy 147 may correspond to I/O requirements and/or preferences of particular clients 106 (e.g., applications, services, and/or the like). The allocation policy 147 may comprise a QoS requirement of a particular client 106. The QoS policy of a client 106 may correspond to properties of the I/O services provided to the client 106 through the data services module 110, such as input/output bandwidth, input/output latency (e.g., response time), persistence level (e.g., RAID level), high-availability requirement(s), and/or the like. In other embodiments, the allocation policy 147 may comprise a persistence level requirement of a client 106, such as a requirement that data of the client 106 be stored redundantly and/or in a RAID configuration. The data services module 110 may be configured to acquire information pertaining to the I/O requirements of particular clients 106 and/or I/O requests 113 using any suitable mechanism including, but not limited to: receiving I/O requirements and/or preferences through the interface 112, through a storage interface (e.g., as fadvise parameters, IOCTL parameters, and/or the like), and/or the like.

The log assignment module 144 may be configured to associate clients 106 with particular VDLs 150A-N by, inter alia, pairing clients 106 with VDLs 150A-N comprising storage resources 190A-Y that are capable of satisfying the I/O requirements of the clients 106. Assigning a client 106 to a VDL 150 may, therefore, comprise comparing requirements and/or preferences of the client 106 in the allocation policy 147 to profile information 116A-Y corresponding to the storage resources 190A-Y. In the FIG. 3A embodiment, the storage resources 190A and 190B may comprise high-capacity, low-performance storage systems that are configured for redundant storage, and the storage resource 190C may comprise a lower-capacity, higher-performance solid-state storage system. The log assignment module 144 may be configured to assign VDL 150C to clients 106 that require high-performance I/O, and to assign VDL 150A to clients 106 that require redundant storage and/or do not require high-performance I/O. Further embodiments of systems and methods for assigning storage resources 190A-Y to clients 106 (and/or particular I/O requests 113) are disclosed in U.S. patent application Ser. No. 13/829,835 entitled "Systems and Methods for Adaptive Persistence," filed Mar. 14, 2013 for David Flynn et al., which is hereby incorporated by reference.

The storage resource manager 114 may be configured to acquire information pertaining to the availability and/or usage characteristics of the storage resources 190A-Y, and to incorporate the acquired information into the profile information 116A-Y. The acquired information may include, but is not limited to: the availability of logical and/or physical capacity on the storage resources 190A-Y, workload on the storage resources 190A-Y, I/O bandwidth to/from the storage resources 190A-Y (e.g., load on the interconnect 115), data transfer rates, observed latency for storage operations performed on the storage resources 190A-Y, reliability of the storage resources 190A-Y (e.g., observed error rate), and/or the like.

The log assignment module 144 may use information pertaining to the operating state of the storage resources 190A-Y to determine log assignments. In one embodiment, the log assignment module 144 is configured to avoid overloading one or more of the storage resources 190A-Y. As disclosed above, the VDL 150B may correspond to a high-performance storage resource 190C and, as such, may be assigned to clients having particular requirements (e.g., particular QoS requirements). The log assignment module 144 may determine that the storage resource 190C is nearing capacity and that assigning additional workload would degrade performance of the VDL 150B, such that the QoS of one or more clients 106 would no longer be met. In response, the log assignment module 144 may a) assign other clients 106 to one or more other VDL 150A-N (e.g., VDL A), and/or b) move storage operations of one or more clients 106 to another VDL 150A-N.

Figure 3B:
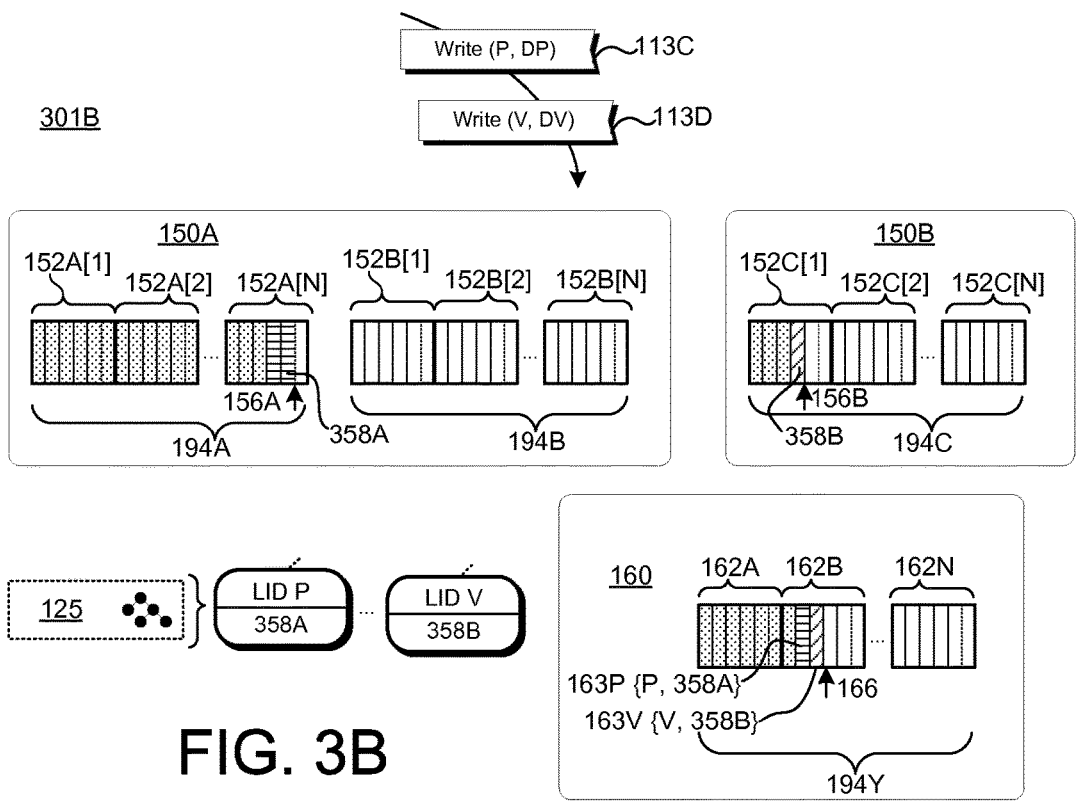
FIG. 3B depicts further embodiments of log operations.

FIG. 3B depicts embodiments 301B of log storage operations of the data services module 110 of FIG. 3A. In the FIG. 3B embodiment, the data services module 110 may receive I/O requests 113C and 113D to write data DP and DV to LIDs P and V, respectively. The LID P may be assigned to VDL 150A and the LID V may be assigned to VDL 150B based, inter alia, on I/O requirements of the clients 106 corresponding to the respective I/O requests 113C and 113D, as disclosed above.

The data services module 110 may be configured to service the I/O requests 113C and 113D by a) appending data DP to VDL 150A (at append point 156A), and appending data DV to VDL 150B (at append point 156B), and b) writing corresponding mapping entries 163P and 163V to the metadata log 160. The data services module 110 may be configured to append data DP and/or DV out-of-order with respect to the I/O requests 113C and/or 113D. As disclosed above, the storage resource 190C of VDL 150B may comprise a high-performance SSD storage device and, as such, the storage operation in VDL 150B may complete before the storage operation in VDL 150A. Additionally, other I/O requests 113 received after I/O requests 113C and/or 113D may complete within other VDL 150B-N before the operation(s) to write data DP to the VDL 150A is complete. The metadata log 160, however, may be configured to maintain a temporal order of I/O requests 113 (including I/O requests 113C and 113D). In particular, the metadata log module 134 may be configured to append the entries 163P and 163V to the metadata log 160 in accordance with the order in which the I/O requests 113C and 113D were received, regardless of the order in which the corresponding storage operations are completed within the respective VDLs 150A and/or 150B.

As illustrated in FIG. 3B, the entries 163P and 163V in the metadata log 160 may be configured to bind LIDs P and V to the data appended to VDLs 150A and 150B. The entry 163P may be configured to bind LID P to the log storage unit 358A in VDL 150A (on storage resource 190A), and the entry 163V may be configured to bind LID V to log storage unit 358B in VDL 150B (on storage resource 190C). The mapping entries 163P and 163V may correspond to entries 126 in the forward map 125, as disclosed herein.

Figure 3C:
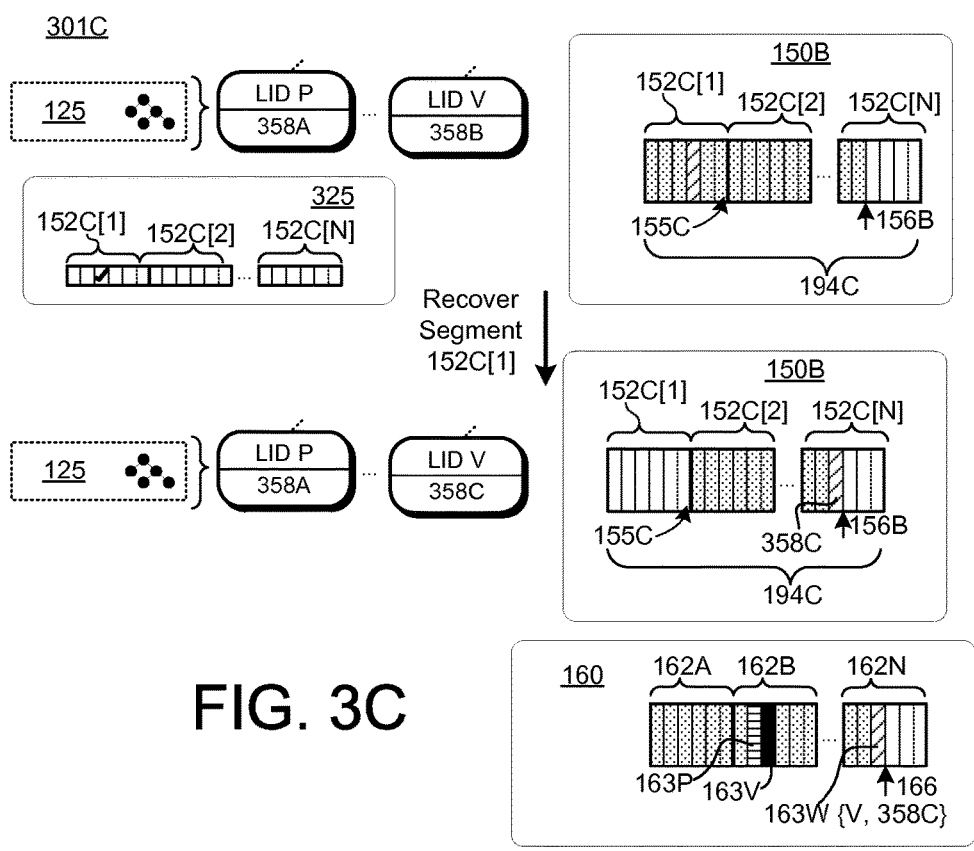
FIG. 3C depicts embodiments of recovery operations.

FIG. 3C depicts embodiments 301C of storage recovery operations of the data services module 110. In the FIG. 3C embodiment, the garbage collector 136 may be configured to scan the VDL 150A-N to identify segments to recover. In some embodiments, each VDL 150A-N may comprise a respective garbage collector 136 configured to reclaim segments within the VDL 150A-N. Alternatively, and as illustrated in FIG. 3A, a single garbage collector 136 may be configured to manage storage recover operations within the VDL 150A-N.

As disclosed above, the garbage collector 136 may comprise a scan module 236A configured to identify segments 152 to recover based, inter alia, on the amount and/or proportion of invalid data in the segments 152. In the FIG. 3B embodiment, the scan module 236A may be configured to identify invalid data in the VDL 150B using a mark-and-sweep operation. The mark-and-sweep operation implemented by the scan module 236A may comprise initializing a validity data structure 325 corresponding to identifiers of the storage resource 190C comprising the VDL 150B. The validity data structure 325 may comprise a bitmap comprising entries corresponding to virtual blocks 145C (and/or virtual addresses 195C) of the storage resource 190C. The validity data structure 325 may be partitioned into sections corresponding to the segments 152C[1]-152C[N] comprising the VDL 150B. Initializing the validity data structure 325 may comprise setting each entry to "invalid" (e.g., clearing the bitmap). The mark-and-sweep operation may further comprise traversing the forward map 125 to identify valid data in the VDL 150B, which may comprise marking entries as "valid" in response entries 126 in the forward map 125 that bind the corresponding log storage units 155 (virtual blocks 145C and/or virtual addresses 195C) to a LID. Accordingly, log storage units 155C and/or virtual blocks 145C that exist in the forward map 125 are marked as valid during the sweep of the forward map 125, and log storage units 155C that do not exist in the forward map 125 remain marked as invalid. In the FIG. 3C embodiment, the log storage unit 358B comprising data DV is marked as valid in the mark-and-sweep operation. Accordingly, the other log storage units 155C in the segment 152C[1] may be considered invalid and need not be relocated in the recovery operation. Determining validity information using a mark-and-sweep approach may obviate the need for maintaining explicit reference counts and/or other metadata to identify virtual addresse(s) that are currently in use. The data services module 110 may, therefore, be capable of implementing a large number of logical copy and/or snapshot operations without limitations imposed by reference count overhead.

The relocation plan module 236B may be configured to determine a relocation plan for the valid data (data DV in log storage unit 358B). As disclosed above, the relocation plan may be based on, inter alia, profile information pertaining to the source of the valid data in the VDL 150B and/or destination of the valid data in the VDL 150B. In the FIG. 3C embodiment, the source and destination are the same (storage resource 190C). The profile information 116C pertaining to the storage resource 190C may indicate that the storage resource 190C is capable of performing logical move operations. As disclosed above, a logical move operation refers to an operation to modify the identifier and/or address of data within the namespace of a storage resource (e.g., in the storage resource address space 194A) without re-writing the data. In the FIG. 3C embodiment, the relocation plan module 236B may, therefore, determine that a logical move operation is to be used to relocate the data DV from log storage unit 358B to a new log storage unit 155 in segment 152C[N] (at append point 156B). The relocation implementation module 236C may be configured to implement the logical move operation on the storage resource 190C by use of the storage resource manager 114, as disclosed herein. The relocation operation may further comprise updating the forward map 125 to bind LID V to the storage unit 358C, and appending a corresponding mapping entry 163W to the metadata log 160, as disclosed herein. As illustrated in FIG. 3C, appending the mapping entry 163W renders the mapping entry 163V invalid due, inter alia, to the log order of the entries 163W and 163V within the metadata log 160.

Referring back to FIG. 3A, the data services module 110 may further include a virtualization service module (VSM) 146, which may be configured to efficiently implement logical manipulation operations configured to modify the logical interface to data managed by the data services module 110. As disclosed above, the "logical interface" to data stored within the VDL 150 refers to, inter alia, the identifiers (e.g., LIDs) used to reference the data. Therefore, a logical manipulation operation refers to an operation pertaining to mappings, bindings, associations, and/or ties between LIDs and data stored within a VDL 150A-N. Logical manipulation operations may include operations configured to manipulate the logical address space 122 by, inter alia, manipulating associations between LIDs and/or data stored within one or more VDLs 150A-N. As disclosed in further detail herein, the logical manipulation operations implemented by the VSM 146 may be configured to modify the logical interface to data without re-writing the data within the VDL(s) 150A-N and/or without modifying data stored in the VDL(s) 150A-N. The logical manipulation operations implemented by the VSM 146 may include, but are not limited to: logical move operations (e.g., modify the LIDs bound to data stored within one or more VDLs 150A-N), logical copy operations (e.g., clone and/or replicate data stored within one or more VDLs 150A-N by, inter alia, referencing the data through two or more different sets of LIDs), copy-on-write operations, logical merge operations, and/or the like. Logical manipulation operations implemented by the data services module 110 may be persistent and crash safe. In some embodiments, the metadata log module 134 is configured to append logical manipulation entries 173 to the metadata log 160 in response to logical manipulation operations implemented by the data services module 110. The metadata log 160 may, therefore, include an ordered, persistent record of logical manipulation operations performed by the data services module 110. As used herein, a "logical manipulation entry" (LME) 173 refers to persistent data stored in the metadata log that is configured to indicate one or more modification(s) to the logical interface to data in a VDL 150A-N. An LME 173 may comprise a packet, note, persistent note, and/or other data structure stored within the metadata log 160. As illustrated in FIG. 3A, an LME 173 may correspond to a plurality of different logical operations A-N, which may be configured to alter associations between data stored in one or more of the VDL 150A-N and identifier(s) of the logical interface 122. As disclosed above, the logical operations A-N recorded in an LME 173 may include, but are not limited to: operations to associate data with different set(s) of LIDs (e.g., logical move operations), operations to associate data with a plurality of different set(s) of LIDs (e.g., logical copy operations), operations to merge one or more different sets of LIDs (e.g., logical merge operations), and so on. An LME 173 may be ordered relative to other metadata in the metadata log 160 (e.g., mapping entries 163, aggregate mapping entries 167, checkpoint entries 168, and so on), as disclosed above.

The DVM 140 may comprise one or more logical manipulation modules 141A-N configured to implement logical manipulation operations. The logical manipulation modules 141A-N may include a logical move module 141A configured to implement logical move operations. As used herein, a "logical move," "virtual move," and/or "range move" operation refers to an operation configured to modify the LIDs bound to data stored in a VDL 150 A-N. A logical move operation may comprise: a) modifying one or more entries 126 in the forward map 160, and b) appending corresponding metadata to the metadata log 160 (e.g., LME 173). Logical move operations may be implemented without modifying the corresponding data stored in the VDL 150A-N and/or without appending data to the VDL 150A-N.

Figure 3D:
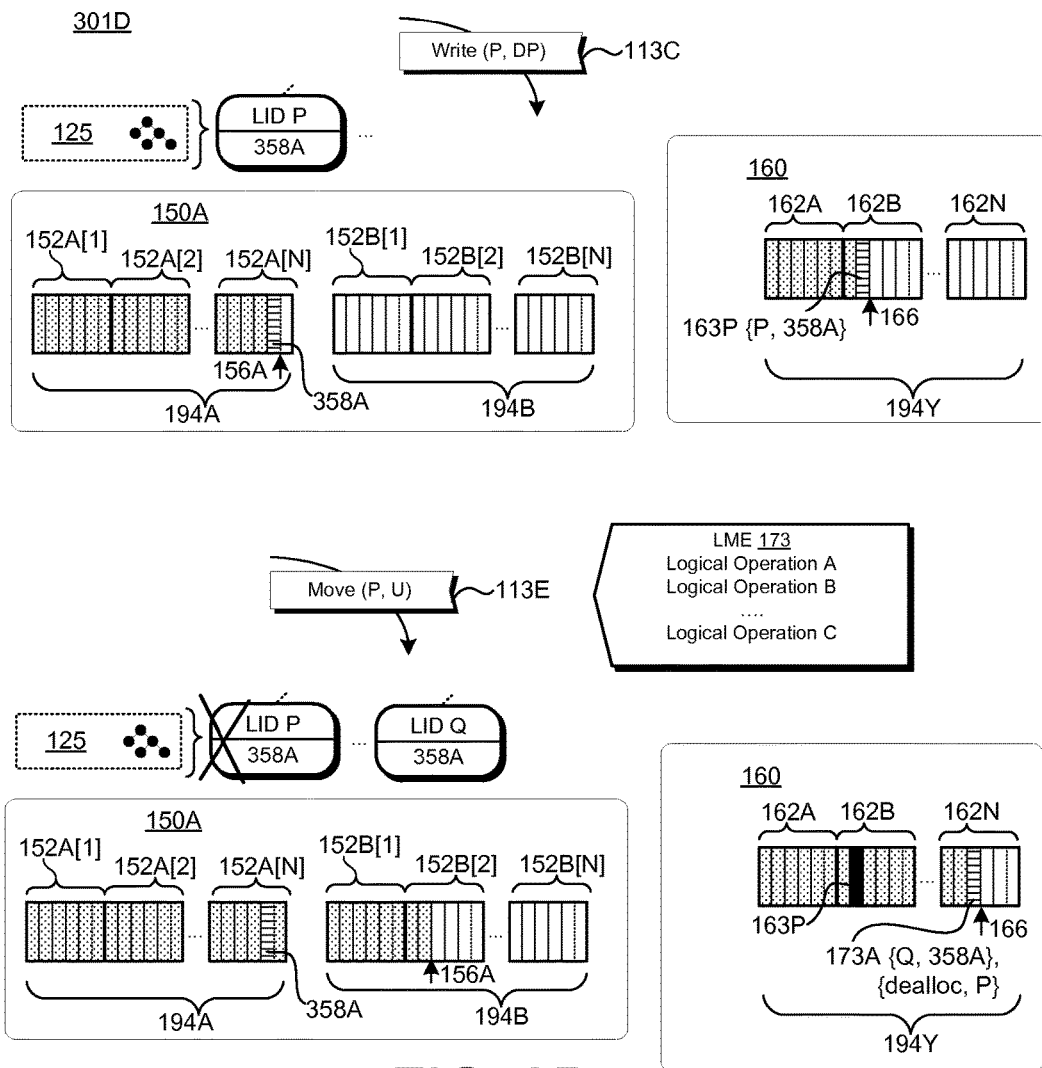
FIG. 3D depicts embodiments of logical move operations.

FIG. 3D depicts one embodiment of a logical move operation implemented by the data services module 110 and VSM 146. In the FIG. 3D embodiment 301D, the data log module 132A has serviced an I/O request 113C to write data DP to LID P. As disclosed above, servicing the I/O request 113C may comprise appending the data DP to a log storage unit 358A of VDL 150A, updating a mapping pertaining to LID P in the forward map 125, and/or writing a mapping entry 163P to the metadata log 160 to associate LID P with the log storage unit 358A comprising the data DP.

After servicing the I/O request 113C, the data services module 110 may receive an I/O request 113E to perform a logical move operation to move data of LID P to LID U. The I/O request 113E may be received through the interface 112 of the data services module 110, as disclosed herein. The VSM 146 may be configured to implement the logical move operation of the I/O request 113E by a) updating the forward map 125 to bind LID U to the data at log storage unit 358A, and b) appending an LME 173A to the metadata log 160. The LME 173A may correspond to the logical move operation and, as such, may be configured to indicate that the data DP stored at log storage unit 358A is bound to LID U. The LME 173A may be further configured to indicate that LID P is no longer associated with the data DP (e.g., deallocate LID P). The LME 173A may invalidate the original mapping entry 163P due to, inter alia, the log order of the mapping entry 163P and the LME 173A within the metadata log 160 (the LME 173A is later in the metadata log 160 than the original, pre-move mapping entry 163P).

As illustrated in FIG. 3D, the logical move operation may be implemented without modifying the data DP stored within the VDL 150A and without appending data to VDL 150A. The I/O request 113E may, therefore, be serviced by exclusive use of the metadata log 160. Implementing the virtual move operation includes updating volatile metadata (forward map 125) and appending the LME 173A to the metadata log 160. As disclosed above, the LME 173A is configured to record the association between LID U and the data DP and remove the association to LID P. Although a particular implementation of a logical move is described herein, the disclosure is not limited in this regard, however, and could be adapted to implement logical move operations using any suitable form of logical manipulation metadata, such as an LME 173A configured to indicate that data associated with LID P is now associated with LID U (e.g., {move P, U}) and/or other data structure.

Figure 3E:
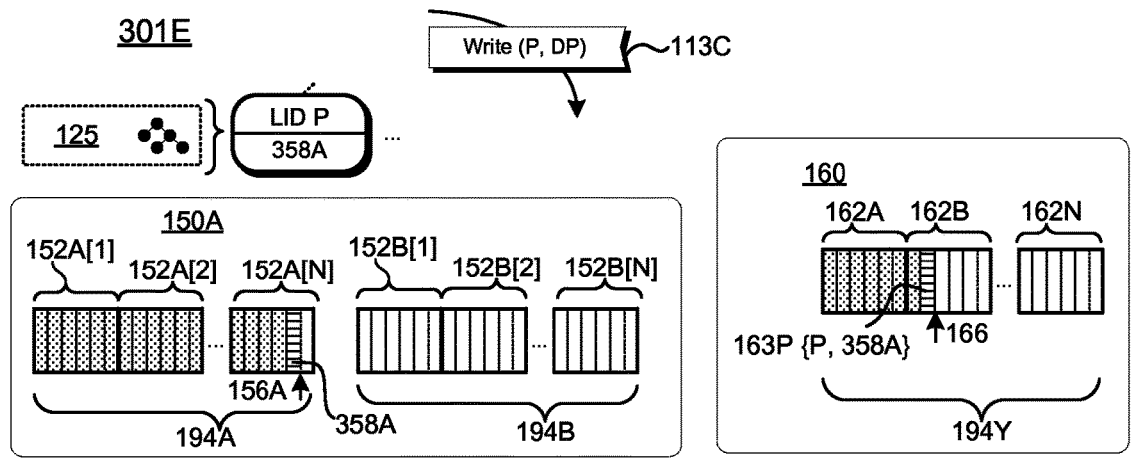
FIG. 3E depicts embodiments of logical copy operations.
Figure 3E:
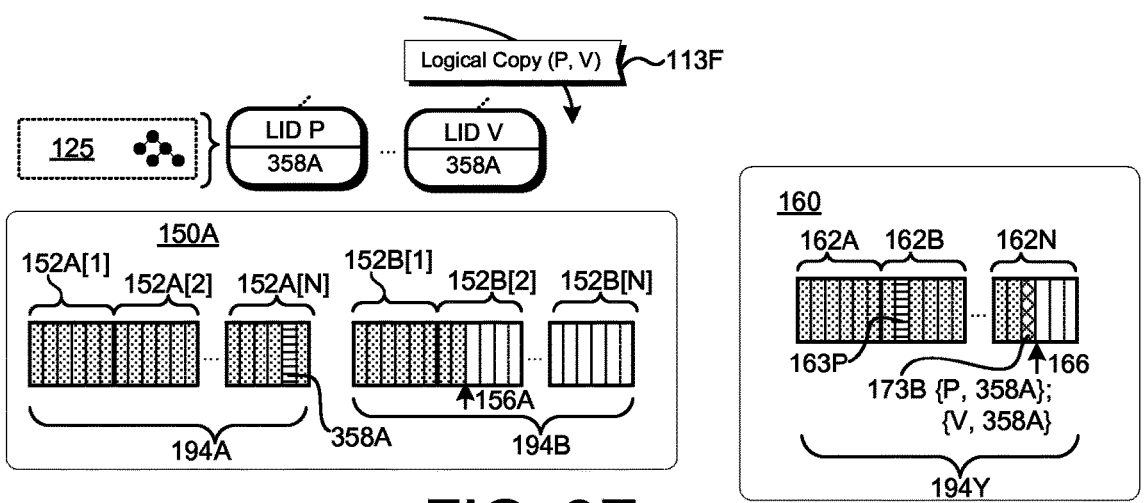

The DVM 140 may comprise a logical replication module 141B configured to implement logical copy operations. As used herein, a "logical copy," "logical replication," and/or "virtual copy" operation refers to an operation to associate two or more different LIDs with the same data in the VDL 150A-N. FIG. 3E depicts one embodiment 301E of a logical copy operation implemented by the data services module. In the FIG. 3E embodiment 301E, the data services module 110 may have serviced the I/O request 113C to write data DP to LID P (at log storage unit 358A of VDL 150A), as disclosed herein. After servicing the I/O request 113C, the data services module 110 may receive an I/O request 113F to create a logical copy of LID P. As disclosed herein, the data services module 110 may be configured to implement logical copy operations without replicating data within the VDL 150A-N (e.g., without creating separate copies of the data within the VDL 150), modifying data stored in the VDL 150A-N, and/or appending data to the VDL 150A-N.

Implementing the logical copy operation of FIG. 3E may comprise a) recording an association between LID V and the data of LID P in the forward map 125 and b) appending an LME 173B to the metadata log 160 configured to indicate that LID V is associated with log storage unit 358A. The mapping entry 163P configured to indicate that LID P is associated with data DP may remain valid. In some embodiments, and as illustrated in FIG. 3E, the LME 173B may be configured to indicate that both LID P and LID V are mapped to log storage unit 358A (e.g., may comprise metadata configured to associate both LIDs P and V to data log storage unit 358A). Alternatively, the LME 173B may indicate that a logical copy operation has been performed (e.g., record the logical copy as copy {P, V}). The data services module 110 may implement the logical copy operation of the I/O request 113E without modifying data in the VDL 150A and without appending data to the VDL 150A.

Figure 3F:
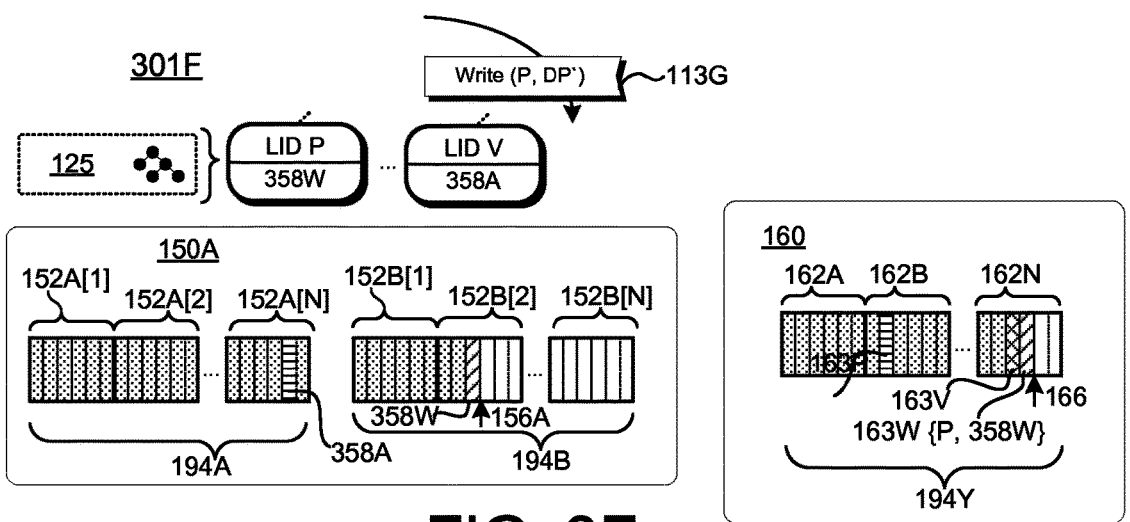
FIG. 3F depicts further embodiments of log operations.

The mapping between LID V and data DP (at log storage unit 358A) may be maintained regardless of subsequent modifications to LID P in subsequent I/O requests. FIG. 3F depicts one embodiment 301F of an operation to write data to LID P, which may comprise overwriting data DP with DP' (e.g., a copy-on-write operation). The data services module 110 may be configured to service the I/O request 113G by a) writing data DP' to the VDL 150A, which may comprise storing DP' in log storage unit 358W, b) associating LID P with log storage unit 358W in the forward map 125, and c) appending a mapping entry 163W to the metadata log 160. The mapping entry 163W appended to the metadata log 160 may be configured to bind LID P to the log storage unit 358W comprising data DP'. The LME 173B configured to associate LID V with data DP at log storage unit 358A (and the corresponding entry 126 in the forward map 125) may remain valid. Accordingly, LID V may continue to reference data DP, and LID P may reference modified data DP'. Moreover, the garbage collector 136 may determine that DP is valid, despite the removal of the binding to LID P due, inter alia, to the mapping between DP and LID V reflected in the forward map 125 and/or metadata log 160.

Figure 4A:
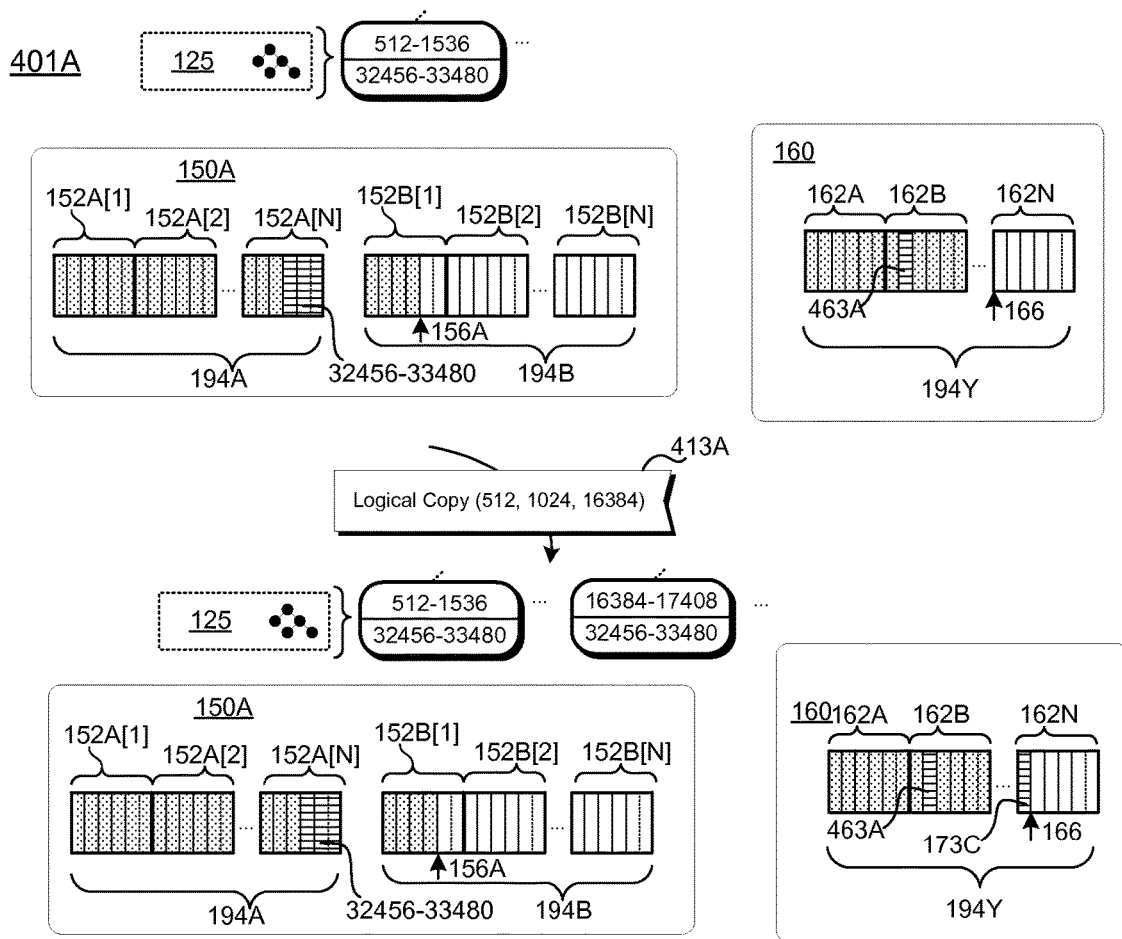
FIG. 4A depicts embodiments of logical copy operations.

The operations implemented by the VSM 146 may be performed on LID vectors, which may comprise sets, ranges, and/or extents of LIDs. A vector may be defined using a starting address (LID), range (size), and/or destination address. FIG. 4A depicts another embodiment 401A of a logical copy operation implemented by the data services module 110. The logical copy operation depicted in FIG. 4A may comprise a vector operation. The vector operation of the I/O request 413A may comprise a request to create a logical copy of the LID range 512-1536 (a vector starting at LID 512 having extent 1024) at LID 16384. The LID range 512-1536 may correspond to data stored in the VDL 150A. Accordingly, the forward map 125 of FIG. 4A includes an entry configured to bind LIDs 512-1536 to log storage units 32456-33480. Although in FIG. 4A the LID range 512-1536 corresponds to a single entry 126 in the forward map 125, the disclosure is not limited in this regard, and could include any number of entries 126 corresponding to the LID range 512-1536, bound to different log storage unit(s) within the VDL 150A. The metadata log 160 may comprise a mapping entry 463A configured to bind the LIDs 512-1536 to the log storage units 32456-33480, as disclosed above.

The interface module 112 may receive the I/O request 413A to create a logical copy of the LID range 512-1536. The data services module 110 may be configured to service the I/O request 413A by use of, inter alia, the VSM 146. Servicing the I/O request 413 may comprise a) altering the forward map 125 to associate the data of LIDs 512-1536 with LIDs 16384-17408 and b) appending an LME 173C to the metadata log corresponding to the logical copy operation. The LME 173 may be configured to indicate that LIDs 16384-17408 are associated with the same data as the source LID vector 512-1536 (e.g., bind the destination LIDs 16384-17408 to the log storage units 32456-33480). As disclosed above, the data services module 110 may implement the vector logical copy operation without modifying the corresponding data stored within the VDL 150A and/or without appending data to the VDL 150A.

Figure 4B:
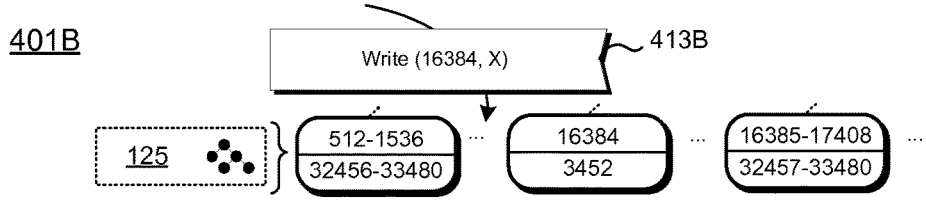
FIG. 4B depicts embodiments of copy-on-write operations.

The data services module 110 may be configured to manage logical copies, such that storage operations in the LID range 512-1536 do not affect the corresponding logical copies (e.g., LID range 16384-17408). The data services module 110 may, therefore, be configured to implement copy-on-write operations within the respective LID vectors 512-1536 and 16384-17408. In embodiment 401B illustrated in FIG. 4B, for example, the data services module 110 may service an I/O request 413B to write data X to LID 16384. In response, the data services module 110 may a) append data X to the VDL 150A at log storage unit 3254 (on storage resource 190B), b) append a mapping entry 463B configured to bind LID 16384 to log storage unit 3254 on storage resource 190B, and c) modify the forward map 125 to bind LID 16384 to log storage unit 3254. The LIDs 512-1536 may be unaffected (continue to reference data stored on log storage units 32456-33480). Moreover, unchanged portions of the logical copy (LIDs 16385-17408) may continue to reference the logical storage units 32457-33480. The binding between LID 16384 and 32456, however, is removed (rendered obsolete) by the new binding to log storage unit 3254. The data stored at log storage unit 32456 may continue to be considered valid by the scan module 236A due to the remaining association between LID 512 and the log storage unit 32456 (e.g., the mark-and-sweep algorithm will mark the log storage unit 32456 valid in response to the binding to LID 512). As illustrated in FIG. 4B, the logical copy operation may be completed without modifying data stored in the VDL 150A and/or without appending data to the VDL 150A.

The DVM 140 may comprise a logical merge module 141N configured to implement logical merge operations. As used herein, a logical merge operation refers to combining two or more different sets, ranges, and/or extents of LIDs. A merge operation may comprise, for example, merging LIDs 512-1536 with LIDs 16385-17408. The VSM 146 may be configured to perform merge operations in accordance with a merge policy. As used herein, a "merge policy" refers to mechanisms and/or rules for resolving merge conflicts (e.g., differences in the LID vectors to be merged). A merge policy may include, but is not limited to: a write-order policy in which more recent modifications override earlier modifications; a priority-based policy based on the relative priority of storage operations and/or LID vectors (e.g., based on properties of the clients 106 and/or I/O requests 113); a completion indicator (e.g., completion of an atomic storage operation, failure of an atomic storage operation, or the like, as disclosed in further detail herein); and/or the like. Clients 106 may specify a merge policy in an I/O request (as an I/O request parameter), through the interface 112 (e.g., set a default merge policy), by use of fadvise parameters or IOCTL parameters, and/or the like.

Figure 4C:
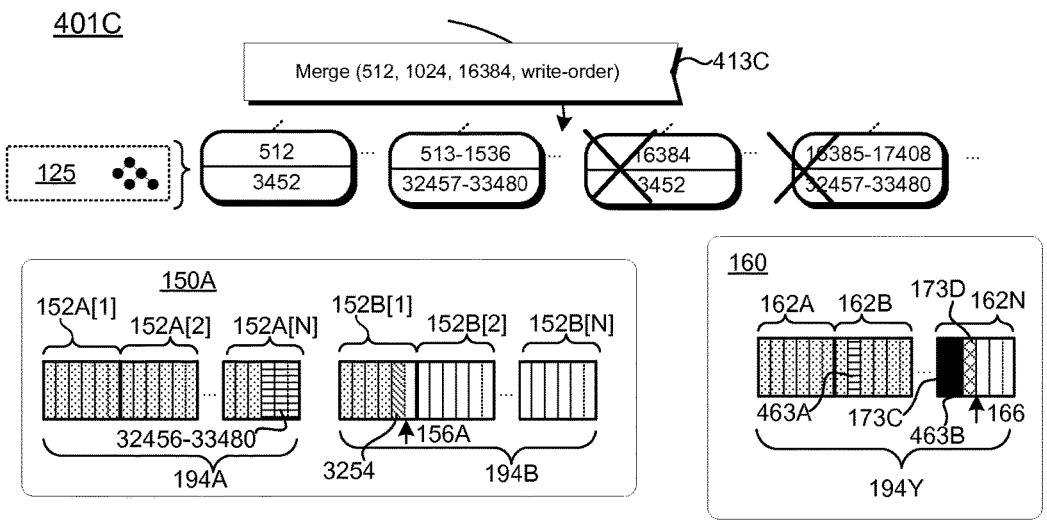
FIG. 4C depicts embodiments of logical merge operations.

FIG. 4C depicts one embodiment 401C of a logical merge operation to merge LIDs 512-1536 with LIDs 16385-17408. The logical merge operation of FIG. 4C may be performed in response to an I/O request 413C received through the interface 112 of the data services module 110, as disclosed herein. In the FIG. 4C embodiment, the I/O request 413C identifies the destination vector for the merge operation (LID 512, length 1024), identifies the LID vector(s) to be merged (LIDs 16384-17408), and specifies a "write-order" merge policy (data written later trumps older data). In the FIG. 4C embodiment, the destination vector corresponds to one of the source vectors (LID range 512-1536). The logical merge operation may, therefore, comprise folding the LID range 16384-17408 into the destination range 512-1536. In other embodiments, the destination vector may be a separate and/or independent LID range (e.g., the LID ranges 512-1536 and 16384-17408 may be merged into a new LID range 10240-11264).

The merge I/O request 413C may be received after servicing the I/O request 413B to write data X to LID 16384. Accordingly, the LID 16384 may be bound to log storage unit 3254 on storage resource 190B, as illustrated in FIG. 4B. As disclosed above, a logical merge operation may comprise combining LID ranges to selectively incorporate modifications made within the respective ranges. In the FIG. 4C embodiment, the only modification that occurred after the logical copy operation was the I/O request 413B to write data X to LID 16384. Accordingly, the only potential merge conflict is between the original data at log storage unit 32456 and data X at log storage unit 3254. The conflict may be resolved by use of a conflict policy, which in the FIG. 4C embodiment is a "write-order" policy (as specified in the I/O request 413C). Based on the merge policy, data X at log storage unit 3254 may override the original data at log storage unit 32456 based on the relative log order of the corresponding storage operations. The data at log storage unit 32456 may, therefore, be unreferenced in the forward map 125 and, as such, may be removed in a subsequent garbage collection operation in the VDL 150A. Servicing the logical merge I/O request 413C may further comprise writing an LME 173D to the metadata log 160 corresponding to the logical merge operation. The LME 173D may be configured to indicate that a) LID 512 is associated with log storage unit 3254 (in accordance with the merge policy disclosed above), and that b) the LID range has been deallocated 16385-17408. The LME 173D may, therefore, invalidate the mapping entry 463B corresponding to the logical copy operation (bound LIDs 16384-17408 to storage units 32456-33480), and the mapping entry 463B that bound LID 16385 to log storage unit 3254. The logical merge operation may further include updating the forward map 125 to bind LID 512 to log storage unit 3254 and to remove references to LIDs 16384-17408. As illustrated in FIG. 4C, the logical merge operation may be completed without modifying the corresponding data stored in the VDL 150A and/or without appending data to the VDL 150A.

Figure 5A:
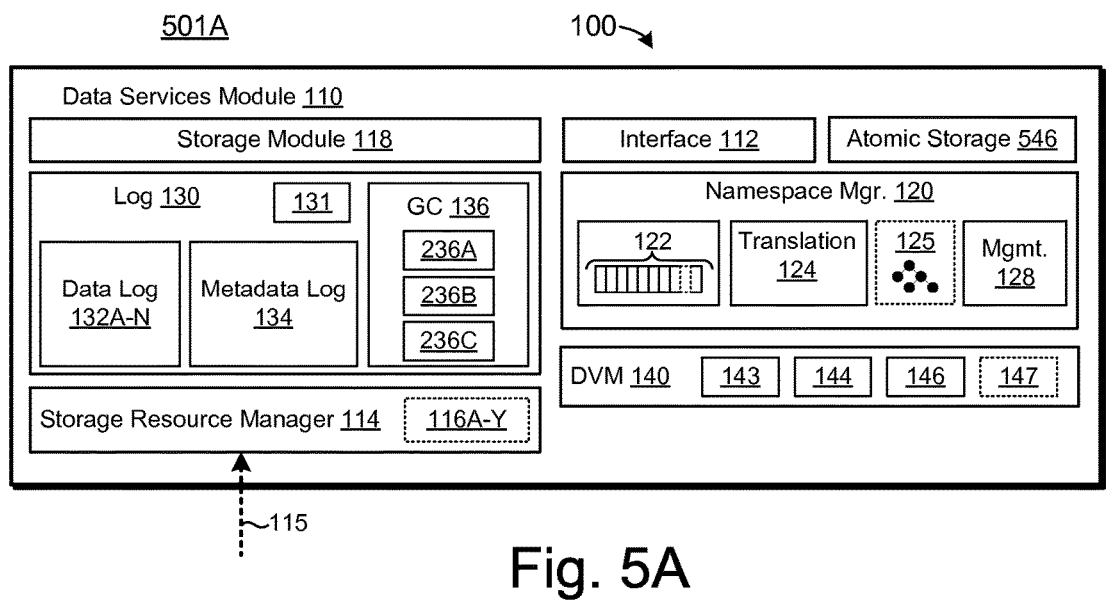
FIG. 5A depicts an embodiment of a data services module configured to implement atomic storage operations.

The efficient logical manipulation operations implemented by the VSM 146 may be used to implement other higher-level storage operations, including, but not limited to: atomic storage operations, transactions, snapshots, and/or the like. Referring to embodiment 501A depicted in FIG. 5A, the data services module 110 may comprise an atomic storage module 546 configured to service atomic storage requests. The data services module 110 may be implemented in conjunction with a computing system 100 and may be communicatively coupled to storage resources 190A-Y and clients 106, as disclosed herein.

Figure 5B:
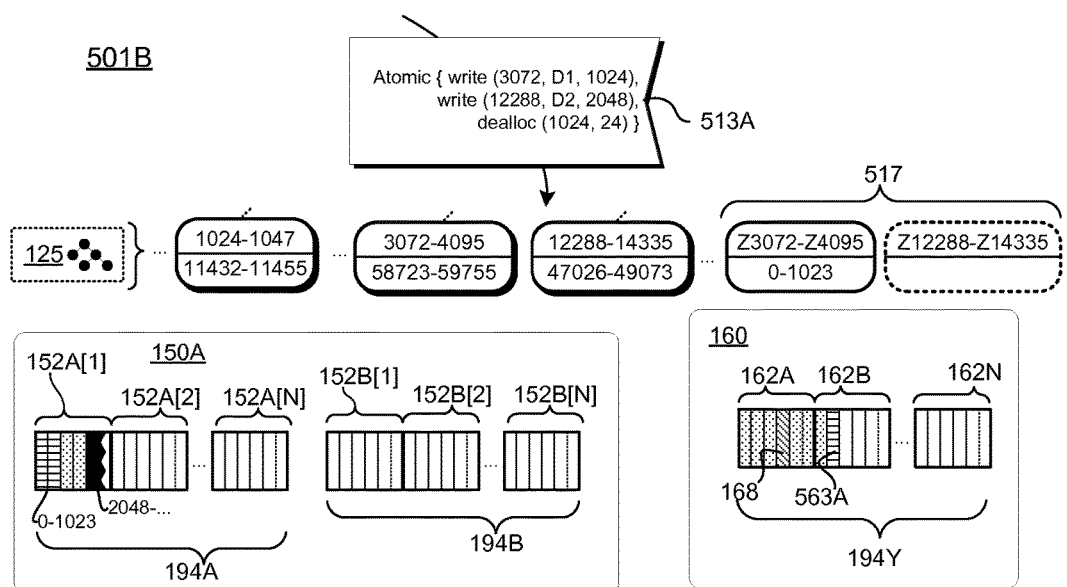
FIG. 5B depicts embodiments of atomic storage operations.

As used herein, an atomic storage operation refers to a storage operation that is either fully completed as a whole or rolled back. Accordingly, atomic storage operations may not be partially completed. Implementing an atomic storage request may comprise: a) creating a logical or "transactional" copy of one or more vectors pertaining to the atomic storage operation, b) performing storage operations of the atomic operation in the transactional vectors, and c) performing a logical move and/or merge operation to relocate the transaction vectors to the destination vectors of the atomic storage request. The atomic storage module 546 may be further configured to service composite and/or vector atomic storage operations, which may comprise a plurality of different storage operations pertaining to one or more different vectors. As illustrated in embodiment 501B of FIG. 5B, a composite atomic storage request (I/O request 513A) may comprise a request to a) write data D1 to LID range 3072-4095, b) write data D2 to LID range 12288-14335, and c) deallocate the LID range 1024-1047. The atomic storage module 546 may be configured to service the I/O request 513A by use of the data services module 110 and/or VSM 146, as disclosed above. Servicing the I/O request 513A may comprise allocating transactional vectors 517 corresponding to the LID ranges 3072-4095 and 12288-14335. Allocating a transactional vector 517 may comprise a logical copy operation as disclosed herein (e.g., creating a virtual copy of source LID vectors 3072-4095 and/or 12288-14335). Alternatively, and as illustrated in FIG. 5B, in embodiments in which the atomic storage operation(s) do not comprise reading and/or accessing data in the target vectors (e.g., the vectors are only used for write operations as in I/O request 513A as opposed to read-modify-write operations), the atomic storage module 546 may be configured to allocate the transactional vectors 517 without performing a logical copy (e.g., without binding LIDs of the transactional vectors to data of the corresponding vectors in the atomic storage request).

The atomic storage module 546 may be configured to create the transactional vectors 517 in a designated section or region of the logical address space 122 and/or in a separate namespace, such that the LIDs of the transactional vectors 517 can be distinguished from other non-transactional LIDs. In the FIG. 5B embodiment, the atomic storage module 546 is configured to allocate transactional vectors 517 comprising transactional LIDs Z3072-Z4095 and Z12288-Z14335, which correspond to a separate namespace from the logical address space 122. In other embodiments, the transactional vectors 517 may correspond to LIDs in a designated region and/or section of the logical address space 122, as disclosed above. As illustrated in FIG. 5B, the forward map 125 may include entries 126 corresponding to existing data pertaining to the vectors 3072-4095 and 12288-14335. The mapping information of the entries 126 may be stored in a checkpoint entry 168 in the metadata log 160. The transactional vectors 517 may be represented as allocation entries in the forward map 125 (e.g., may correspond to LIDs that are allocated for use in servicing the I/O request 113B, but are not yet bound to data stored in the VDL 150A-N). Although the transactional vectors 517 are represented in the forward map 125, the disclosure is not limited in this regard and could be adapted to manage entries representing transactional vectors and/or LIDs in one or more separate mapping data structures.

Servicing the atomic storage request may further comprise assigning a VDL 150A-N to the transactional vectors 517 (and/or target vectors of the atomic I/O request 513A). In the FIG. 5B embodiment, the log assignment module 144 is configured to assign the VDL 150A to the storage operations pertaining to the transactional vectors. The log assignment may be based on the client 106 and/or LIDs associated with the atomic storage request (LIDs 3072-4095 and 12288-14335), such that the storage operations pertaining to the transactional vectors are performed on the same VDL 150A-N that would have been assigned to the original vectors of the atomic storage request (using the log assignment module 144, disclosed above).

The atomic storage module 546 may be configured to implement the atomic storage operations of the I/O request 513A using the transactional vectors 517, which may comprise appending data D1 and D2 to a VDL 150A-N. As illustrated in FIG. 5B, the atomic storage module 546 may implement the request to write data D1 to vector 3072, 1024 by a) appending the data D1 to log storage units 0-1023 within the VDL 150A, b) mapping the transactional LIDs Z3072-Z4095 to the data D1 in the forward map 125, and c) recording a corresponding mapping entry 563A in the metadata log 160. Other data that is unrelated to the atomic storage request may be appended to the VDL 150A at log storage units 1024-2047. The atomic storage module 546 may be further configured to implement the request to write data D2, by, inter alia, appending data D2 to the VDL 150A beginning at log storage unit 2048. As depicted in FIG. 5B, however, an invalid shutdown condition may occur before the operation is completed. The invalid shutdown may result in loss of the forward map 125. In response, the metadata management module 128 may be configured to rebuild the forward map 125 (and/or other virtualization metadata) using, inter alia, the contents of the ordered metadata log 160.

Figure 5C:
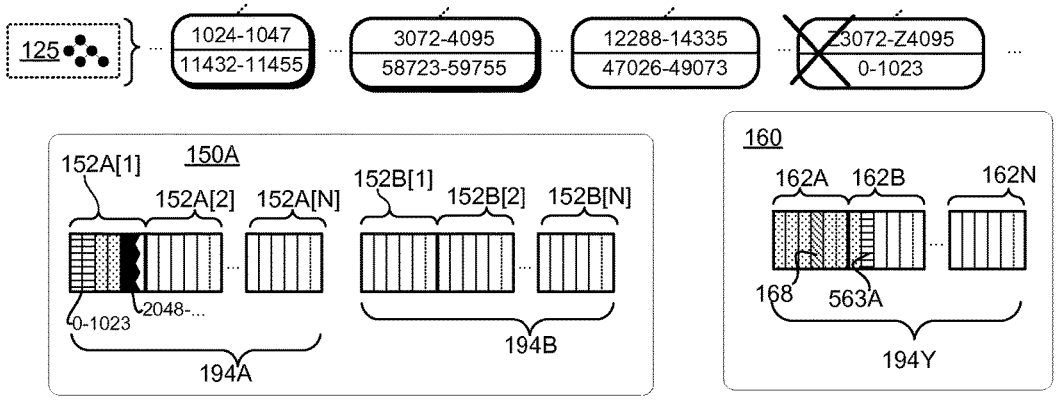
FIG. 5C depicts further embodiments of atomic storage operations.

FIG. 5C depicts embodiments 501C of metadata reconstruction operations configured to manage incomplete atomic storage operations. In the FIG. 5C embodiment, the metadata management module 128 may determine that the mapping entry 563A pertains to a transactional vector (LIDs in a designated transactional namespace and/or region of the logical address space 122). As disclosed above, a transactional vector and/or LID may be used to identify data pertaining to an atomic storage operation that has not been completed. Accordingly, the metadata management module 128 may be configured to exclude data bound to transactional vector(s) and/or LID(s) from the forward map 125, which may comprise preventing mapping information of the mapping entry 563A from being included in the forward map 125 (and/or removing existing mapping information, if any). The data D1 at log storage units 0-1023 may be identified as invalid and removed in a storage recovery operation (since the data is not bound to LID(s) in the forward map 125). The metadata management module 128 may be further configured to reconstruct the mapping information corresponding to the original vectors 3072-4095 and 12288-14335 based on the checkpoint entry 168. The original mapping information may be admitted into the forward map 125, since the original vectors 3072-4095 and 12288-14335 do not include transactional LIDs, as disclosed herein. Accordingly, the failed atomic storage operation may be completely rolled back.

Figure 5D:
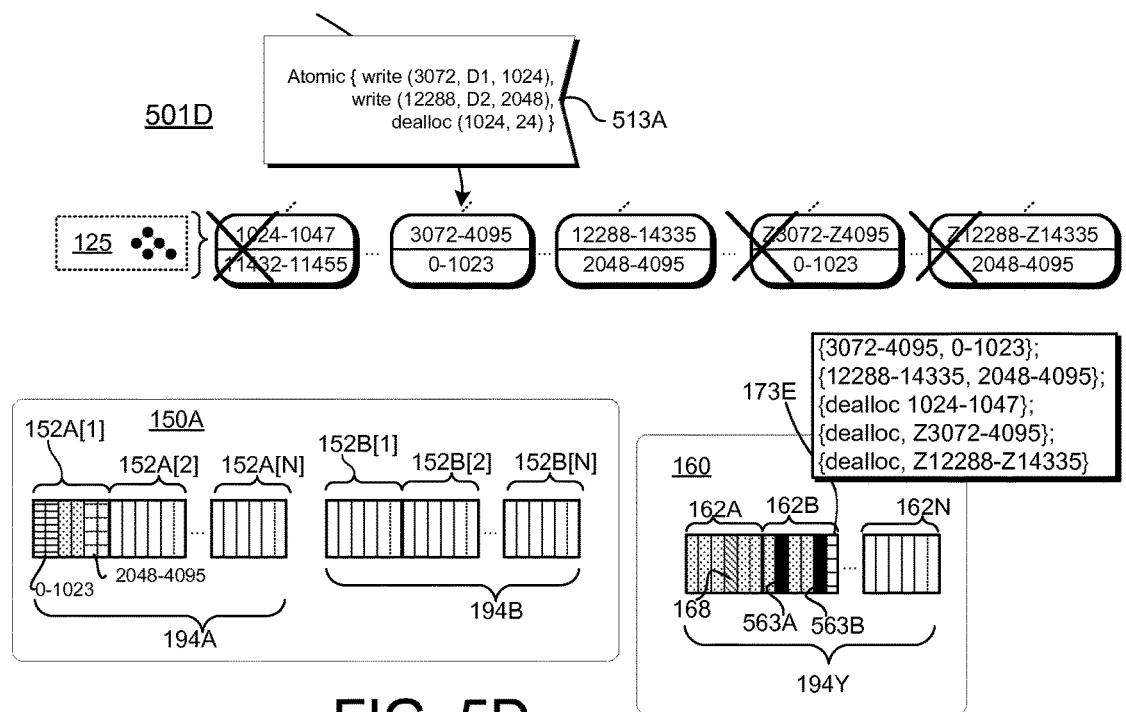
FIG. 5D depicts further embodiments of atomic storage operations.

In embodiment 501D illustrated in FIG. 5D, the operation to append data D2 may complete successfully. In response, the atomic storage module 546 may be configured to append a mapping entry 563B to the metadata log 160 to bind the transactional vector Z12288-Z14335 to log storage units 2048-4095, and record the corresponding mapping information in the forward map 125. After completing the individual operations of the atomic storage request, the atomic storage module 546 may be configured to "close" the atomic storage request in a single atomic operation. As used herein, "closing" an atomic storage operation or request refers to completing the atomic storage request. The atomic storage module 546 may be configured to close the atomic storage operation by implementing a logical move operation to move the transactional vectors Z3072-Z4095 and Z12288-Z14335 to the destination or target vectors of the atomic storage request (LID ranges 3072-4095 and 12288-14335). The logical move operation may be implemented by writing a single LME 173 to the metadata log 160. The logical move operation may further comprise updating the forward map 125 (and/or other virtualization metadata) in accordance with the logical move operation.

As illustrated in FIG. 5D, the LME 173E may correspond to closure of the atomic storage operation. In particular, the LME 173E may be configured to indicate that a) the LID vector 3072-4095 is bound to log storage units 0-1023 in VDL 150A and b) that LID vector 12288-14335 is bound to log storage units 2048-4095 in VDL 150A. The LME 173E may also indicate that the LID range 1024-1047 is deallocated. In some embodiments, the LME 173E is further configured to indicate that the transaction vectors Z3072-Z4095 and Z12288-14335 are deallocated. Further embodiments of systems and methods for implementing atomic storage operations are disclosed in U.S. Provisional Patent Application No. 61/892,962, entitled "Systems and Methods for Distributed Atomic Storage Operations," filed Oct. 18, 2013 for Nisha Talagala et al., and which is hereby incorporated by reference in its entirety.

In some embodiments, the efficient logical manipulation operations implemented by the data services module 110 may be leveraged to implement snapshots. As used herein, a snapshot refers to a storage operation configured to preserve the state of a storage system at a particular point in time. A snapshot operation may, therefore, be configured to preserve data associated with LIDs of the logical address space 122 managed by the data services module 110.

Figure 6A:
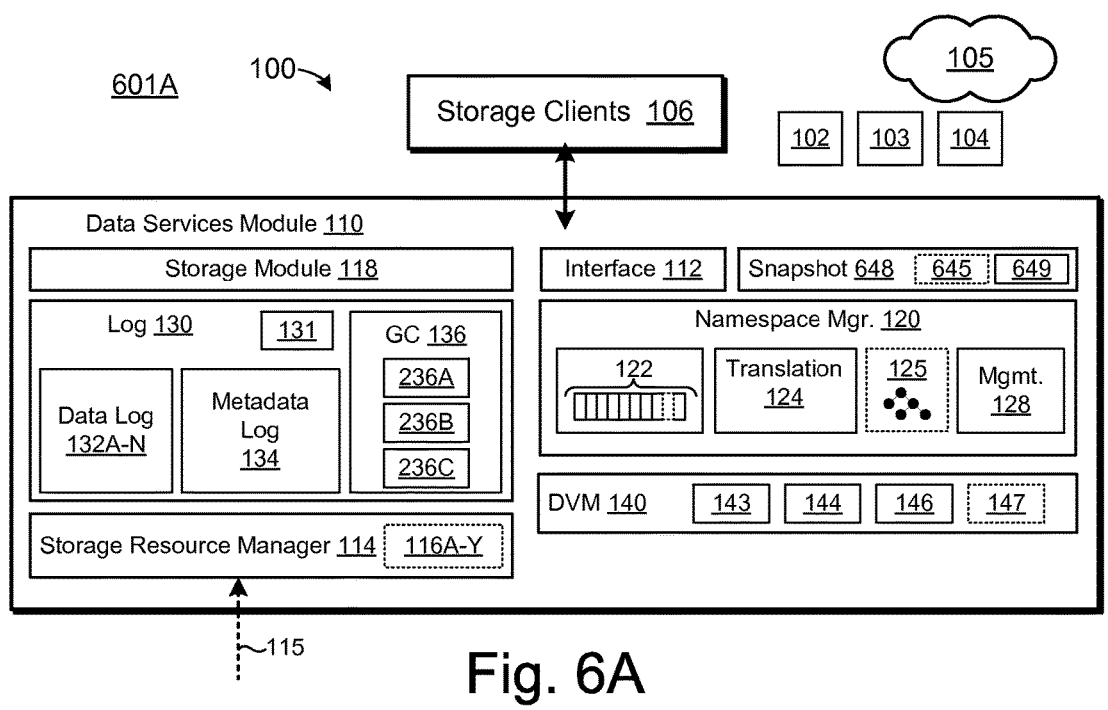
FIG. 6A depicts an embodiment of a data services module configured to implement snapshot operations.

FIG. 6A depicts one embodiment 601A of a computing system 100 comprising a snapshot module 648 configured to implement snapshot operations by use of, inter alia, the logical manipulation functionality provided by the data services module 110. The data services module 110 may be communicatively coupled to one or more storage resources 190A-N, which may comprise one or more VDLs 150A-N managed by the data log module 132A-N, and/or a metadata log 160 managed by the metadata log module 134, as disclosed herein.

As illustrated in FIG. 6A, the snapshot module 648 may be implemented as a component and/or module of the data services module 110. Alternatively, the snapshot module 648 may be implemented as a separate component and/or module, and may be configured to interface with the data services module 110 through, inter alia, the interface 112. In some embodiments, the snapshot module 648 may be configured to manage snapshots of one or more clients 106 by use of the data services module 110.

Figure 6B:
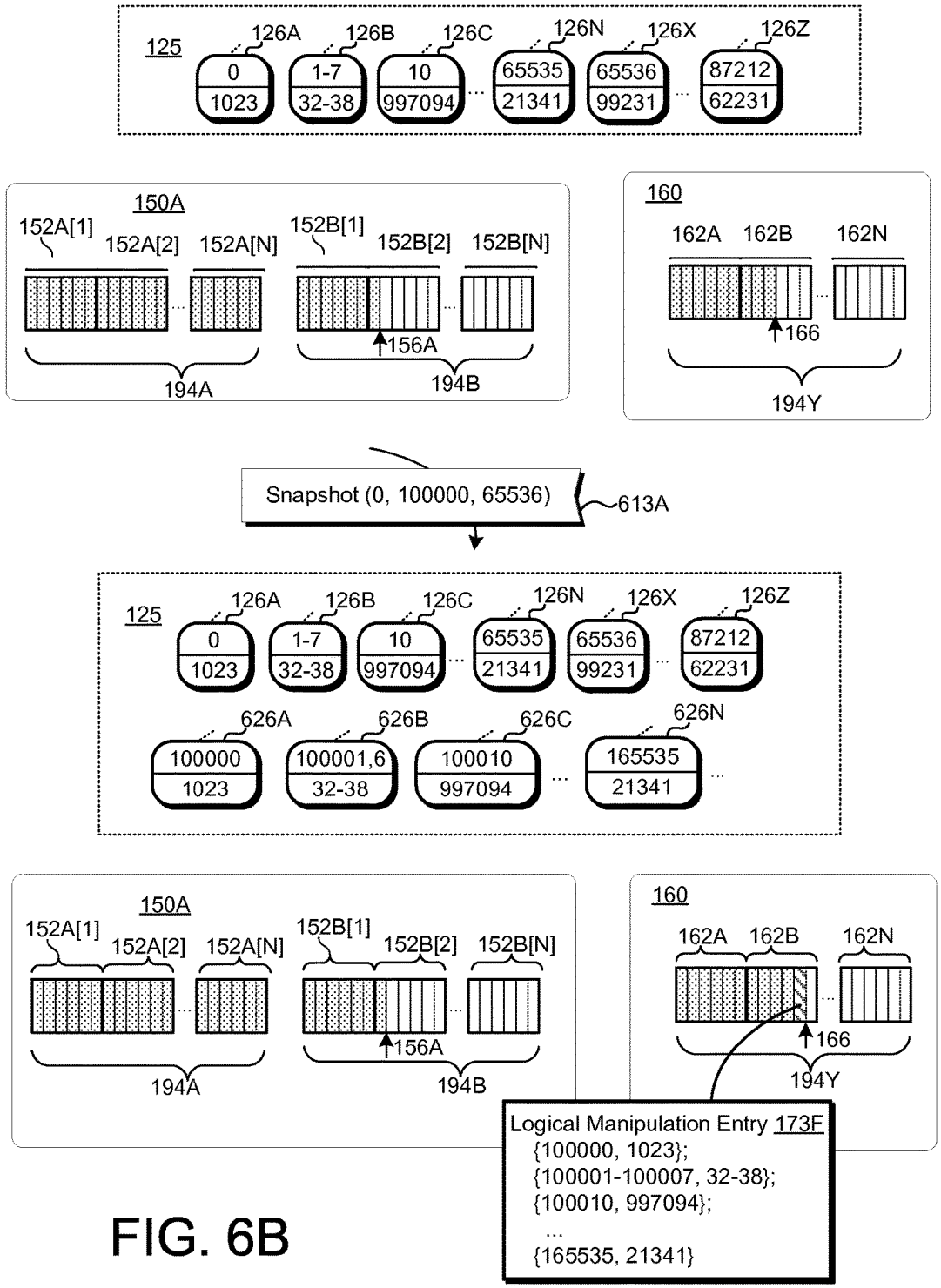
FIG. 6B depicts embodiments of snapshot operations.

As disclosed above, a snapshot refers to an operation to preserve the state of a storage system and, in particular, to preserving the state of a particular set, range, and/or extent of LIDs within the logical address space 122. In some embodiments the snapshot module 648 may be configured to create a snapshot through a logical copy operation implemented by use of, inter alia, the VSM 146. FIG. 6B depicts embodiments 601B of snapshot operations implemented by use of the data services module 110 (and/or snapshot module 648). In the FIG. 6B embodiment, the data services module 110 has serviced I/O requests 113 pertaining to the logical address space by: a) appending data to the VDL 150A, b) appending mapping metadata to the metadata log 160 configured to bind LIDs of the I/O requests 113 to the data appended to the VDL 150A (e.g., mapping entries 163, aggregate mapping entries 167, and/or checkpoint entries 168), and c) maintaining a forward map 125 comprising entries 126A-N and 126X-Z. Although not depicted in FIG. 6B, the data services module 110 may be further configured to append data to other VDL 150B-N associated with other LIDs and/or LID ranges, as disclosed herein.

The snapshot module 648 may be configured to service a snapshot I/O request 613A. The I/O request 613A may specify a source address for the snapshot (LID 0 in the logical address space 122), a destination for the snapshot (LID 100000), and a size, range, and/or extent (65536). The snapshot I/O request 613A of FIG. 6B may comprise a request to generate a snapshot comprising the LID range 0-65535 at LID 100000. Accordingly, the resulting snapshot may correspond to the LID range 100000-165535. Alternatively, a snapshot I/O request 613A may specify a source address for the snapshot, and may allow the snapshot module 648 to select an available destination LID range. In some embodiments, the snapshot module 648 may manage a plurality of snapshots within different, respective LID ranges. The snapshot module 648 may be configured to increment the destination LID range in response to requests to create new snapshots, and may deallocate ranges in response to requests that identify snapshots that no longer need to be retained.

Servicing the snapshot I/O request 613A may comprise allocating the destination LIDs 100000-165535 (if not already allocated), and creating a logical copy of the LID range 0-65535 by, inter alia, appending an LME 173F to the metadata log 160. The LME 173F may be configured to indicate that the destination LIDs of the snapshot are associated with the same data as the source LIDs. The LME 173F may, therefore, be configured to associate the snapshot destination LID range 100000-165535 with the log storage units bound to the snapshot source LID range 0-65535, which may comprise associating LID 100000 with log storage unit 1023, associating LIDs 100001-100007 with log storage units 32-38, associating LID 100010 with log storage unit 997094, associating LID 165535 with log storage unit 21341, and so on. The LME 173F may exclude mapping information pertaining to portions of the logical address space 122 that are outside of the source range (e.g., LIDs 65536 and 87212 of entries 126X-Z). As disclosed above, the LME 173F may be embodied as one or more of a packet, note, persistent note, and/or other data structure stored within the metadata log 160. Although not depicted in FIG. 6B, the LME 173F may further include the existing data associations pertaining to the source LID range of the snapshot request 613A (e.g., LID range 0-65535). As illustrated in FIG. 6B, implementing the snapshot operation may comprise appending a single LME 173F to the metadata log 160, without modifying data stored in the VDL 150A-N and/or without appending data to the VDL 150A-N.

In some embodiments, the snapshot operation further comprises activating the snapshot. As used herein, "activating" a snapshot refers to adding entries 126 to the forward map 125 corresponding to the snapshot operation. In the FIG. 6B embodiment, activating the snapshot of the I/O request 613A comprises creating entries 626A-626N in the forward map 125. In some embodiments, the data services module 110 may configure the entries 126 of the forward map 125 to facilitate efficient snapshot activation. As disclosed above in conjunction with FIG. 1K, the data services module 110 may be configured to store the entries 126 of the forward map 125 contiguously in the address space of the volatile memory resources 103. Alternatively, the entries 126 may be stored according to a pre-determined pattern and/or layout within the memory address space of the computing system 100. Moreover, the size of the entries 126 may be fixed (and/or deterministic), such that individual fields of the entries (e.g., the logical address fields 127A-N) can be selective modified based on, inter alia, fixed and/or deterministic offsets within the memory address space.

Figure 6C:
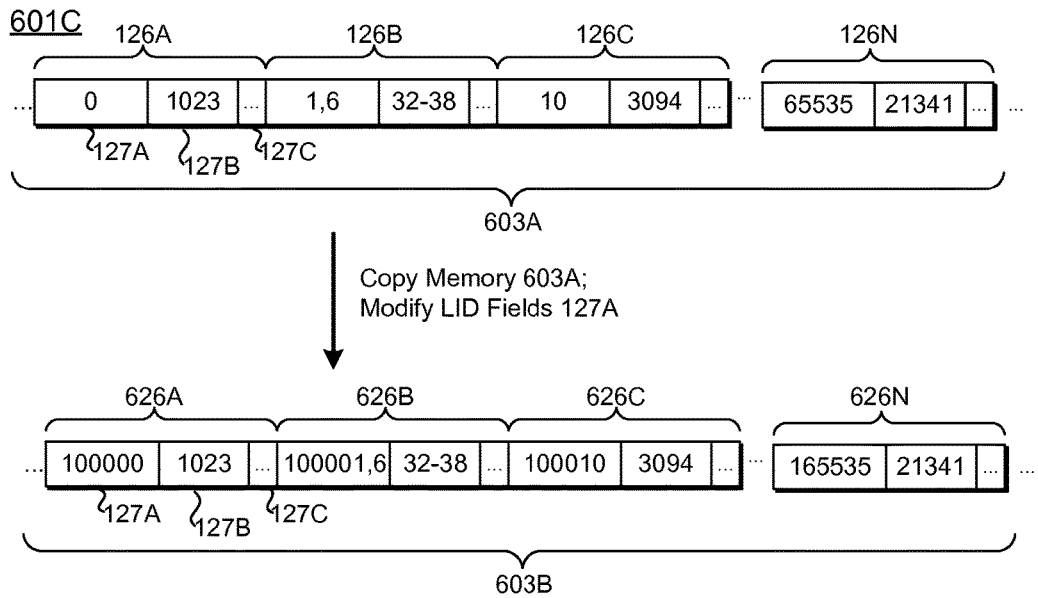
FIG. 6C depicts embodiments of virtualization metadata management operations.

Referring to embodiment 601C depicted in FIG. 6C, the snapshot module 648 may include an snapshot activator 649 configured to efficiently activate snapshots by, inter alia, accessing memory structures corresponding to the entries 126 in the volatile memory resources 103 of the computing system 100. As illustrated in FIG. 6C, the entries 126A-N corresponding to the snapshot operation of FIG. 6B may be maintained in a pre-determined format within a region 603A of the memory address space of the computing system 100. In the FIG. 6C embodiment 601C, the entries 126A-N are arranged contiguously in the volatile memory resources 103 of the computing device 100. The disclosure is not limited in this regard, however, and could be adapted to use any fixed, deterministic, and/or pre-defined memory layout and/or arrangement. As disclosed above, the entries 126A-N may comprise respective LID addressing fields 127A, log storage unit address fields 127B, and the like. The entries 126A-N may further include metadata pertaining to links and/or references between the entries 126A-N and/or reference nodes 129, as disclosed above.

The snapshot activator 649 may be configured to efficiently replicate the entries 126A-N in memory by: a) copying the memory address range (region 603A) to a destination memory address range (region 603B), and b) modifying the LID fields 127A of the copied entries in accordance with the snapshot destination. As illustrated in the FIG. 6C embodiment 601C, the snapshot activator 649 is configured to modify the LID fields 127A according to the destination offset comprising LID 100000. In embodiments comprising large ranges within the logical address space 122, it may be inefficient to perform a single bulk copy. In such embodiments, the snapshot activator 649 may be configured to perform multiple memory copy operations configured to transfer portions of the memory region 603A being replicated.

Referring back to FIG. 6B, in some embodiments the data services module 110 is configured to acknowledge completion of the snapshot I/O request 613B in response to a) appending the corresponding LME 173F to the metadata log 160 and b) activating the snapshot (e.g., creating corresponding entries 626A-N in the forward map 125). Accordingly, the I/O request 613B may block while the entries 626A-N are created. In other embodiments, described below, the snapshot may be activated asynchronously and, as such, the data services module 110 may acknowledge completion in response to writing the LME 173F to the metadata log 160, without creating the entries 126 in the forward map 125 (e.g., without creating entries 626A-N).

As disclosed above, even with the efficiency improvements disclosed in conjunction with FIGS. 1K and 6C, creating entries 626A-N for a snapshot operation may take a significant amount of time, and make take significantly longer than writing the corresponding LME 173F to the metadata log 160. Moreover, the memory manipulations involved in activating the snapshot may be subject to variable delays due to, inter alia, memory management operations of the computing system 100 (e.g., virtual memory management, paging, and so on), the snapshot entries 626A-N may consume limited volatile memory resources 103 of the computing system 100. Additionally, the translation module 124 may lock the forward map 125 during updates, which may delay other, unrelated storage operations. Accordingly, in some embodiments, the snapshot module 648 may be configured to defer snapshot activation until the snapshot is needed.

Figure 6D:
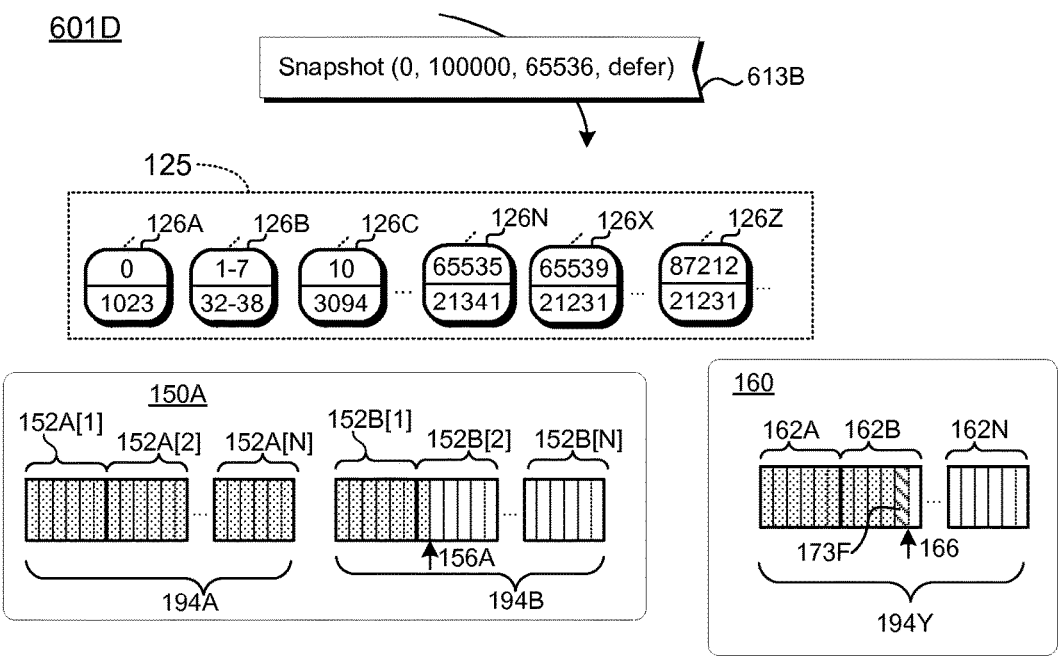
FIG. 6D depicts further embodiments of snapshot operations.

The snapshot I/O request 613A may specify whether to defer snapshot activation. FIG. 6D depicts one embodiment 601D of a snapshot operation with deferred activation. As shown in FIG. 6D, the snapshot I/O request 613B may include a "defer" parameter configured to instruct the data services module 110 to defer snapshot activation. Alternatively, the I/O request 613B may comprise a non-blocking, asynchronous API call. In response to the I/O request 613B, the snapshot module 648 may append the LME 173F to the metadata log 160, as disclosed above. The data services module 110 may, however, acknowledge completion of the snapshot I/O request 613B without creating entries for the snapshot in the forward map 125.

In some embodiments, snapshot operations may be assigned respective identifiers. The identifier of a snapshot may correspond to a LID associated with the snapshot and/or a log time of the snapshot. As disclosed above, a "log time" refers to a particular time and/or log location in the ordered, metadata log 160. The log time of a log storage unit 165 in the metadata log 160 may correspond to a) sequence information of the segment 162 comprising the log storage unit 165 and b) the relative address and/or offset of the log storage unit 165 within the segment 162. The log time may be configured to be monotonically increasing (in accordance with sequence metadata 161 applied to the segments 162). As used herein, the log time of a snapshot refers to the log time of the LME 173F appended to the metadata log 160 to create the snapshot. Accordingly, the log time of the snapshot of FIGS. 6B and 6D is the log time of the log storage unit(s) 165 comprising the LME 173F.

Figure 6E:
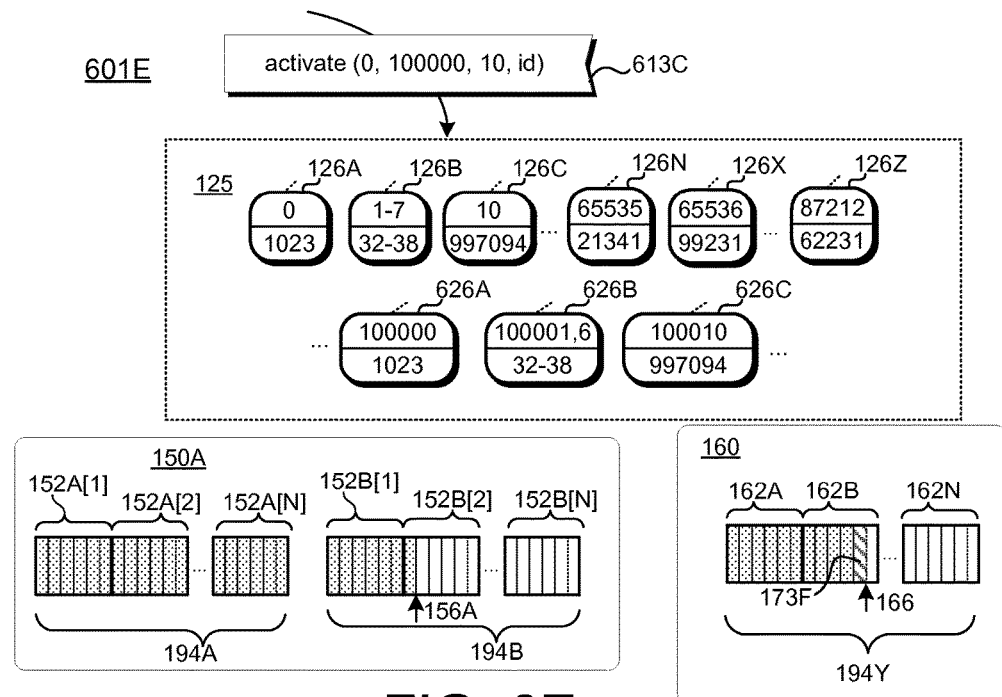
FIG. 6E depicts embodiments of snapshot activation operations.

As illustrated in embodiment 601E depicted in FIG. 6E, the snapshot of FIG. 6D may be activated in response to an activation I/O request. The snapshot activation I/O request 613C may include an identifier of the snapshot, as disclosed above, which may comprise a snapshot identifier, snapshot log time, snapshot LID, and/or the like. A snapshot activation I/O request 613C may be configured to activate a portion (subset) of a snapshot. In the FIG. 6E embodiment, the I/O request 613C may specify activation of only LIDs 0-10. In response, the snapshot module may create corresponding entries 626A-C in the forward map 126, as disclosed above. Entries corresponding to other LIDs not specified in the snapshot activation I/O request 613C may not be created.

Deferring snapshot activation may impact garbage collection operations of the data services module 110. As disclosed above, the scan module 236A of the garbage collector 136 may be configured to identify invalid data based on the forward map 125 (in a mark-and-sweep operation). Data corresponding to the activated snapshots and/or snapshot regions of FIGS. 6B and 6E may be protected from garbage collection due to, inter alia, the activated snapshot entries 626A-N in the forward map 125, regardless of changes in the original entries 126A-N. Snapshots that are not activated may be subject to garbage collection in response to modifications to the original LID bindings. As illustrated in FIG. 6D, data of the deferred activation snapshot are not bound to the LIDs in the snapshot range 100000-165535 in the forward map 125. After initial creation of the snapshot in FIG. 6D, data of the snapshot may be identified as valid due to the existing bindings between the data and the original entries 126A-N. However, subsequent I/O operations may modify the entries 126A-N, which may render the data subject to garbage collection.

Figure 6F:
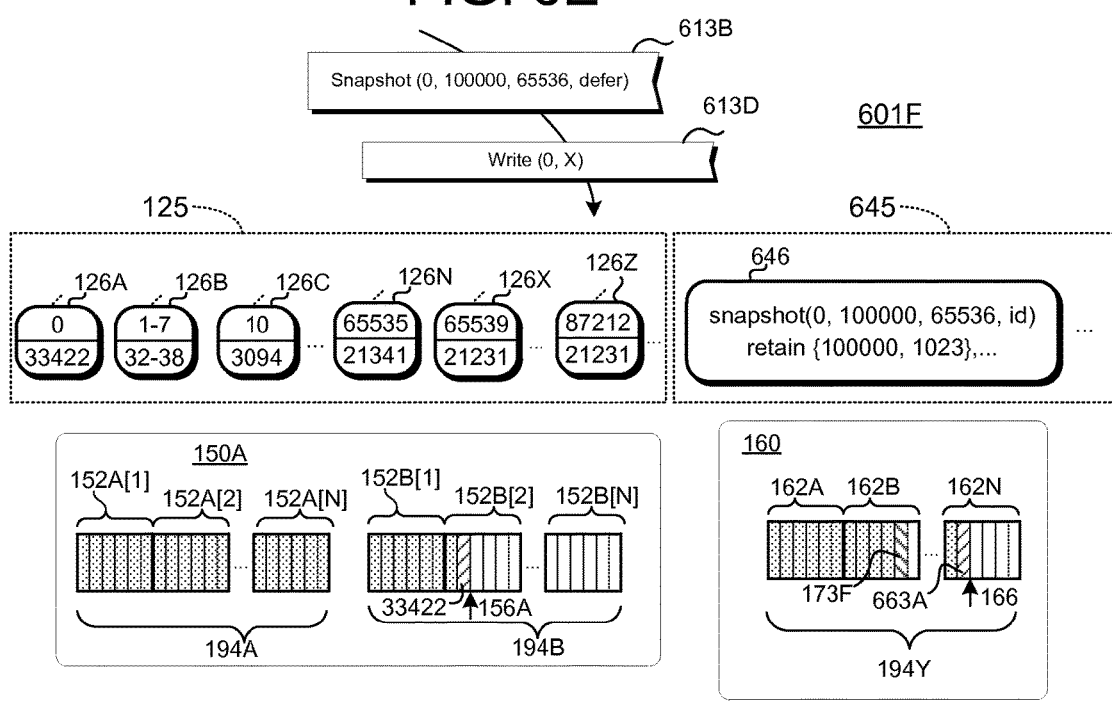
FIG. 6F depicts embodiments of snapshot management operations.

As illustrated in embodiment 601F depicted in FIG. 6F, a subsequent I/O request 613D write data X to LID 0 may remove the binding to the log data unit 1023. As disclosed herein, servicing the I/O request 613D may comprise a) appending data X to the VDL 150A (at log storage unit 33422), b) appending a mapping entry 663A to the metadata log 160, and updating the entry 126A in the forward map 125. Servicing the I/O request 613D may, therefore, remove the binding between LID 0 and log storage unit 1023, which may cause a mark-and-sweep operation of the scan module 236A to identify the data in log storage unit 1023 as invalid, and subject to removal from the VDL 150A.

In some embodiments, the snapshot module 648 is configured to preserve snapshot data. The snapshot module 648 may be configured to maintain snapshot metadata 645, including an entry corresponding to the deferred activation snapshot of FIG. 6D. The snapshot metadata entry 646 may include information pertaining to the snapshot, such as the source LIDs, destination LIDs, size, identifier (e.g., log time), and/or the like. The translation module 124 may access the snapshot metadata 645 to identify modifications to the forward map 125 that would render snapshot data invalid, such as the modification to entry 126A resulting from the I/O request 613D. The translation module 124 may be configured to notify the snapshot module 648 of the original log storage unit mappings. In response, the snapshot module 648 may include the log storage unit mapping retention information of the snapshot entry 646. The snapshot module 648 may use the snapshot metadata 645 (e.g., the retention information) to prevent the data at log storage unit 1023 from being marked invalid and/or removed. The scan module 236A may be configured to query the forward map 125 to identify valid bindings between LIDs and log storage units 155A, scan module 236A may be further configured to query the snapshot module 648 for validity information (and/or the translation module 124 may forward queries to the snapshot module 648), which may indicate that log storage unit(s) included in the retention information of a snapshot entry 646 comprises valid data that should be retained. The snapshot module 648 may be further configured to update the retention information in response to, inter alia, the data at log storage unit 1023 being relocated in a storage recovery operation.

Figure 6G:
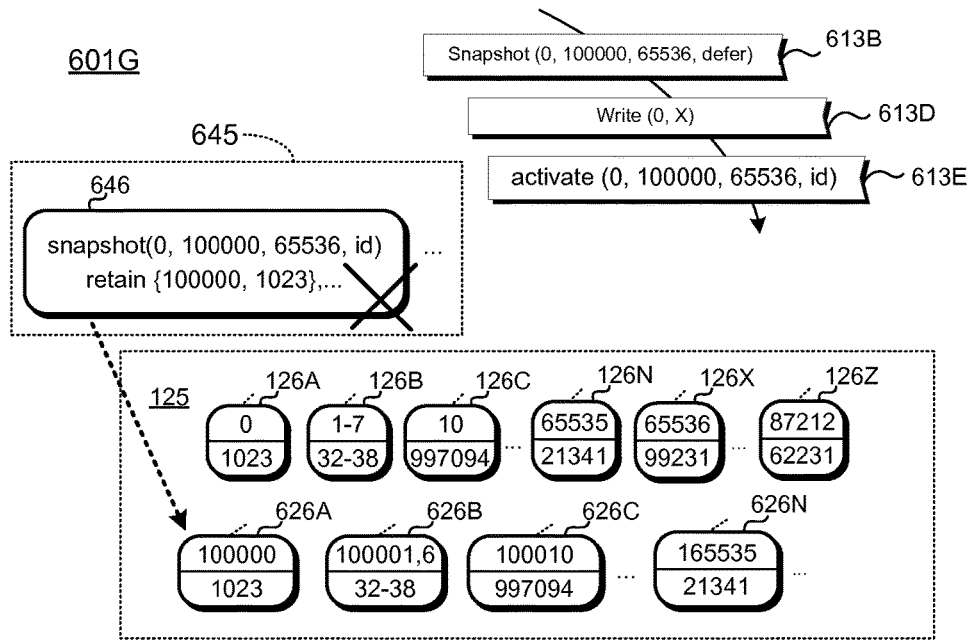
FIG. 6G depicts further embodiments of snapshot management operations.
Figure 6G:
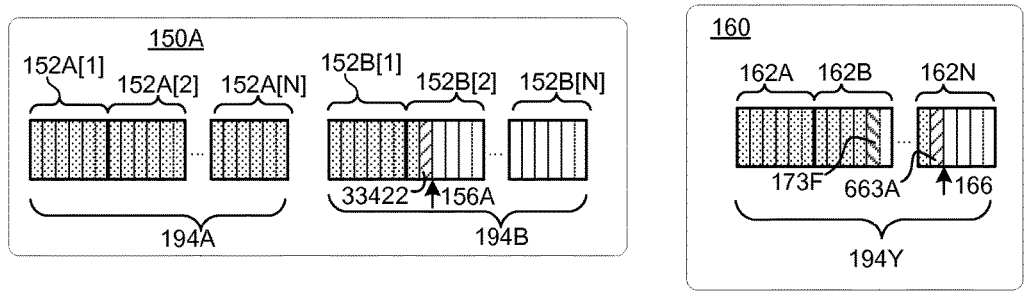

The snapshot module 648 may use the snapshot metadata 645 to activate the snapshot. FIG. 6G depicts an embodiment 601G of a snapshot activation operation implemented by the snapshot module 648. As disclosed above, in response to the I/O request 613D to write data to LID 0, the snapshot metadata 648 may include a binding between LID 100000 and log storage unit 1023 in a snapshot metadata entry 646. The I/O request 613E may request activation of the snapshot, and may be received after servicing the I/O request 613D.

In response to the activation I/O request 613E, the snapshot activator 649 may activate the snapshot by, inter alia, copying the memory region corresponding to entries 126A-126N, and modifying the LID field 127A of the copied entries 626A-N, as disclosed above. Snapshot activation may further comprise modifying the entry 626A in accordance with the retention information. Based on the retention information of the snapshot metadata entry 646, the snapshot activator 649 may determine that the entry 126A no longer references the snapshot data at log storage unit 1023. In response, the snapshot activator 649 may be further configured to modify the log storage unit field 127B of the entry 626A in accordance with the retention information (e.g., set the log storage unit field 127B to 1023 rather than 33422). After activating the snapshot, the snapshot module 648 may remove the snapshot metadata entry 646.

Figure 6H:
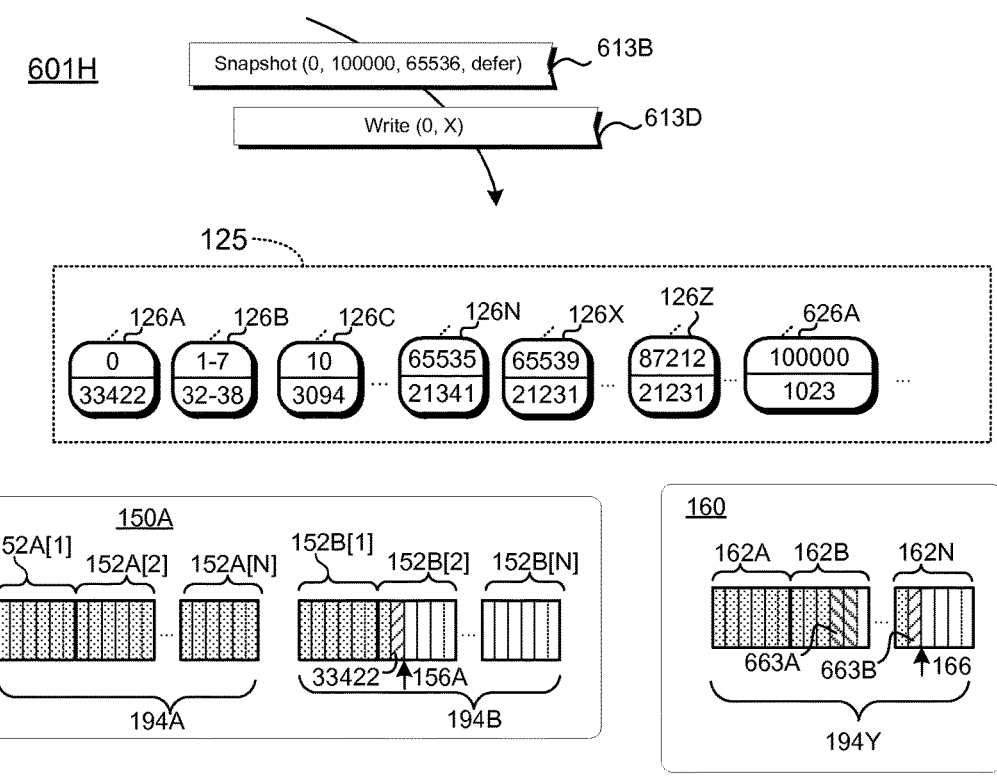
FIG. 6H depicts further embodiments of snapshot management operations.

In another embodiment, the snapshot module 648 is configured to activate snapshot entries "on-demand" (e.g., in response to storage operations that would remove bindings to snapshot data). In embodiment 601H illustrated in FIG. 6H, the snapshot module 648 is configured to generate a deferred activation snapshot in response to the I/O request 613B, as disclosed above. After creating the snapshot, the I/O request 613D to write data X to LID 0 is received. The data services module 110 may service the I/O request 613D by storing data X to log storage unit 33422, appending a mapping entry 663A to the metadata log 160, and updating the entry 126A in the forward map 125. As disclosed above, the translation module 124 may be configured to notify the snapshot module 646 that an operation pertaining to a deactivated snapshot has been performed. The notification may identify the corresponding LID and/or log storage unit 1023. In response, the snapshot activator 649 may be configured to generate a corresponding entry 626A in the forward map 125, activating the affected LIDs. The snapshot activator 649 may be configured to continue activating snapshot LIDs on demand, until an activation request is received and/or the snapshot is deallocated, or the like.

The snapshot module 648 may be further configured to deallocate snapshots. As used herein, deallocating a snapshot may comprise deallocating the LIDs comprising the snapshot (e.g., deallocating destination LIDs of an activated snapshot). Activated snapshot LIDs may be deallocated by a) appending metadata to the metadata log configured to deallocate the activated LIDs and/or b) removing the corresponding entries from the forward map 125. Deallocating the snapshot of FIG. 6B may comprise, for example, removing entries 626A-N from the forward map. Deallocation may further comprise removing snapshot metadata 645 pertaining to the snapshot. Deallocating the snapshot of FIG. 6F may comprise removing the snapshot metadata entry 646, which may allow log storage units in the retention information of the entry 646 to be identified as invalid and removed by the garbage collector 136, as disclosed herein.

As disclosed herein, the snapshot module 648 may be configured to generate and/or manage snapshots by use of the metadata log 160. Snapshots may be created and/or managed without modifying the underlying data stored in the VDL 150A-N. Moreover, the garbage collector 136 may be configured to identify invalid data by use of entries 126 and/or retention information maintained in volatile memory resources 103, without affecting the storage overhead of the data on the VDL 150A-N and/or creating reference count overhead in the metadata log 160 and/or forward map 125. Accordingly, the snapshot module 648 may be capable of creating any number of snapshots, without significantly increasing the metadata management overhead of the data services module 110.

Figure 7A:
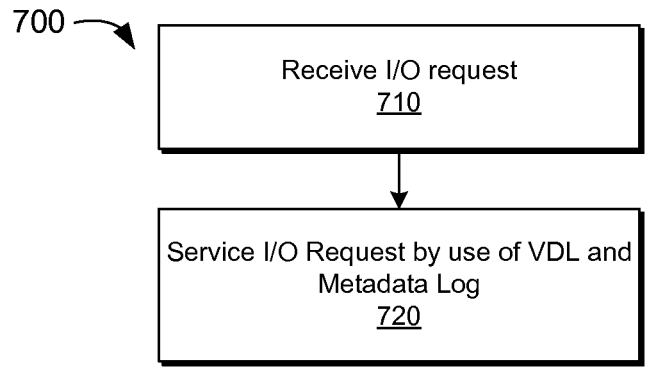
FIG. 7A is a flow diagram of one embodiment of a method for servicing I/O requests.

FIG. 7A is a flow diagram of one embodiment of a method 700 for servicing I/O requests 113 by use of a data services module 110, as disclosed herein. Step 710 may comprise receiving an I/O request 113 pertaining to a logical identifier of a logical address space 122. The request of step 710 may correspond to a particular client 106 and may be received through the interface 112 of the data services module 110.

In some embodiments, step 710 comprises maintaining a logical address space 122 comprising a plurality of LIDs using, inter alia, virtualization metadata. The virtualization metadata may include a forward map 125 comprising entries 126 configured to bind LIDs of the logical address space 122 to log storage units 155, virtual blocks 145, and/or corresponding virtual addresses 195 of one or more VDLs 150A-N.

Step 720 may comprise servicing the I/O request 113 received at step 710 by: a) storing data of the I/O request 113 within the VDL 150, and b) appending an entry 163 to the metadata log 160 corresponding to the I/O request 113. Storing the data of the I/O request 113 may comprise writing the data to one or more log storage units 155 in a segment 152 of the VDL 150 by, inter alia, issuing commands to one or more storage resources 190 corresponding to the VDL 150. The data may be stored to one or more identifier(s) 195 within a storage resource address space 194 of the storage resource 190.

The entry 163 appended to the metadata log 160 may be configured to bind the LID of the I/O request 113 to the data appended to the VDL 150. The entry 163 may, therefore, be configured to bind the LID to a particular log storage unit 155, virtual block 145, and/or virtual address(es) 195. The metadata log 160 may be ordered, such that an order of the metadata stored in the metadata log 160 (e.g., entries 163, aggregate entries 167, checkpoint entries 168, LME 173, and so on) corresponds with an order in which I/O requests 113 were received at the data services module 110. The log order of the metadata in the metadata log 160 may be determined by a) sequence metadata assigned to segments 162 of the metadata 160, and b) the relative address and/or offset of the metadata within the respective segments 162.

Figure 7B:
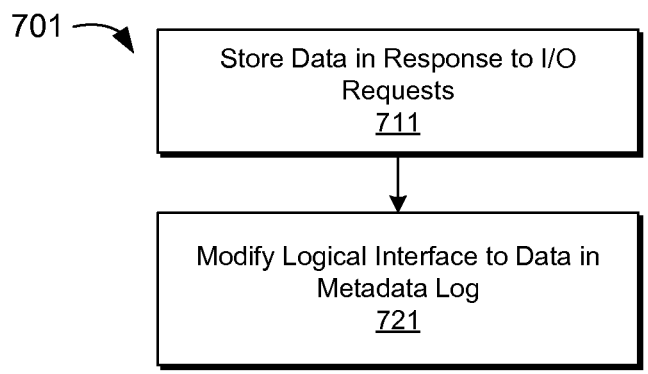
FIG. 7B is a flow diagram of another embodiment of a method for servicing I/O requests.

FIG. 7B is a flow diagram of another embodiment of a method 701 for servicing I/O requests by use of the data services module 110 disclosed herein. Step 711 may comprise storing data one or more storage resources 190A-X in response to I/O requests 113 from clients 106. As disclosed above, step 711 may comprise storing the data by appending the data to one or more VDLs 150A-N. The VDL 150A-N may correspond to one or more of the storage resources 190A-X. In some embodiments, data may be appended to the VDL 150A-N out-of-order with respect to the order in which the I/O requests corresponding to the data were received at the data services module 110.

Step 711 may further comprise associating the stored data with a logical interface. Step 711 may comprise assigning identifiers of a logical address space 122 to the stored data, which may include, but is not limited to: assigning logical identifiers to the data by use of a logical interface and/or virtualization metadata (e.g., the forward map 125); and recording the assignments in a metadata log 160 (e.g., appending mapping entries 163 to the metadata log 160, as disclosed above).

Step 721 may comprise modifying the logical interface to data stored at step 711. Step 721 may comprise manipulating a logical interface to the stored data, which may include modifying bindings between identifiers of the logical address space 122 and the stored data by a) altering the logical interface to the data in logical interface and/or virtualization metadata (e.g., forward map 125); and b) recording an LME 173 corresponding to the altered logical interface. The modifications to the logical interface may include, but are not limited to: modifications configured to: a) change the LIDs associated with the stored data (e.g., modify the LID(s) bound to stored data), b) replicate sets of LIDs (e.g., create logical copies of particular LIDs, snapshot particular sets of LIDs, and/or the like), c) merge sets of LIDs, and/or the like. In some embodiments, step 721 comprises modifying a mapping between data stored at step 711 and one or more identifiers of the logical address space 122 in the forward map 125, and appending a record corresponding to the modified mapping in the metadata log 160. The record appended to the metadata log 160 may comprise a logical manipulation entry 173, as disclosed above. The logical interface modification(s) of step 721 may be implemented without storing data to the VDL 150 and/or without modifying data stored within the VDL 150.

Figure 8:
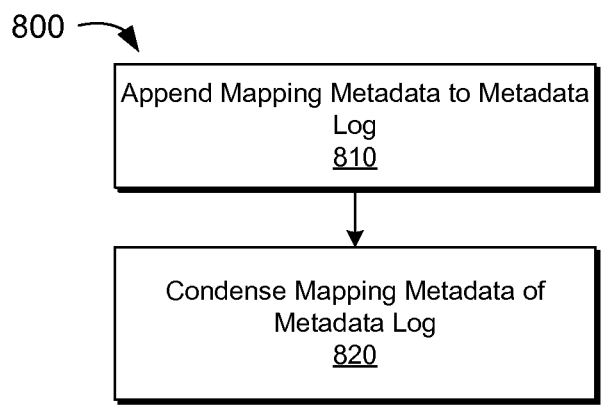
FIG. 8 is a flow diagram of one embodiment of a method for managing a metadata log.

FIG. 8 is a flow diagram of another embodiment for servicing I/O requests by use of the data services module 110. Step 810 may comprise appending mapping metadata to a metadata log 160. The mapping metadata may comprise sparse mapping entries 163 appended to the metadata log 160 in response to I/O requests 113 received at the data services module 110. The metadata entries 163 may be configured to tie LIDs of the logical address space 122 to log storage units 155 comprising data associated with the LIDs in the VDL 150. The VDL 150 may be separate and/or independent of the metadata log 160. The metadata log 160 may be stored on a different storage resource 190Y and the storage resources 190A-X comprising the VDL 150.

Step 820 may comprise condensing valid mapping metadata in the metadata log 160. Step 820 may comprise a) compacting segments 162 of the metadata log 160 and/or b) checkpointing portions of the forward map 125 to the metadata log 160. Compacting segments 162 of the metadata log 160 may comprise a) identifying valid mapping metadata within the segments 162 and b) combining the valid mapping metadata into one or more aggregate mapping entries 167. Checkpointing portions of the forward map 125 may comprise appending one or more checkpoint entries 168 to the metadata log 160, wherein the checkpoint entries 168 are configured to map a plurality of LIDs to respective log storage units 155 of the VDL 150.

Accordingly, in some embodiments, step 820 comprises recovering a segment 162 of the metadata log 160. Recovering the segment 162 may comprise a) identifying valid metadata entries 163 in the segment 162 (if any), and b) combining mapping information of the identified mapping entries 163 into an aggregate mapping entry 167. The aggregate mapping entry 167 may comprise the mapping information of the combined mapping entries 163. Step 820 may further comprise appending the aggregate mapping entry 167 to the metadata log 160 and/or preparing the segment 162 for reuse. Identifying valid mapping entries 163 may comprise identifying metadata entries 163 comprising mapping information that a) corresponds to an entry in the forward map 125, and b) has not been persisted to the metadata log 160 another aggregate mapping entry 167 and/or checkpoint entry 168. Identifying valid metadata entries may, therefore, comprise comparing a log time and/or log order of the metadata entries, to a log time and/or log order of one or more checkpoint entries 168 in the metadata log 160. If a checkpoint entry 168 corresponding to the same LID(s) as the mapping entry 163 exists in the metadata log 160, and is later in log time and/or log order than the mapping entry 163, the mapping entry 163 may be identified as invalid, since the mapping metadata of the entry has already been checkpointed to the metadata log 160.

Alternatively, or in addition, step 820 may comprise checkpointing mapping metadata of the forward map 125 to the metadata log 160. Checkpointing mapping metadata may comprise one or more checkpoint entries 168 to the metadata log 160 comprising mapping information pertaining to a set, range, and/or extent of LIDs in the logical address space 122. The amount of mapping metadata included in a checkpoint entry 168 may correspond to a storage capacity of the log storage units 165 of the metadata log 160. In some embodiments, step 820 comprises streaming mapping information pertaining to the entire logical address space 122 (e.g., all entries 126 in the forward map 125) to the metadata log 160.

Figure 9:
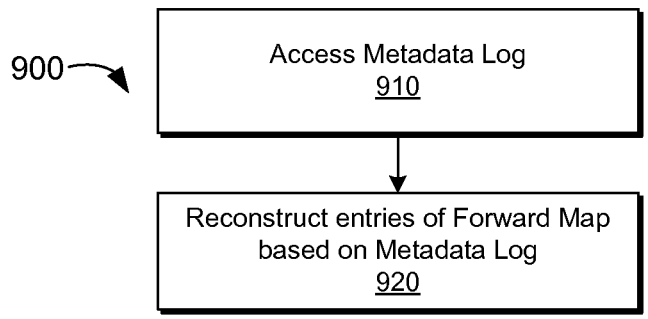
FIG. 9 is a flow diagram of one embodiment of a method for metadata recovery.

FIG. 9 is a flow diagram of one embodiment of a method 900 for reconstructing virtualization metadata, such as the forward map 125. The method 900 may be performed by the metadata management module 128 in response to loss and/or corruption of the virtualization metadata due to, inter alia, an invalid shutdown.

Step 910 may comprise accessing a metadata log 160 pertaining to one or more VDLs 150A-N corresponding to respective storage resources 190A-N. The metadata log 160 accessed at step 910 may be stored on a storage resource 190Y that is separate from and/or independent of the storage resources 190A-X used to implement the VDL 150A-N.

Step 920 may comprise reconstructing entries of the forward map 125 based on the ordered metadata log 160 accessed at step 910. Step 920 may comprise identifying a checkpoint entry 168 in the metadata log 160. As used herein, a checkpoint entry 168 refers to mapping metadata pertaining to a set, range, and/or extent of LIDs of the logical address space 122. A checkpoint entry 168 may comprise mapping information for the entire logical address space 122. Step 920 may further comprise reconstructing entries of the forward map 125 based on the mapping metadata of the identified checkpoint entry 168, and accessing updating the entries of the forward map 128 based on mapping metadata appended after the checkpoint entry 168. Alternatively, step 920 may comprise reconstructing the forward map 125 by use of individual mapping entries 163 and/or aggregate mapping entries 167 stored in the metadata log 160. Step 920 may further comprise reconstructing and/or modifying the forward map based on one or more LME 173 stored in the metadata log 160.

Figure 10:
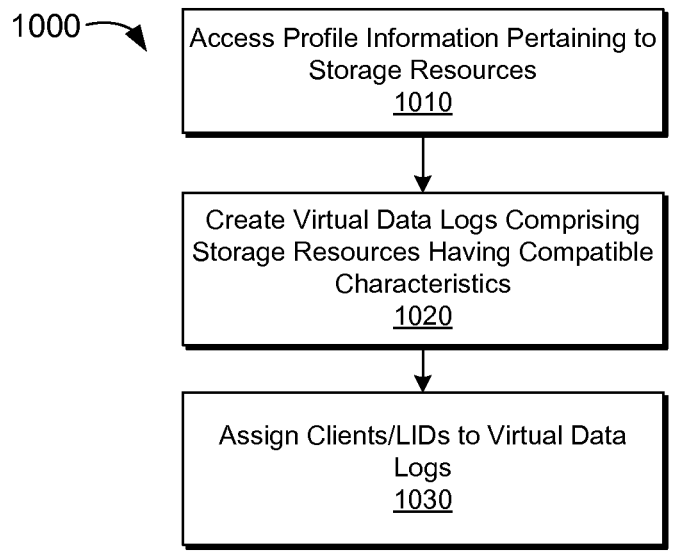
FIG. 10 is a flow diagram of one embodiment of a method for managing a virtual data log.

FIG. 10 is a flow diagram of another embodiment of a method 1000 for servicing I/O requests using the data services module 110 disclosed herein. Step 1010 may comprise accessing profile information 116A-Y pertaining to a plurality of storage resources 190A-X. As disclosed above, the profile information 116A-Y may be maintained by the storage resource interface module 114, and may include information pertaining to the performance, reliability, capacity, and/or operating characteristics of the storage resources 190A-X.

Step 1020 may comprise creating one or more VDLs 150A-N comprising storage resources 190A-X having compatible characteristics. Step 1020 may comprise identifying storage resources 190A-X for use in respective VDLs 150A-N. Step 1020 may comprise grouping the storage resources 190A-X based on, inter alia, the profile information 116A-Y pertaining to the storage resources 190A-X accessed at step 1010. Step 1020 may further comprise forming VDL 150A-N comprising storage resources 190A-X that have similar characteristics and/or that are capable of satisfying similar performance, reliability, and/or capacity requirements (e.g., QoS requirements). Step 1020 may further comprise forming VDL 150A-N configured to satisfy I/O requirements of one or more clients 106. Accordingly, step 1020 may comprise identifying storage resources 190A-X that are capable of satisfying I/O requirements (e.g., QoS requirements of particular clients 106), and forming VDL 150A-N comprising the identified storage resources 190A-X.

Step 1030 may comprise assigning I/O requests and/or LIDs to the respective VDL 150A-N created at step 1020. Step 1030 may comprise comparing I/O requirements of a client 106 to characteristics of the storage resources 190A-X comprising the respective VDLs 150A-N in order to, inter alia, identify a VDL 150A-N capable of satisfying the I/O requirements of the client 106. Step 1030 may further comprise assigning a set, range, and/or extent of LIDs of the logical address space 122 to respective VDL 150A-N. In some embodiments, step 1030 may further include monitoring operating characteristics of the storage resources 190A-X of the VDL 150A-N to ensure that the storage resources 190A-X are not overloaded, such that the I/O requirements of clients 106 and/or LIDs assigned to the VDL 150A-N can no longer be satisfied.

Figure 11:
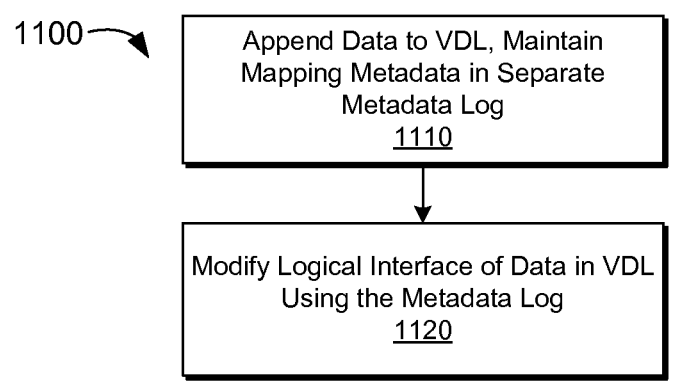
FIG. 11 is a flow diagram of one embodiment of a logical manipulation operation.

FIG. 11 is a flow diagram of one embodiment of a method 1100 for implementing a logical manipulation operation using the data services module 110. Step 1100 may comprise appending data to a VDL 150 and mapping metadata to a separate metadata log 160.

Step 1120 may comprise modifying a logical interface to data appended to the VDL 150 by appending persistent data to the metadata log 160 (appending an LME 173 to the metadata log 160). Step 1120 may further comprise modifying one or more entries in a forward map 125 corresponding to the modified logical interface. Step 1120 may comprise modifying the logical interface of the data without modifying the data stored on the VDL 150 and/or without appending data to the VDL 150.

Figure 12:
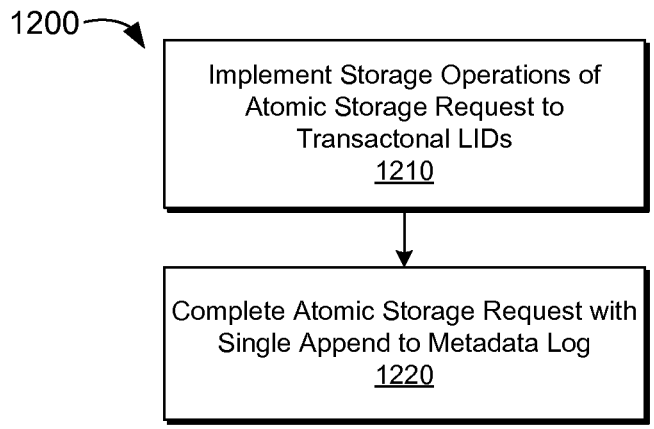
FIG. 12 is a flow diagram of one embodiment of a method for implementing atomic storage operations.

FIG. 12 is a flow diagram of one embodiment of a method for implementing atomic storage operations by use of the data services module 110. Step 1210 may comprise implementing storage operations of an atomic storage request to transactional LIDs. As disclosed above, transactional LIDs may correspond to LIDs (and/or vectors) in a designated range of the logical address space 122 and/or in a separate namespace. Step 1210 may comprise performing a logical copy operation to create a transactional copy of LIDs pertaining to the atomic storage request in the designated range and/or namespace. Step 1210 may further comprise implementing the storage operations by a) appending data of the storage operations to a VDL 150, and b) appending mapping metadata configured to bind the appended data to the transactional LIDs.

Step 1220 may comprise completing the atomic storage request by use of, inter alia, the metadata log 160. Step 1220 may comprise implementing a logical merge operation to merge the LIDs in the designated range of the logical address space 122 and/or separate namespace to target LIDs of the atomic storage request (e.g., to the vectors designated in the atomic storage request of step 1210). Step 1220 may, therefore, comprise completing and/or closing the atomic storage request in a single, atomic write operation to the metadata log 160, which may comprise recording an LME 173 in the metadata log 160, as disclosed above. In some embodiments, step 1220 may further comprise recording logical management metadata specified in the atomic storage request, such as deallocation information, as described above in conjunction with FIG. 5D. The logical management metadata may be included in the LME 173, as disclosed above.

Figure 13:
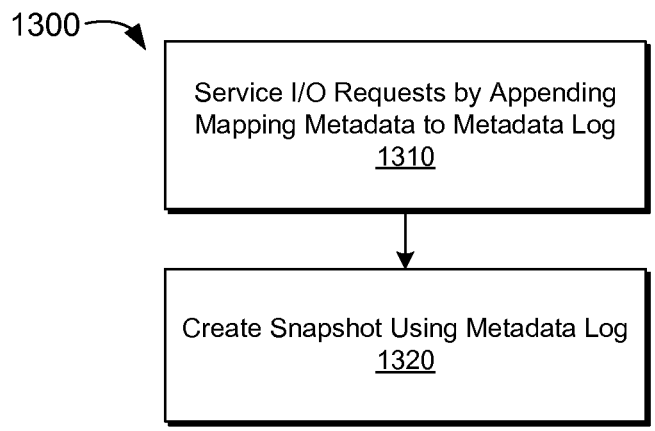
FIG. 13 is a flow diagram of one embodiment of a method for implementing snapshot operations.

FIG. 13 is a flow diagram of one embodiment of a method 1300 for implementing snapshot operations by use of the data services module 110. Step 1310 may comprise servicing I/O requests by a) appending data to a VDL 150, b) appending mapping metadata to a separate metadata log 160 configured to associate LIDs of a logical address space 122 with log storage units 122 of the VDL 150, and c) maintaining a forward map 125 comprising entries corresponding to the mapping metadata.

Step 1320 may comprise creating a snapshot of a set, range, and/or extent of LIDs in the logical address space 1320 by using the metadata log 1320. As disclosed above, creating a snapshot may comprise appending a persistent note, packet, and/or other data to the metadata log 160 (e.g., an LME 173) that is configured to bind a set of destination LIDs to the data bound to a set of source LIDs. In some embodiments, step 1320 comprises activating the snapshot by, inter alia, creating entries corresponding to the snapshot in the forward map 125. Alternatively, snapshot activation may be deferred, as disclosed herein. Step 1320 may further comprise preserving data corresponding to the snapshot by, inter alia, maintaining retention information pertaining to data of the snapshot and/or activating portions of the snapshot on-demand, as disclosed herein.

Figure 14:
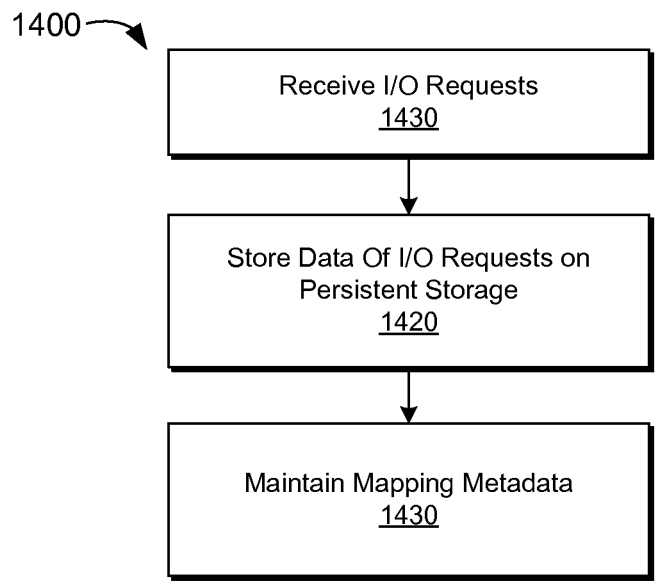
FIG. 14 is a flow diagram of one embodiment of a method for providing data virtualization services.

FIG. 14 is a flow diagram of one embodiment of a method 1400 for providing storage virtualization services. Step 1410 may comprise receiving I/O requests at a data services module 110, as disclosed herein.

Step 1420 may comprise servicing the I/O requests by, inter alia, storing data pertaining to the I/O requests on a persistent storage resource (e.g., storage resource 190A-X). Step 1420 may comprise appending data pertaining to the I/O requests to a VDL 150, as disclosed herein. Alternatively, step 1410 may comprise storing data using another storage mechanism, such as a write-out-of-place storage system, a write-in-place storage system, a key-value storage system, a journaling storage system, and/or the like.

Step 1430 may comprise maintaining mapping metadata pertaining to the I/O requests received at step 1410. Step 1430 may comprise storing mapping metadata that is persistent and crash safe, such that bindings between LIDs of the data stored at step 1420 and storage unit(s) of the data may be maintained despite loss and/or corruption of the volatile memory resources 103 of the computing system 100. Step 1430 may comprise storing mapping metadata to a metadata storage, which may comprise a metadata log 160, as disclosed herein. Alternatively, the metadata storage may comprise a different storage mechanism, such as key-value pair storage, a journaling storage system, and/or the like. Step 1430 may comprise maintaining an order of the stored mapping metadata, such that mapping information stored in the metadata storage are ordered in accordance with an order in which the I/O requests were received at the data services module 110. Maintaining metadata order may comprise appending mapping metadata to an ordered metadata log 160, as disclosed herein. Alternatively, mapping metadata may be ordered using other mechanisms, such as dedicated sequence metadata, monotonically increasing ordering values, and/or the like.

Figure 15:
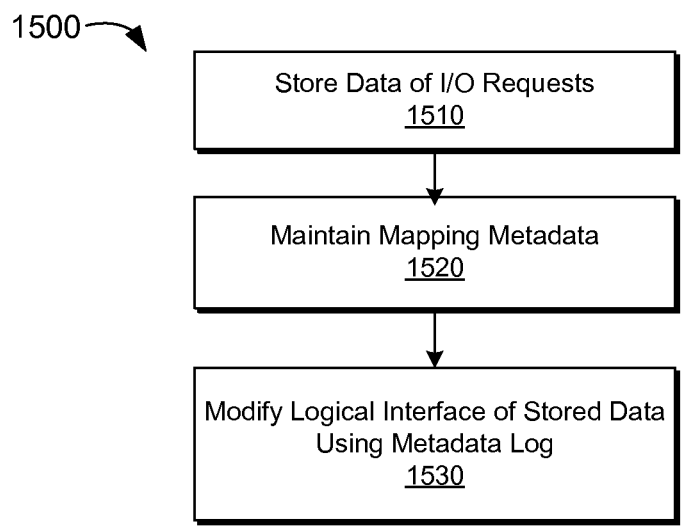
FIG. 15 is a flow diagram of another embodiment of a method for providing data virtualization services.

FIG. 15 is a flow diagram of another embodiment of a method 1500 for providing data virtualization services. Step 1510 may comprise storing data pertaining to I/O requests received at a data services module 110. Step 1510 may comprise storing data of the I/O requests on one of a plurality of storage resources 190A-Y. In some embodiments, step 1510 comprises appending data of the I/O requests to a VDL 150. Alternatively, step 1510 may comprise storing data of the I/O requests in a different storage format and/or using a different storage technique, such as write-in-place, write-out-of-place, write anywhere, journaling, and/or the like.

Step 1520 may comprise maintaining mapping metadata corresponding to the I/O requests, as disclosed above. Step 1520 may comprise appending mapping entries to a metadata log 160. Alternatively, step 1520 may comprise storing mapping metadata in another storage format and/or using another storage technique. Step 1520 may further comprise maintaining ordering information pertaining to the mapping metadata, as disclosed herein.

Step 1530 may comprise modifying the logical interface to data stored at step 1510 by, inter alia, modifying the mapping metadata of step 1520. Step 1530 may comprise one or more of: a) a logical move operation to associate data stored at step 1510 with a different set of LIDs, b) a logical copy operation to associate data stored at step 1510 with two or more different sets of LIDs, c) a logical merge operation to merge data associated with two or more different sets of LIDs, and/or the like. Step 1530 may comprise writing an LME 173 to the metadata log 160, as disclosed herein. The modification(s) to the logical interface may be implemented without modifying the stored data and/or without storing additional data to the storage resource(s) 190A-Y comprising the stored data. The modifications to the logical interface of step 1530 may be persistent and crash safe, such that the modifications are reflected in persistent data stored in a metadata storage. Accordingly, the modifications of step 1530 may be implemented regardless of loss and/or corruption of the volatile memory resources 103 of the computing system 100.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

We claim:

1. An apparatus, comprising:
    an interface module configured to receive an atomic storage request pertaining to a target set of logical addresses of a logical address space;
    an atomic storage module configured to implement storage operations corresponding to the atomic storage request using a transactional set of logical addresses separate from the target set of logical addresses, wherein implementing the storage operations comprises binding one or more logical addresses of the transactional set to one or more data sets stored on a storage resource; and
    a data services module configured to append logical manipulation entries to a metadata log, the logical manipulation entries corresponding to modifications of associations between logical addresses and data stored on the storage resource, wherein the data services module is configured to close the atomic storage request by appending a logical manipulation entry to bind the target set of logical addresses to the one or more data sets,
    wherein the interface module, the atomic storage module, and the data services module comprise one or more of logic hardware and executable code, the executable code stored on a non-transitory computer readable medium.

2. The apparatus of claim 1, further comprising:
    a translation module configured to maintain a forward map comprising any-to-any mappings between logical addresses of the logical address space and virtual addresses of the storage resource; and
    a logical move module configured to implement a logical move operation of data stored on the storage resource, wherein the data is stored at a physical storage address of the storage resource that corresponds to a first virtual address associated with a first logical address, and wherein the logical move operation comprises a) updating the forward map to associate the first virtual address with a second, different logical address, and b) recording a logical manipulation entry corresponding to the logical move operation.

3. The apparatus of claim 2, wherein the recorded logical manipulation entry is configured to indicate that the first virtual address is bound to the second, different logical address, and to indicate that the first logical address is unbound.

4. The apparatus of claim 1, further comprising:
    a translation module configured to maintain a forward map comprising any-to-any mappings between logical addresses of the logical address space and virtual addresses of the storage resource; and
    a logical replication module configured to implement a logical replication operation of data stored on the storage resource and mapped to a first logical address through a first virtual address, wherein the logical replication operation comprises a) updating the forward map to associate the first virtual address with a second, different logical address, and b) storing a logical manipulation entry to indicate that the first virtual address is associated with both the first logical address and the second, different logical address.

5. The apparatus of claim 1, further comprising a snapshot module configured to create a snapshot of a first set of logical addresses within the logical address space by writing a logical manipulation entry to a metadata log, wherein the appended logical manipulation entry is configured to tie a second set of logical addresses to data tied to the first set of logical addresses.

6. The apparatus of claim 1, wherein the data services module is further configured to append one or more mapping entries to the metadata log corresponding to the atomic storage request, wherein the one or more mapping entries indicate one or more associations between logical addresses and data stored on the storage resource.

7. The apparatus of claim 1, further comprising a translation module configured to maintain a forward map comprising any-to-any mappings between logical addresses of the logical address space and virtual addresses of the storage resource, wherein the data services module is further configured to modify the forward map in response to the atomic storage request.

8. The apparatus of claim 7, wherein the data services module is further configured to modify the forward map by changing a mapping between logical addresses and virtual addresses and appending a logical manipulation entry that records the changed mapping to the metadata log.

9. The apparatus of claim 1, further comprising a data log module configured to append data of the atomic storage request to a data log comprising a plurality of storage resources, and wherein the metadata log is maintained on a storage resource that is separate from the storage resources comprising the data log.

10. The apparatus of claim 1, wherein:
    an order of the logical manipulation entries within the metadata log corresponds to an order in which requests are received from one or more clients;

the requests are serviced in an order that differs from the order in which the requests are received from the one or more clients; and the data services module is configured to acknowledge completion of a request in response to appending an entry corresponding to the request to the metadata log.

11. A method, comprising:

maintaining metadata pertaining to data stored on a storage device, the metadata comprising a forward map comprising any-to-any mappings between logical addresses of a logical address space and data stored on the storage device; and servicing an atomic storage request pertaining to a target set of logical block addresses by:

implementing storage operations corresponding to the atomic storage request using a transactional set of logical addresses separate from the target set of logical addresses, wherein implementing the storage operations comprises binding one or more logical addresses of the transactional set to one or more data sets stored on the storage device modifying a mapping in the forward map to bind the target set of logical addresses to the one or more data sets, and appending a record to a persistent metadata log corresponding to the modified mapping.

12. The method of claim 11, wherein the forward map is configured to bind logical addresses to virtual addresses of the storage device, the virtual addresses corresponding to physical storage units of the storage device, the method further comprising storing the data sets on the storage device by appending the data sets to segments of a virtual data log, wherein the segments comprise sets of virtual addresses.

13. The method of claim 11, wherein servicing the atomic storage request comprises:

modifying an entry of the forward map configured to bind a first logical address to the data through a particular virtual address, such that the entry binds the particular virtual address to a second logical address, wherein the record appended to the persistent metadata log corresponds to the modified entry.

14. The method of claim 13, further comprising removing an association between the first logical address and the particular virtual address from the forward map.

15. The method of claim 13, wherein the persistent metadata log indicates that the particular virtual address is bound to both the first logical address and the second logical address.

16. A computer-program product comprising computer-readable program code stored on a non-transitory computer-readable storage medium and configured to cause a computing system to perform operations, comprising:

servicing requests pertaining to logical block addresses of a logical address space by appending data of the requests to a data log maintained on a plurality of storage devices, wherein an upper-level namespace corresponding to the plurality of storage devices comprises the logical address space;

translating logical block addresses of the logical address space to addresses of an intermediate translation layer, wherein the addresses of the intermediate translation layer are within a lower-level namespace corresponding to one of the storage devices, the addresses of the intermediate translation layer corresponding to physical storage units of the storage device such that a forward map comprising any-to-any mappings between the logical block addresses and addresses of the intermediate translation layer is independent of relationships between the addresses of the intermediate translation layer and the physical storage units;

altering a mapping between a logical block address and an address of the intermediate translation layer in response to a request, wherein altering the mapping comprises appending a persistent note to a metadata log corresponding to the altered mapping, wherein the metadata log is maintained on a storage device that is separate from the plurality of storage devices comprising the data log; and servicing an atomic storage request pertaining to a target set of logical block addresses by:

implementing storage operations corresponding to the atomic storage request in a transactional set of logical block addresses separate from the target set of logical block addresses, wherein implementing the storage operations comprises binding logical block addresses of the transactional set to particular addresses within the intermediate translation layer, and altering mappings between logical block addresses and addresses of the intermediate translation layer to bind the target set of logical block addresses to the particular addresses.

17. The computer-program product of claim 16, wherein the persistent note appended to the metadata log is configured to associate two or more logical block addresses of the logical address space to a single address of the intermediate translation layer in response to a virtual copy operation.

18. The computer-program product of claim 16, wherein the persistent note is configured to replace an association between a first logical block address of the logical address space and a particular address of the intermediate translation layer with an association between a second, different logical block address of the logical address space and the particular address in response to a virtual move operation.

* * * * *